United States Patent
Yasugi et al.

(10) Patent No.: US 11,070,802 B2
(45) Date of Patent: Jul. 20, 2021

(54) MOVING IMAGE CODING DEVICE, MOVING IMAGE DECODING DEVICE, MOVING IMAGE CODING/DECODING SYSTEM, MOVING IMAGE CODING METHOD AND MOVING IMAGE DECODING METHOD

(71) Applicant: SHARP KABUSHIKI KAISHA, Sakai (JP)

(72) Inventors: Yukinobu Yasugi, Sakai (JP); Hiroyuki Katata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/698,522

(22) Filed: Nov. 27, 2019

(65) Prior Publication Data

US 2020/0099929 A1 Mar. 26, 2020

Related U.S. Application Data

(63) Continuation of application No. 13/502,685, filed as application No. PCT/JP2010/068461 on Oct. 20, 2010, now abandoned.

(30) Foreign Application Priority Data

Oct. 20, 2009 (JP) .................................. 2009-241904
Nov. 13, 2009 (JP) .................................. 2009-259856

(51) Int. Cl.
 *H04N 19/119* (2014.01)
 *H04N 19/157* (2014.01)
 (Continued)

(52) U.S. Cl.
 CPC ......... *H04N 19/119* (2014.11); *H04N 19/122* (2014.11); *H04N 19/157* (2014.11);
 (Continued)

(58) Field of Classification Search
 CPC .. H04N 19/132; H04N 19/176; H04N 19/105; H04N 19/119
 (Continued)

(56) References Cited

U.S. PATENT DOCUMENTS 5,768,434 A 6/1998 Ran
5,887,084 A * 3/1999 Wober .................. G06F 17/141
382/250
(Continued)

FOREIGN PATENT DOCUMENTS

JP 2003-250161 A 9/2003
JP 2003-319394 A 11/2003
(Continued)

OTHER PUBLICATIONS

ITU_T Recommendation H.264 ISO_IEC 14496, Mar. 2009, pp. 199 to 218.
(Continued)

*Primary Examiner* — Daniel Chang
(74) *Attorney, Agent, or Firm* — Birch, Stewart, Kolasch & Birch, LLP

(57) ABSTRACT

A frequency transformation determination unit determines whether a plurality of adjacent transformation target regions with the partition boundary interposed therebetween are integrated or not. A transformation coefficient generation unit generates, by applying one frequency transformation, a transformation coefficient for the transformation target regions where the frequency transformation determination unit determined to integrate.

2 Claims, 28 Drawing Sheets

(51) Int. Cl.
  *H04N 19/176* (2014.01)
  *H04N 19/17* (2014.01)
  *H04N 19/122* (2014.01)
  *H04N 19/61* (2014.01)

(52) U.S. Cl.
  CPC ........... *H04N 19/17* (2014.11); *H04N 19/176* (2014.11); *H04N 19/61* (2014.11)

(58) Field of Classification Search
  USPC .................................................... 375/240.24
  See application file for complete search history.

(56) References Cited

U.S. PATENT DOCUMENTS

| | | | | |
|---|---|---|---|---|
| 5,920,359 | A * | 7/1999 | Curley | H04N 19/51 348/699 |
| 6,222,883 | B1 * | 4/2001 | Murdock | H04N 19/51 348/416.1 |
| 6,489,995 | B1 * | 12/2002 | Kok | H04N 19/51 348/416.1 |
| 7,747,094 | B2 * | 6/2010 | Sekiguchi | H04N 19/82 382/239 |
| 2003/0016754 | A1 | 1/2003 | Gandhi et al. | |
| 2003/0035477 | A1 | 2/2003 | Sekiguchi et al. | |
| 2003/0112870 | A1 | 6/2003 | Fukuda et al. | |
| 2004/0028282 | A1 * | 2/2004 | Kato | H04N 19/463 382/236 |
| 2004/0071217 | A1 * | 4/2004 | Lin | H04N 19/176 375/240.25 |
| 2005/0123207 | A1 | 6/2005 | Marpe et al. | |
| 2005/0259734 | A1 * | 11/2005 | Hellman | H04N 19/16 375/240.16 |
| 2005/0281334 | A1 * | 12/2005 | Walker | H04N 19/105 375/240.16 |
| 2006/0109904 | A1 * | 5/2006 | Hamada | H04N 19/44 375/240.16 |
| 2007/0140352 | A1 * | 6/2007 | Bhaskaran | H04N 19/132 375/240.24 |
| 2007/0280345 | A1 | 12/2007 | Tu et al. | |
| 2007/0280544 | A1 * | 12/2007 | Tokumitsu | H04N 19/176 382/238 |
| 2008/0165850 | A1 * | 7/2008 | Sagetong | H04N 19/59 375/240.15 |
| 2008/0247664 | A1 * | 10/2008 | Lee | H04N 19/154 382/268 |
| 2008/0310745 | A1 | 12/2008 | Ye et al. | |
| 2009/0245675 | A1 | 10/2009 | Aoyama et al. | |
| 2010/0033633 | A1 * | 2/2010 | Dane | H04N 19/182 348/625 |
| 2010/0086030 | A1 | 4/2010 | Chen et al. | |
| 2010/0118972 | A1 * | 5/2010 | Zhang | H04N 21/4886 375/240.24 |
| 2010/0232511 | A1 * | 9/2010 | Chou | H04N 19/51 375/240.16 |
| 2012/0128074 | A1 * | 5/2012 | Zhang | H04N 19/51 375/240.18 |

FOREIGN PATENT DOCUMENTS

| | | | |
|---|---|---|---|
| WO | WO-2008085425 A2 * | 7/2008 | ............. H04N 19/18 |
| WO | WO 2011/019234 A2 | 2/2011 | |

OTHER PUBLICATIONS

Advisory Action issued in corresponding U.S. Appl. No. 13/502,685 dated Nov. 16, 2016.
Advisory Action issued in corresponding U.S. Appl. No. 13/502,685 dated Nov. 8, 2019.
Advisory Action issued in corresponding U.S. Appl. No. 13/502,685 dated Sep. 10, 2015.
Advisory Action issued in corresponding U.S. Appl. No. 13/502,685 dated Sep. 27, 2018.
Final Office Action issued in corresponding U.S. Appl. No. 13/502,685 dated Apr. 24, 2015.
Final Office Action issued in corresponding U.S. Appl. No. 13/502,685 dated Aug. 28, 2017.
Final Office Action issued in corresponding U.S. Appl. No. 13/502,685 dated Jul. 11, 2016.
Final Office Action issued in corresponding U.S. Appl. No. 13/502,685 dated Jul. 29, 2019.
Final Office Action issued in corresponding U.S. Appl. No. 13/502,685 dated Jun. 13, 2018.
Kai-Tat Fung, Wan-Chi Siu: "DCT-based video downscaling transcoder using split and merge technique." IEEE Transations on Image Processing vol. 15, No. 2, pp. 394-403, Feb. 2006.
Non-Final Office Action issued in corresponding U.S. Appl. No. 13/502,685 dated Dec. 1, 2015.
Non-Final Office Action issued in corresponding U.S. Appl. No. 13/502,685 dated Feb. 2, 2017.
Non-Final Office Action issued in corresponding U.S. Appl. No. 13/502,685 dated Jan. 19, 2018.
Non-Final Office Action issued in corresponding U.S. Appl. No. 13/502,685 dated Jan. 4, 2019.
Non-Final Office Action issued in corresponding U.S. Appl. No. 13/502,685 dated Sep. 25, 2014.
PSIVT 2009 Organizing Committee, "Pacific-Rim Symposium on Image and Video Technology 2009." Data Accessed: Jul. 18, 2019, URL: http://www.psivt2009.nll.ac.jp (Year: 2009).
Zhang C., Ugur K., Lainema J., Gabbouj M., "Video Coding Using Spatially Varying Transform," In: Wada T., Huang F., Lin S. (eds), Advances in Image and Video Technology, PSIVT 2009, Lecture Notes in Computer Science, vol. 5414, Springer, Berlin, Heidelberg (Year: 2009).
Zhang et al., "Video Coding Using Variable Block-Size Spatially Varying Transforms," IEEE International Conf on Acoustics, Speech and Signal Processing, Piscataway, NJ, USA (2009).

* cited by examiner

| PARTITION STRUCTURE INFORMATION | REFERENCE IMAGE INDEX | MOTION VECTOR |
|---|---|---|
| P_L0_L0_16x8 | 2, 0 | (0.25, -1.25), (0.0, 0.75) |

| FREQUENCY TRANSFORMATION OF PARTITION p0 | FREQUENCY TRANSFORMATION OF PARTITION p1 | FREQUENCY TRANSFORMATION OF PARTITION p2 | FREQUENCY TRANSFORMATION OF PARTITION p3 |
|---|---|---|---|
| 4 × 4 | 4 × 4 | 8 × 8 | 8 × 8 |

| PARTITION INDEX | INTEGRATION TARGET REGION INDEX | INTEGRATION DIRECTION INDEX | FREQUENCY TRANSFORMATION |
|---|---|---|---|
| p0 | r1 | right | 8×4 |

```
for(j=0, j<N, j+=H) {
  for(i=0, i<M, i+=W) {
    APPLY FREQUENCY TRANSFORMATION TO REGION R(i, j, W, H)
  }
}
```

FIG. 18

| 4×4 | 8×4 | 4×4 | 4×4 | 4×4 | 4×4 | 8×4 | 4×8 | 4×8 | 8×4 |
|---|---|---|---|---|---|---|---|---|---|

MOVING IMAGE CODING DEVICE, MOVING IMAGE DECODING DEVICE, MOVING IMAGE CODING/DECODING SYSTEM, MOVING IMAGE CODING METHOD AND MOVING IMAGE DECODING METHOD

CROSS-REFERENCE TO RELATED APPLICATIONS

This application is a Continuation Application of U.S. application Ser. No. 13/502,685, filed on Apr. 18, 2012, which is a U.S. National Stage Application of International Application No. PCT/JP2010/068461, filed Oct. 20, 2010, which claims priority under 35 U.S.C. § 119(a) to Application No. 2009-259856, filed in Japan on Nov. 13, 2009 and Application No. 2009-241904, filed in Japan on Oct. 20, 2009, all of which are hereby expressly incorporated by reference into the present application.

TECHNICAL FIELD

The embodiment of the present invention relates to a moving image coding device, a moving image decoding device, a moving image coding/decoding system, a moving image coding method, and a moving image decoding method.

This application claims priorities to Japanese Patent Application Nos. 2009-241904 and 2009-259856 respectively filed on Oct. 20, 2009 and Nov. 13, 2009 in the Japan Patent Office (JPO), the entire contents of which are hereby incorporated by reference.

BACKGROUND ART

In a block-based moving image coding scheme, such as a moving image coding scheme (see Non-Patent Document 1) defined in H.264/AVC (Advanced Video Coding), a moving image coding device divides an input moving image, which is a coding target, into predetermined processing units called macro blocks (MBs) and performs a coding process on each macro block to generate coded data. When the moving image is reproduced, a moving image decoding device processes and decodes the coded data, which is a decoding target, in units of macro blocks to generate a decoded image.

In a moving image coding scheme defined in H.264/AVC, a moving image coding device generates a predicted image that approximates an input moving image divided in units of macro blocks, and calculates a prediction residual that is a difference between the input moving image and the predicted image. Further, the moving image coding device applies a frequency transformation, a representative example of which is a discrete cosine transform (DCT), to the calculated prediction residual to generate a transformation coefficient. The moving image coding device performs variable-length coding on the generated transformation coefficient using a method called CABAC (Context-based Adaptive Binary Arithmetic Coding) or CAVLC (Context-based Adaptive Variable Length Coding).

Here, the predicted image is generated by intra-prediction using a spatial correlation between moving images or inter-prediction using a temporal correlation between moving images (motion compensation prediction).

In inter-prediction of H.264/AVC, a moving image coding device generates an image that approximates an input moving image for each of partitions that are regions into which a macro block is divided, and combines the generated images to generate a predicted image, which approximates the input moving image of the macro block that is a coding target. Specifically, the moving image coding device first divides each macro block of the input moving image into the partitions. The moving image coding device selects one image for each partition from among images called local decoded images recorded in a frame memory, and determines a region that approximates the partition in the selected image. This image selected from among the local decoded images is called a reference image. Further, the region that approximates the partition is a region having the same size as the original partition. Further, the moving image coding device generates one or two motion vectors each indicating a shift between a position of the partition in the macro block of the input moving image and a position of a region that approximates a partition in the reference image, for each partition. Further, the moving image coding device combines the images that approximate the respective partitions to generate a predicted image.

In H.264/AVC, partition sizes such as 16 horizontal pixels×16 vertical pixels, 16 horizontal pixels×8 vertical pixels, 8 horizontal pixels×16 vertical pixels, 8 horizontal pixels×8 vertical pixels, 8 horizontal pixels×4 vertical pixels, 4 horizontal pixels×8 vertical pixels, and 4 horizontal pixels×4 vertical pixels are defined. If a small partition size is used, a motion vector can be designated in a fine unit to generate a predicted image. Accordingly, even when a spatial correlation of a motion is small, a predicted image close to an input moving image can be generated. On the other hand, if a large partition size is used, a code amount necessary for coding of a motion vector can be reduced when the spatial correlation of the motion is large.

In H.264/AVC, a moving image coding device generates a prediction residual that is a difference between an input moving image and a predicted image, thus reducing spatial or temporal redundancy of pixel values of the input moving image and reducing a code amount. Further, the moving image coding device applies a discrete cosine transform to the prediction residual, thereby concentrating energy on a low frequency component. Such bias of the energy is used to code a low frequency component that is easily sensed by human eyes at a fine granularity and code a high frequency component that is not easily sensed by the human eyes at a coarse granularity, thereby reducing a code amount of coded data.

When this discrete cosine transform is performed, a scheme of selecting a discrete cosine transform suitable for a local characteristic of a moving image from among discrete cosine transforms of a plurality of transformation sizes (a block adaptive transformation selection) is employed in H.264/AVC. For example, when a predicted image is generated by inter-prediction, a discrete cosine transform to be applied to prediction residual transformation is selected from two types of discrete cosine transforms, i.e., 8×8 DCT and 4×4 DCT. 8×8 DCT is a transformation in which a discrete cosine transform is performed on a region of 8 horizontal pixels×8 vertical pixels, and 4×4 DCT is a transformation in which a discrete cosine transform is performed on a region of 4 horizontal pixels×4 vertical pixels. 8×8 DCT is effective for a flat region in which high frequency components are relatively fewer since spatial correlation of pixel values can be used in a wide range. On the other hand, 4×4 DCT is effective in a region in which there are more high frequency components to contain the outline of an object. Further, in H.264/AVC, when an area of a partition is equal to or more than 8×8 pixels, either 8×8

DCT or 4×4 DCT can be selected. When the size of the partition is less than 8 horizontal pixels×8 vertical pixels, 4×4 DCT is selected.

Thus, in H.264/AVC, an appropriate partition or transformation size is selected according to a degree of the spatial correlation of the pixel values or a spatial correlation of motion vectors, which is a local characteristic of a moving image, thereby reducing a code amount of coded data.

PRIOR ART DOCUMENT

Non-Patent Document

Non-Patent Document 1: ITU-T Recommendation H.264, ISO/IEC 14496-10

DISCLOSURE OF INVENTION

Problem to be Solved by the Invention

In H.264/AVC, a frequency transformation may be adaptively selected and used for each partition between two sizes of 8×8 DCT and 4×4 DCT, as described above. Accordingly, it is possible to improve coding efficiency using a spatial correlation in a partition. However, in conventional moving image coding technology such as H.264/AVC, a spatial correlation between regions determined as frequency transformation targets, particularly, a spatial correlation between partitions, is not reflected in coding efficiency. Accordingly, even when a plurality of adjacent regions with a partition boundary interposed therebetween have a high spatial correlation, it is possible to improve the coding efficiency. Further, even within the same partition, when regions between which the spatial correlation is high are adjacent to each other, it is possible to further improve the coding efficiency by integrating the regions and performing a frequency transformation. However, in H.264/AVC, the size for the frequency transformation is limited to the two sizes of 8×8 DCT and 4×4 DCT.

Further, a determination as to whether the frequency transformation of the size of either of 8×8 DCT and 4×4 DCT is applied has been made by evaluating a rate distortion cost as the result of actually executing the frequency transformation, which increases an amount of coding calculation.

The embodiment of the present invention has been made in view of the circumstances described above, and an object of the embodiment of the present invention is to provide a moving image coding device, a moving image decoding device, a moving image coding/decoding system, a moving image coding method, and a moving image decoding method capable of improving coding efficiency when a plurality of adjacent regions have a high spatial correlation.

Technical Solution

[1] The embodiment of the present invention is made to solve the above-described problem, a first aspect of the present invention is a moving image coding device including: an image input unit which divides a frame of an input moving image into units of macro blocks; a partition structure determination unit which further divides the macro block into partitions; a frequency transformation region division unit which divides the macro block into transformation target regions, at least one transformation target region including regions across the partitions; a transformation coefficient generation unit which applies a frequency transformation to each of the transformation target regions divided by the frequency transformation region division unit to generate a transformation coefficient; and a coded data output unit which outputs coded data obtained by losslessly coding the transformation coefficient.

Since this moving image coding device applies the frequency transformation to the transformation target regions across the partitions, it is possible to improve coding efficiency when a plurality of adjacent regions with the partition boundary interposed therebetween have a high spatial correlation.

[2] In the first aspect of the present invention, the moving image coding device may include: a local decoded image storage unit which stores a local decoded image that is a decoded image of the macro block for which the transformation coefficient has been generated; a predicted image generation unit which selects a reference image for each partition from among the local decoded images stored in the local decoded image storage unit and generates a predicted image based on the selected reference image; and a prediction residual generation unit which generates a prediction residual that is a difference between pixel values of the predicted image and the macro block.

[3] In the first aspect of the present invention, the frequency transformation region division unit may divide the macro block into transformation target regions according to the frequency transformation applied to each partition, and set a region obtained by integrating the transformation target regions that are adjacent to each other and included in the different partitions as one of the transformation target regions across the partitions when it is determined that a spatial correlation between the prediction residuals in the integrated region is high.

Since this moving image coding device uses the region obtained by integrating the transformation target regions included in the different partitions as one of the above-described transformation target regions across the partitions, it is possible to improve coding efficiency when a plurality of adjacent regions with the partition boundary interposed therebetween have a high spatial correlation.

[4] In the first aspect of the present invention, the frequency transformation region division unit may generate transformation integration information indicating a transformation target region across the partitions, and the coded data output unit may contain the transformation integration information in the coded data and then outputs the transformation integration information.

Since this moving image coding device outputs the transformation integration information, the moving image decoding device can generate the decoded moving image based on the output transformation integration information.

[5] In the first aspect of the present invention, the frequency transformation region division unit may determine whether the spatial correlation between the prediction residuals in the transformation target regions across the partitions is high based on feature amounts of region images corresponding to the transformation target regions on the predicted image.

Since this moving image coding device determines whether the spatial correlation between the prediction residuals in the transformation target regions across the partitions is high based on the feature amount of a region image corresponding to the transformation target region on the predicted image, it is possible to improve coding efficiency when a plurality of adjacent regions with the partition boundary interposed therebetween have a high spatial correlation by applying one frequency transformation to the transformation target regions between which the spatial correlation is determined to be high.

[6] In the first aspect of the present invention, the frequency transformation region division unit may determine whether the spatial correlation between the prediction residuals in the transformation target regions across the partitions is high based on a difference between pixel values of pixels that are adjacent to each other and belong to different partitions among pixels in a region corresponding to the transformation target region on the predicted image.

Since this moving image coding device determines whether a spatial correlation between the prediction residuals in the transformation target regions across the partitions is high based on the pixel value of the predicted image, it is possible to improve coding efficiency when a plurality of adjacent regions with the partition boundary interposed therebetween have a high spatial correlation by applying one frequency transformation to the transformation target regions between which the spatial correlation is determined to be high.

Further, since the determination as to whether the spatial correlation is high is made using the predicted image, the same determination can be made even in the moving image decoding device, and the moving image coding device transmitting data of the integrated transformation target region to the moving image decoding device can be omitted. Accordingly, it is possible to reduce a code amount of transmission data.

[7] In the first aspect of the present invention, the frequency transformation region division unit may determine whether the spatial correlation between the prediction residuals in the transformation target regions across the partitions is high based on one or more of whether prediction modes in regions corresponding to the transformation target regions on the predicted image are the same, whether the prediction mode is the same as a specific prediction mode, a similarity between prediction directions indicated by the prediction modes, and whether a reference pixel in a region corresponding to one transformation target region is included in a region corresponding to the other transformation target region.

Since this moving image coding device determines whether the spatial correlation between the prediction residuals in the transformation target regions across the partitions is high based on one or more of whether the prediction modes are the same, whether the prediction mode is the same as a specific prediction mode, the similarity between prediction directions indicated by the prediction modes, and whether a reference pixel in a region corresponding to one transformation target region is included in a region corresponding to the other transformation target region, it is possible to improve coding efficiency when a plurality of adjacent regions with the partition boundary interposed therebetween have a high spatial correlation by applying one frequency transformation to the transformation target regions between which the spatial correlation is determined to be high.

Further, since the determination as to whether the spatial correlation is high is made using the prediction mode, the same determination can be made even in the moving image decoding device and the moving image coding device transmitting data of the integrated transformation target regions to the moving image decoding device can be omitted. Thus, it is possible to reduce a code amount of transmission data.

[8] In the first aspect of the present invention, the frequency transformation region division unit may determine whether the spatial correlation between the prediction residuals in a region obtained by integrating the transformation target regions that are adjacent to each other and included in the different partitions is high based on one or more of whether the selected reference images for the two partitions in which the integrated region is included are the same, a difference between sizes of motion vectors of the two partitions in which the integrated region is included, and a ratio of the sizes of the motion vectors.

Since this moving image coding device determines whether the spatial correlation between the prediction residuals in the region obtained by integrating the transformation target regions included in the different partitions is high using the sameness of the reference images or the motion vectors, it is possible to improve coding efficiency when a plurality of adjacent regions with the partition boundary interposed therebetween have a high spatial correlation by applying one frequency transformation to the transformation target regions between which the spatial correlation is determined to be high.

Furthermore, since the determination as to whether the spatial correlation is high is made using the sameness of the reference images or the motion vector, the same determination can be made even in the moving image decoding device receiving information of the reference images or the output motion vectors, and the moving image coding device transmitting data of the integrated transformation target regions to the moving image decoding device can be omitted. Accordingly, it is possible to reduce a code amount of transmission data.

[9] In the first aspect of the present invention, the frequency transformation region division unit may determine whether the spatial correlation between the prediction residuals in a region obtained by integrating the transformation target regions that are adjacent to each other and included in the different partitions is high based on transformation coefficients obtained by applying frequency transformations to the transformation target regions that are adjacent to each other and included in the different partitions or based on the result of comparing either or both of code amounts and rate distortion costs when the transformation target regions are integrated and when the transformation target regions are not integrated.

Since this moving image coding device determines whether the spatial correlation between the prediction residuals in the region obtained by integrating the transformation target regions included in the different partitions is high based on the transformation coefficients of regions for which a determination as to whether integration is to be performed is made or the result of comparing either or both of the code amounts and the rate distortion costs when the regions are integrated and when the regions are not integrated, it is possible to improve coding efficiency when a plurality of adjacent regions with the partition boundary interposed therebetween have a high spatial correlation by applying one frequency transformation to the transformation target regions between which the spatial correlation is determined to be high.

[10] In the first aspect of the present invention, the frequency transformation region division unit may generate integrated transformation selection information indicating a configuration of transformation target regions in the macro block and a frequency transformation applied to each transformation target region, and the coded data output unit may contain the integrated transformation selection information in the coded data and then outputs the integrated transformation selection information.

This moving image coding device generates the integrated transformation selection information. This moving image coding device outputs the integrated transformation selection information such that the moving image decoding device can generate the decoded moving image based on the output integrated transformation selection information.

[11] In the first aspect of the present invention, the frequency transformation region division unit may select a division pattern applied to the macro block from a set of division patterns to divide the macro block into regions to which frequency transformations are applied, any of the regions to which the frequency transformations are applied including division patterns across the partitions, to thereby divide the macro block into regions including the regions across the partitions.

This moving image coding device divides the macro block into regions including regions across the partitions using a division pattern. Accordingly, when the frequency transformation is applied to the divided region, one frequency transformation can be applied to the regions across the partitions and it is possible to improve coding efficiency when a plurality of adjacent regions with the partition boundary interposed therebetween have a high spatial correlation.

[12] In the first aspect of the present invention, the coded data output unit may contain information indicating the division pattern selected by the frequency transformation region division unit in the coded data and then outputs the information.

Since this moving image coding device outputs the information indicating the division pattern, the moving image decoding device can generate the decoded moving image based on the output division pattern.

[13] A second aspect of the present invention is a moving image coding device including: an image input unit which divides a frame of an input moving image into units of macro blocks; a partition structure determination unit which further divides the macro block into partitions; a frequency transformation region division unit which divides the macro block into transformation target regions, which are regions to which frequency transformations are applied, and integrates at least one of the transformation target regions that are adjacent to each other based on an index indicating a spatial correlation to generate a new transformation target region; a transformation coefficient generation unit which applies a frequency transformation to each of the transformation target regions divided by the frequency transformation region division unit to generate a transformation coefficient; and a coded data output unit which outputs coded data obtained by losslessly coding the transformation coefficient.

Since this moving image coding device sets a region obtained by integrating adjacent transformation target regions as one transformation target region based on the index indicating a spatial correlation, it is possible to improve coding efficiency.

[14] In the second aspect of the present invention, the moving image coding device may include: a local decoded image storage unit which stores a local decoded image that is a decoded image of the macro block for which the transformation coefficient has been generated; a predicted image generation unit which selects a reference image for each partition from among the local decoded images stored in the local decoded image storage unit and generates a predicted image based on the selected reference image; and a prediction residual generation unit which generates a prediction residual that is a difference between pixel values of the predicted image and the macro block.

[15] In the second aspect of the present invention, the index indicating the spatial correlation may be determined based on the difference between pixel values of adjacent pixels among pixels in a region corresponding to the transformation target region on the predicted image.

Since this moving image coding device integrates the adjacent transformation target regions based on the difference between pixel values of adjacent pixels among pixels within regions corresponding to the adjacent transformation target regions on the predicted image, it is possible to improve coding efficiency by integrating regions determined to have a high spatial correlation and applying one frequency transformation to the integrated region.

[16] In the second aspect of the present invention, the index indicating the spatial correlation may be determined based on one or more of whether prediction modes in regions corresponding to the transformation target regions on the predicted image are the same, whether the prediction mode is the same as a specific prediction mode, a similarity between prediction directions indicated by the prediction modes, and whether a reference pixel in a region corresponding to one transformation target region is included in a region corresponding to the other transformation target region.

Since this moving image coding device integrates the transformation target regions based on one or more of whether the prediction modes in regions corresponding to the adjacent transformation target regions on the predicted image are the same, whether the prediction mode is the same as a specific prediction mode, a similarity between prediction directions indicated by the prediction modes, and whether a reference pixel in a region corresponding to one transformation target region is included in a region corresponding to the other transformation target region, it is possible to improve coding efficiency by integrating regions determined to have a high spatial correlation and applying one frequency transformation to the integrated region.

[17] In the second aspect of the present invention, the frequency transformation region division unit may generate transformation integration information indicating a new transformation target region generated by integrating adjacent transformation target regions based on the index indicating the spatial correlation, and the coded data output unit may contain the transformation integration information in the coded data and outputs the transformation integration information.

Since this moving image coding device outputs the transformation integration information, the moving image decoding device can perform the inverse frequency transformation based on the transformation integration information.

[18] A third aspect of the present invention is a moving image decoding device includes: a lossless code decoding unit which performs lossless code decoding and division into the macro blocks on coded data obtained by coding a moving image; a local decoded image generation unit which applies, to each of transformation target regions into which the macro block has been divided, at least one of the transformation target regions including a transformation target region across partitions, an inverse frequency transformation according to the transformation target region to generate a local decoded image; and a moving image output unit which combines the local decoded images to generate a moving image and outputs the moving image.

Since this moving image decoding device applies the inverse frequency transformation to the transformation target regions across the partitions to generate the local decoded image, it is possible to generate the decoded moving image even when the moving image coding device has integrated the regions included in different partitions.

[19] In the third aspect of the present invention, the moving image decoding device may include: a local decoded image storage unit which stores a local decoded image that is an image obtained by decoding the coded data in units of macro blocks; a predicted image generation unit which selects a reference image from among the local decoded images stored in the local decoded image storage unit for each of partitions into which the macro block has been further divided, and generates a predicted image based on the selected reference image; and a prediction residual rebuilding unit which applies, to each transformation target region, an inverse frequency transformation according to the transformation target region to generate a prediction residual, wherein the local decoded image generation unit sums the predicted image and the prediction residual for each pixel to generate the local decoded image.

[20] In the third aspect of the present invention, transformation integration information indicating transformation target regions across the partitions may be contained in the coded data, the moving image decoding device may further include a transformation target region determination unit which determines the transformation target regions based on the transformation integration information, and the prediction residual rebuilding unit may apply an inverse frequency transformation to each transformation target region determined by the transformation target region determination unit to generate the prediction residual.

Since this moving image decoding device applies the inverse frequency transformation based on the transformation integration information contained in the coded data, the moving image decoding device can generate the decoded moving image even when the moving image coding device has integrated the regions included in different partitions.

[21] In the third aspect of the present invention, the moving image decoding device may further include: a transformation target region determination unit which determines transformation target regions across the partitions based on an index indicating a spatial correlation between the regions, wherein the prediction residual rebuilding unit may apply an inverse frequency transformation to each transformation target region determined by the transformation target region determination unit to generate the prediction residual.

Since the transformation target region determination unit determines the transformation target regions across the partitions based on the index indicating the spatial correlation of the region, the moving image decoding device can generate the decoded moving image even when the moving image coding device has integrated the regions included in different partitions.

[22] In the third aspect of the present invention, the transformation target region determination unit may use, as the index indicating a spatial correlation, a difference between pixel values on the predicted image corresponding to respective pixels that are adjacent to each other and belong to different partitions in the target region.

In this moving image decoding device, the transformation target region determination unit uses the difference between pixel values on the predicted image corresponding to respective pixels that are adjacent to each other and belong to different partitions in the target region as the index indicating the spatial correlation of this target region. The determination of the transformation target regions across the partitions based on this index makes it possible to generate the decoded moving image even when the moving image coding device has integrated the regions included in different partitions.

[23] In the third aspect of the present invention, the transformation target region determination unit may use, as the index indicating a spatial correlation, one or more of whether the prediction modes in the transformation target regions are the same on the predicted images corresponding to the transformation target regions that are adjacent to each other and belong to different partitions among target regions, whether the prediction mode is the same as a specific prediction mode, a similarity between prediction directions indicated by the prediction modes, and whether a reference pixel in a region corresponding to one transformation target region is included in a region corresponding to the other transformation target region.

In this moving image decoding device, the transformation target region determination unit uses one or more of whether the prediction modes in the transformation target regions are the same on the predicted image corresponding to respective pixels that are adjacent to each other and belong to different partitions in the target region, whether the prediction mode is the same as a specific prediction mode, a similarity between prediction directions indicated by the prediction modes, and whether a reference pixel in a region corresponding to one transformation target region is included in a region corresponding to the other transformation target region, as the index indicating the spatial correlation of this target region. The determination of the transformation target regions across the partitions based on this index makes it possible to generate the decoded moving image even when the moving image coding device has integrated the regions included in different partitions.

[24] In the third aspect of the present invention, the transformation target region determination unit may use, as the index indicating a spatial correlation, one or more of whether reference images selected for two partitions in which the target region is included are the same, a difference between sizes of motion vectors of the two partitions in which the target region is included, and a ratio of sizes of the motion vectors.

In this moving image decoding device, the transformation target region determination unit uses any one of whether the reference images selected for each of two partitions in which the target region is included are the same, the difference between sizes of motion vectors of the two partitions in which the target region is included, and the ratio of sizes of the motion vectors, as the index indicating the spatial correlation of the target region. The determination of the transformation target regions across the partitions based on this index makes it possible to generate the decoded moving image even when the moving image coding device has integrated the regions included in different partitions.

[25] In the third aspect of the present invention, integrated transformation selection information indicating a configuration in the macro block of transformation target regions to which a moving image coding device having generated coded data may have applied the frequency transformation is contained in the coded data, and the prediction residual rebuilding unit may apply an inverse frequency transformation to each transformation target region indicated by the integrated transformation selection information to generate the prediction residual.

Since this moving image decoding device applies the inverse frequency transformation based on the integrated transformation selection information, the moving image decoding device can generate the decoded moving image even when the moving image coding device has integrated the regions included in different partitions.

[26] In the third aspect of the present invention, the prediction residual rebuilding unit may select a division pattern applied to the macro block from a set of division patterns to divide the macro block into regions to which frequency transformations are applied, any of the regions to which the frequency transformations are applied including division patterns across the partitions, based on the same criterion as a moving image coding device having generated the coded data, and applies an inverse frequency transformation to the macro block based on the selected division pattern.

Since this moving image decoding device applies the inverse frequency transformation based on the division pattern, the moving image decoding device can generate the decoded moving image even when the moving image coding device has integrated the regions included in different partitions.

[27] A third aspect of the present invention is a information indicating a division pattern applied to the macro block by the moving image coding device having generated the coded data is contained in the coded data, and the prediction residual rebuilding unit sets the division pattern indicated by the information contained in the coded data as the division pattern to be applied to the macro block that is the processing target.

Since this moving image decoding device applies the inverse frequency transformation based on the division pattern contained in the input data, the moving image decoding device can generate the decoded moving image even when the moving image coding device has integrated the regions included in different partitions.

[28] In the third aspect of the present invention, the predicted image rebuilding unit may select the division pattern to be applied to the macro block from the set of division patterns based on the configuration of the partitions in the macro block and the macro block.

Since this moving image decoding device applies the inverse frequency transformation based on the division pattern selected by the predicted image rebuilding unit, the moving image decoding device can generate the decoded moving image even when the moving image coding device has integrated the regions included in different partitions.

[29] A fourth aspect of the present invention is a moving image decoding device including: a lossless code decoding unit which performs lossless code decoding and division into macro blocks on coded data obtained by coding a moving image; a local decoded image generation unit which applies, to each of transformation target regions into which the macro block has been divided, the transformation target region including at least one transformation target region integrated based on an index indicating a spatial correlation, an inverse frequency transformation according to the transformation target region to generate a local decoded image; and a moving image output unit which combines the local decoded images to generate a moving image and outputs the moving image.

Since this moving image decoding device applies the inverse frequency transformation to the integrated transformation target region to generate the local decoded image, the moving image decoding device can generate the decoded moving image even when the moving image coding device has integrated the regions.

[30] In the fourth aspect of the present invention, the moving image decoding device may include: a local decoded image storage unit which stores a local decoded image that is an image obtained by decoding the coded data in units of macro blocks; a predicted image generation unit which selects a reference image for each of partitions into which the macro block has been further divided, from among the local decoded images stored in the local decoded image storage unit, and generates a predicted image based on the selected reference image; and a prediction residual rebuilding unit which applies, to each transformation target region, an inverse frequency transformation according to the transformation target region to generate a prediction residual, wherein the local decoded image generation unit may sum the predicted image and the prediction residual for each pixel to generate a local decoded image.

[31] In the fourth aspect of the present invention, transformation integration information indicating the transformation target region integrated based on the index indicating the spatial correlation may be contained in the coded data, the moving image decoding device may further include a transformation target region determination unit which determines the transformation target regions based on the transformation integration information, and the prediction residual rebuilding unit may apply an inverse frequency transformation to each of the transformation target regions determined by the transformation target region determination unit to generate the prediction residual.

This moving image decoding device can generate the decoded moving image even when the moving image coding device has integrated the regions, by the transformation target region determination unit determining the transformation target regions based on the transformation integration information.

[32] In the fourth aspect of the present invention, the moving image decoding device may further include: a transformation target region determination unit which determines the transformation target region integrated based on the index indicating the spatial correlation of the region, wherein the prediction residual rebuilding unit may apply an inverse frequency transformation to each transformation target region determined by the transformation target region determination unit to generate the prediction residual.

Since the transformation target region determination unit determines the transformation target regions based on the index indicating the spatial correlation, the moving image decoding device can generate the decoded moving image even when the moving image coding device integrates the regions and does not output the transformation integration information.

[33] In the fourth aspect of the present invention, the transformation target region determination unit may use a difference between pixel values on the predicted image corresponding to respective adjacent pixels in the target region as the index indicating a spatial correlation.

This moving image decoding device uses the difference between pixel values on the predicted image corresponding to the respective adjacent pixels in the adjacent transformation target region as the index indicating the spatial correlation, and thus, the moving image decoding device can generate the decoded moving image even when the moving image coding device integrates the regions and does not output the transformation integration information.

[34] In the fourth aspect of the present invention, the transformation target region determination unit may use one or more of whether prediction modes in the transformation target regions are the same on the predicted image corresponding to adjacent transformation target regions in the target region, whether the prediction mode is the same as a specific prediction mode, a similarity between prediction directions indicated by the prediction modes, and whether a reference pixel in a region corresponding to one transformation target region is included in a region corresponding to the other transformation target region, as the index indicating a spatial correlation.

As this moving image decoding device uses one or more of whether the prediction modes in the transformation target regions are the same on a predicted image corresponding to adjacent transformation target regions in a target region, whether the prediction mode is the same as a specific prediction mode, a similarity between prediction directions indicated by the prediction modes, and whether a reference pixel in a region corresponding to one transformation target region is included in a region corresponding to the other transformation target region, as the index indicating the spatial correlation, the moving image decoding device can generate the decoded moving image even when the moving image coding device has integrated the regions and does not output the transformation integration information.

[35] A fifth aspect of the present invention is a moving image coding/decoding system including a moving image coding device which receives an input of a moving image and outputs coded data, and a moving image decoding device which decodes the coded data output by the moving image coding device to generate a moving image, wherein: the moving image coding device includes: an image input unit which divides a frame of the input moving image into units of macro blocks; a partition structure determination unit which further divides the macro block into partitions; a frequency transformation region division unit which divides the macro block into transformation target regions, at least one transformation target region including regions across the partitions; a transformation coefficient generation unit which applies a frequency transformation to each of the transformation target regions divided by the frequency transformation region division unit to generate a transformation coefficient; and a coded data output unit which outputs coded data obtained by losslessly coding the transformation coefficient, and the moving image decoding device includes: a lossless code decoding unit which performs lossless code decoding and division into the macro blocks on the coded data; a local decoded image generation unit which applies, to each of transformation target regions into which the macro block has been divided, at least one of the transformation target regions including a transformation target region across partitions, an inverse frequency transformation according to the transformation target region to generate a local decoded image; and a moving image output unit which combines the local decoded images to generate a moving image and outputs the moving image.

In this moving image coding/decoding system, since the moving image coding device applies the frequency transformation to the region across the partitions, it is possible to improve coding efficiency when a plurality of adjacent regions with the partition boundary interposed therebetween have a high spatial correlation. Further, since the moving image decoding device applies the inverse frequency transformation based on information indicating regions across the partitions to which the moving image coding device has applied the frequency transformation, the moving image decoding device can generate the decoded moving image even when the moving image coding device has integrated the regions included in different partitions.

[36] A sixth aspect of the present invention is a moving image coding/decoding system including a moving image coding device which receives an input of a moving image and outputs coded data, and a moving image decoding device which decodes the coded data output by the moving image coding device to generate a moving image, wherein: the moving image coding device includes: an image input unit which divides a frame of the input moving image into units of macro blocks; a partition structure determination unit which further divides the macro block into partitions; a frequency transformation region division unit which divides the macro block into transformation target regions, which are regions to which frequency transformations are applied, and integrates at least one of the transformation target regions that are adjacent to each other based on an index indicating a spatial correlation to generate a new transformation target region; a transformation coefficient generation unit which applies a frequency transformation to each of the transformation target regions divided by the frequency transformation region division unit to generate a transformation coefficient; and a coded data output unit which outputs coded data obtained by losslessly coding the transformation coefficient, and the moving image decoding device includes: a lossless code decoding unit which performs lossless code decoding and division into the macro blocks on the coded data obtained by coding the moving image; a local decoded image generation unit which applies, to each of transformation target regions into which the macro block has been divided, the transformation target region including at least one transformation target region integrated based on an index indicating a spatial correlation, an inverse frequency transformation according to the transformation target region to generate a local decoded image; and a moving image output unit which combines the local decoded images to generate a moving image and outputs the moving image.

In this moving image coding/decoding system, since the moving image coding device applies the frequency transformation to the adjacent regions, it is possible to improve coding efficiency when a plurality of adjacent regions have a high spatial correlation. Further, since the moving image decoding device applies the inverse frequency transformation based on information indicating the adjacent regions to which the moving image coding device has applied the frequency transformation, the moving image decoding device can generate the decoded moving image even when the moving image coding device has integrated the adjacent regions.

[37] A seventh aspect of the present invention is a moving image coding method including: dividing, by a moving image coding device, a frame of an input moving image into units of macro blocks; further dividing, by the moving image coding device, the macro block into partitions; dividing, by the moving image coding device, the macro block into transformation target regions, at least one transformation target region including regions across the partitions; applying, by the moving image coding device, a frequency transformation to each of the transformation target regions divided in the frequency transformation region division to generate a transformation coefficient; and outputting, by the moving image coding device, coded data obtained by losslessly coding the transformation coefficient.

[38] A eighth aspect of the present invention is a moving image coding method including: dividing, by a moving image coding device, a frame of an input moving image into units of macro blocks; further dividing, by a moving image coding device, the macro block into partitions; dividing, by a moving image coding device, the macro block into transformation target regions, which are regions to which frequency transformations are applied, and integrating at least one of the transformation target regions that are adjacent to each other based on an index indicating a spatial correlation to generate a new transformation target region; applying, by a moving image coding device, a frequency transformation to each of the transformation target regions divided in the frequency transformation region division to generate a transformation coefficient; and outputting, by a moving image coding device, coded data obtained by losslessly coding the transformation coefficient.

In this moving image coding method, since the moving image coding device integrates the adjacent transformation target regions and applies the frequency transformation, it is possible to improve coding efficiency when a plurality of adjacent regions have a high spatial correlation.

[39] A ninth aspect of the present invention is a moving image decoding method including: performing, by a moving image decoding device, lossless code decoding and division into the macro blocks on coded data obtained by coding a moving image; applying, by the moving image decoding device, to each of transformation target regions into which the macro block has been divided, at least one of the transformation target regions including a transformation target region across a partition, an inverse frequency transformation according to the transformation target region to generate a local decoded image; and combining, by the moving image decoding device, the local decoded images to generate a moving image and outputting the moving image.

In this moving image decoding method, since the moving image decoding device applies the inverse frequency transformation to the transformation target regions across the partitions to generate the local decoded image, it is possible to generate the decoded moving image even when the moving image coding device has integrated the regions included in different partitions.

[40] A tenth aspect of the present invention is a moving image decoding method including: performing, by a moving image decoding device, lossless code decoding and division into macro blocks on coded data obtained by coding a moving image; applying, by the moving image decoding device, to each of transformation target regions into which the macro block has been divided, the transformation target region including at least one transformation target region integrated based on an index indicating a spatial correlation, an inverse frequency transformation according to the transformation target region to generate a local decoded image; and combining, by the moving image decoding device, the local decoded images to generate a moving image and outputting the moving image.

In this moving image decoding method, since the moving image decoding device applies the inverse frequency transformation to the adjacent transformation target regions to generate the local decoded image, it is possible to generate the decoded moving image even when the moving image coding device integrates adjacent regions.

Effect of the Invention

According to the embodiment of the present invention, it is possible to improve the coding efficiency of moving image coding.

BRIEF DESCRIPTION OF THE DRAWINGS

FIG. 18 is a data structure diagram showing a data structure of the integrated transformation selection information generated by a frequency transformation deriving unit 111 in the first embodiment.

BEST MODE FOR CARRYING OUT THE INVENTION

First Embodiment

Hereinafter, embodiments of the present invention will be described with reference to the accompanying drawings.

Hereinafter, while differences between processes performed by a moving image coding device and a moving image decoding device in embodiments of the present invention and the process defined in H.264/AVC will be appropriately shown, the embodiment of the present invention is not limited to H.264/AVC and may be applied to a moving image coding device and a moving image decoding device using various moving image coding/decoding schemes in which an image is processed in units of macro blocks and a motion compensation prediction and a frequency transformation are performed, such as VC-1, MPEG-2 (Moving Picture Experts Group phase 2) or AVS (Audio Video Coding Standard). Here, the frequency transformation refers to a transformation in which a two-dimensional matrix is sampling data and is transformed into data of the same type of two-dimensional matrix, for example, by a discrete cosine transform. The frequency transformation is performed in order to reduce a code amount by transforming a pixel value into data in a frequency domain to remove data redundancy based on a spatial correlation of pixel values.

Figure 1:
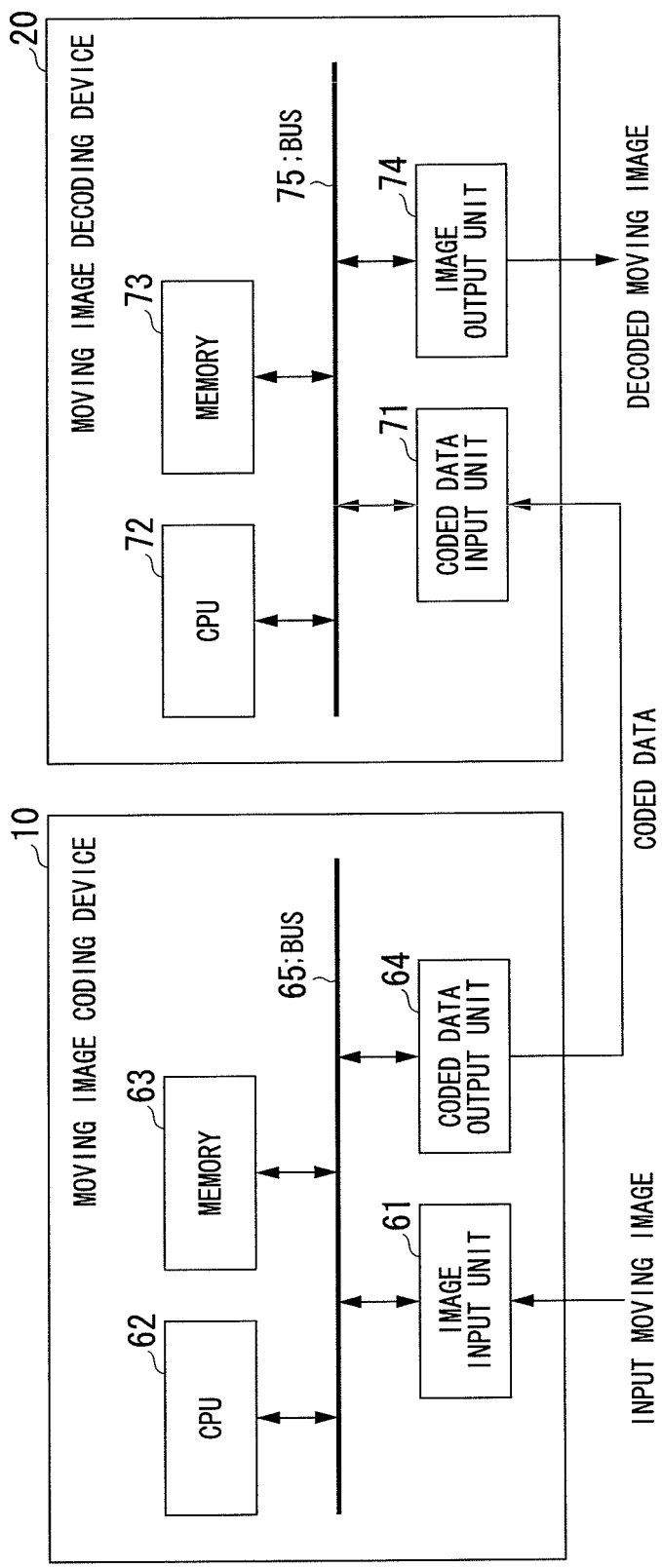
FIG. 1 is a configuration diagram showing a schematic configuration of a moving image coding/decoding system 1 in a first embodiment of the present invention.

FIG. 1 is a configuration diagram showing a schematic configuration of a moving image coding/decoding system 1 in a first embodiment of the present invention.

In FIG. 1, the moving image coding/decoding system 1 includes a moving image coding device 10 and a moving image decoding device 20. The moving image coding device 10 includes an image input unit 61, a central processing unit (CPU) 62, a memory 63, a coded data output unit 64, and a bus 65. The moving image decoding device 20 includes a coded data input unit 71, a central processing unit 72, a memory 73, an image output unit 74, and a bus 75.

The moving image coding device 10 codes an input moving image in units of frames, and outputs coded data. In the moving image coding device 10, when the moving image is input, the image input unit 61 divides the input moving image in units of macro blocks, and outputs the resultant moving image to the central processing unit 62 via the bus 65. The central processing unit 62 codes each of the input moving image of the macro block unit output from the image input unit 61, and outputs coded data to the coded data output unit 64 via the bus 65. The memory 63 stores a local decoded image, which is an image used for the central processing unit 62 to generate the coded data and also is a decoded image of the macro block whose transformation coefficient has been generated as will be described later. The memory 63 also stores a program executed by the central processing unit 62. Further, the memory 63 is a working memory when the central processing unit 62 operates, and temporarily stores operation results generated by the central processing unit 62. The coded data output unit 64 outputs the coded data output by the central processing unit 62 to the outside of the moving image coding device 10.

The moving image decoding device 20 decodes the coded data output by the moving image coding device 10 and outputs a decoded moving image. In the moving image decoding device 20, when the coded data is input, the coded data input unit 71 outputs the input coded data to the central processing unit 72 via the bus 75. The central processing unit 72 decodes the coded data output from the coded data input unit 71 to generate a local decoded image, which is a decoded image of the macro block unit, and outputs the generated local decoded image to the image output unit 74 via the bus 75. The memory 73 stores the local decoded image of the macro block used for the central processing unit 72 to generate the decoded image. The memory 73 also stores a program executed by the central processing unit 72. Further, the memory 73 is a working memory when the central processing unit 72 operates, and temporarily stores operation results generated by the central processing unit 72. The image output unit 74 combines the decoded images of the macro block unit output by the central processing unit 72 to generate a decoded image of a frame unit, and outputs the decoded image to the outside of the moving image decoding device 20.

Further, a method of inputting the coded data output by the coded data output unit 64 of the moving image coding device 10 to the coded data input unit 71 of the moving image decoding device 20 may be any method as long as the method allows the coded data input unit 71 to read the coded data. For example, the coded data output unit 64 may transmit the coded data to the coded data input unit 71 using a wired or wireless communication path. Alternatively, the coded data output unit 64 may write the coded data to a storage medium such as a semiconductor memory and the coded data input unit 71 may read the coded data from the storage medium.

Figure 2:
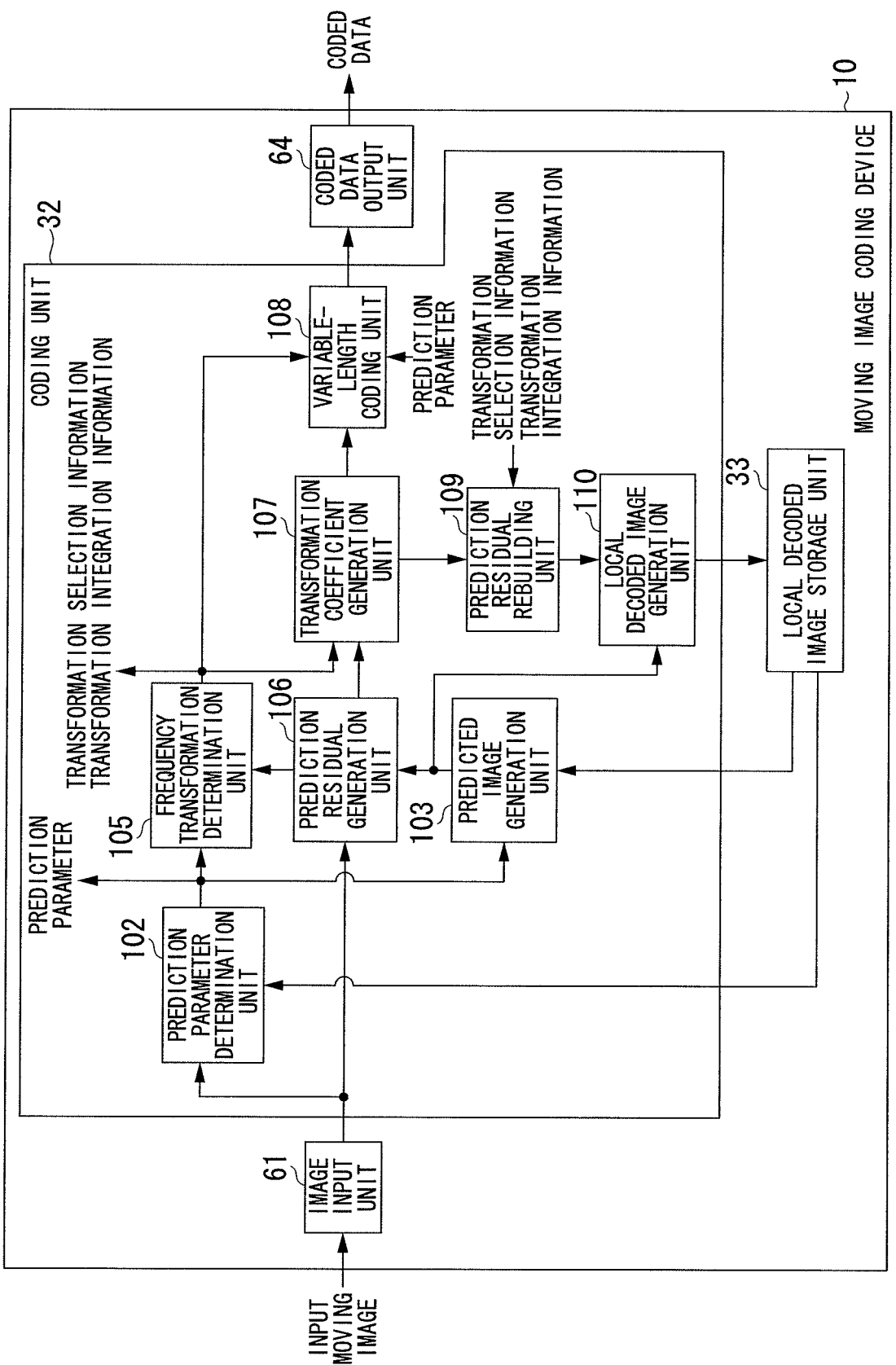
FIG. 2 is a functional block configuration diagram showing a functional block configuration of a moving image coding device 10 in the first embodiment.

FIG. 2 is a functional block configuration diagram showing a functional block configuration of the moving image coding device 10.

In FIG. 2, the moving image coding device 10 includes the image input unit 61, a coding unit 32, a local decoded image storage unit 33, and the coded data output unit 64. The coding unit 32 includes a prediction parameter determination unit (a partition structure determination unit) 102, a predicted image generation unit 103, a prediction residual generation unit 106, a frequency transformation determination unit (a frequency transformation region division unit) 105, a transformation coefficient generation unit 107, a variable-length coding unit 108, a prediction residual rebuilding unit 109, and a local decoded image generation unit 110.

In FIG. 2, the same reference numerals (61 and 64) are given to parts corresponding to the respective units of FIG. 1.

When the moving image is input, the image input unit 61 divides the input moving image in units of macro blocks, as described with reference to FIG. 1. The image input unit 61 outputs the divided image for each macro block to the prediction parameter determination unit 102 and the prediction residual generation unit 106 of the coding unit 32.

The coding unit 32 is realized by the central processing unit 62 of FIG. 1 executing a program. For simplicity of FIG. 2, the central processing unit 62 of FIG. 1 is not shown in FIG. 2, The coding unit 32 generates coded data for each macro block from the image that is divided in units of macro blocks and output by the image input unit 61.

In the coding unit 32, the prediction parameter determination unit 102, the predicted image generation unit 103, and the prediction residual generation unit 106 perform interframe prediction as in H.264/AVC.

The prediction parameter determination unit 102 selects a reference image from among the local decoded images stored in the local decoded image storage unit 33 based on a pixel value of the image of the macro block unit output from the image input unit 61, and generates a prediction parameter, which is a parameter for generating a predicted image, from the reference image. The prediction parameter will be described later. Since the moving image coding device 10 stores the same local decoded images as the moving image decoding device 20, the moving image coding device 10 performs a frequency transformation on a prediction residual that is a difference between an image of a macro block, which is a processing target, and the predicted image, performs an inverse frequency transformation to rebuild the prediction residual, sums the rebuilt prediction residual and the predicted image to generate the local decoded image, and stores the local decoded image in the local decoded image storage unit 33. The prediction parameter determination unit 102 outputs the generated prediction parameter to the frequency transformation determination unit 105, the predicted image generation unit 103 and the variable-length coding unit 108.

The predicted image generation unit 103 generates the predicted image from the reference image selected by the prediction parameter determination unit 102 based on the prediction parameter output by the prediction parameter determination unit 102. The predicted image is an image that approximates each pixel value of the macro block that is the processing target in the input moving image. Since the prediction residual generation unit 106 obtains a difference for each pixel between the pixel value of the macro block that is the processing target in the input moving image and the pixel value of the predicted image to thereby generate the prediction residual, redundancy of the pixel values of the input moving image for this prediction residual can be reduced and a code amount of the coded data generated by the moving image coding device 10 can be suppressed.

The predicted image generation unit 103 outputs the generated predicted image to the prediction residual generation unit 106 and the local decoded image generation unit 110.

The prediction residual generation unit 106 obtains a difference in each pixel value between the image of the macro block unit output from the image input unit 61 and the predicted image output from the predicted image generation unit 103 to generate the prediction residual, and outputs the generated prediction residual to the frequency transformation determination unit 105 and the transformation coefficient generation unit 107.

The frequency transformation determination unit 105 determines a frequency transformation method for the prediction residual output from the prediction residual generation unit 106 based on the prediction parameter output from the prediction parameter determination unit 102, and outputs transformation selection information and transformation integration information indicating the determined frequency transformation method to the transformation coefficient generation unit 107, the prediction residual rebuilding unit 109, and the variable-length coding unit 108.

The transformation coefficient generation unit 107 performs a frequency transformation on the prediction residual output by the prediction residual generation unit 106 based on the frequency transformation method output by the frequency transformation determination unit 105 to generate a transformation coefficient. The transformation coefficient generation unit 107 outputs the generated transformation coefficient to the variable-length coding unit 108 and the prediction residual rebuilding unit 109.

The variable-length coding unit (a lossless coding unit) 108 performs variable-length coding on the prediction parameter output from the prediction parameter determination unit 102, the transformation selection information and the transformation integration information output from the frequency transformation determination unit 105, and the transformation coefficient output from the transformation coefficient generation unit 107 to generate coded data. Further, as will be described later, the coding performed by the variable-length coding unit 108 is not limited to variable-length coding and may be lossless coding. Here, lossless coding is coding allowing decoding to be performed without loss of information.

The variable-length coding unit 108 outputs the generated coded data to the coded data output unit 64.

The prediction residual rebuilding unit 109 performs an inverse frequency transformation on the transformation coefficient output from the transformation coefficient generation unit 107 based on the transformation selection information and the transformation integration information input from the frequency transformation determination unit 105 to rebuild the prediction residual. The prediction residual rebuilding unit 109 outputs the rebuilt prediction residual to the local decoded image generation unit 110.

The local decoded image generation unit 110 obtains a sum of pixel values of the predicted image output from the predicted image generation unit 103 and the rebuilt prediction residual output by the prediction residual rebuilding unit 109 to generate a local decoded image. The local decoded image generation unit 110 writes the generated local decoded image to the local decoded image storage unit 33.

The local decoded image storage unit 33 is realized using the memory 63 of FIG. 1, and stores the local decoded image output from the local decoded image generation unit 110. At a time when the moving image coding device 10 processes a specific macro block of a specific frame of the input moving image, a local decoded image of an earlier coded frame than the frame that is the processing target and a local decoded image of an earlier coded macro block in the same frame as the frame of the macro block that is the processing target are stored in the local decoded image storage unit 33.

The coded data output unit 64 outputs the coded data output from the variable-length coding unit 108 to the outside of the moving image coding device 10, as described with reference to FIG. 1.

Next, operation of the moving image coding device 10 will be described.

Figure 3:
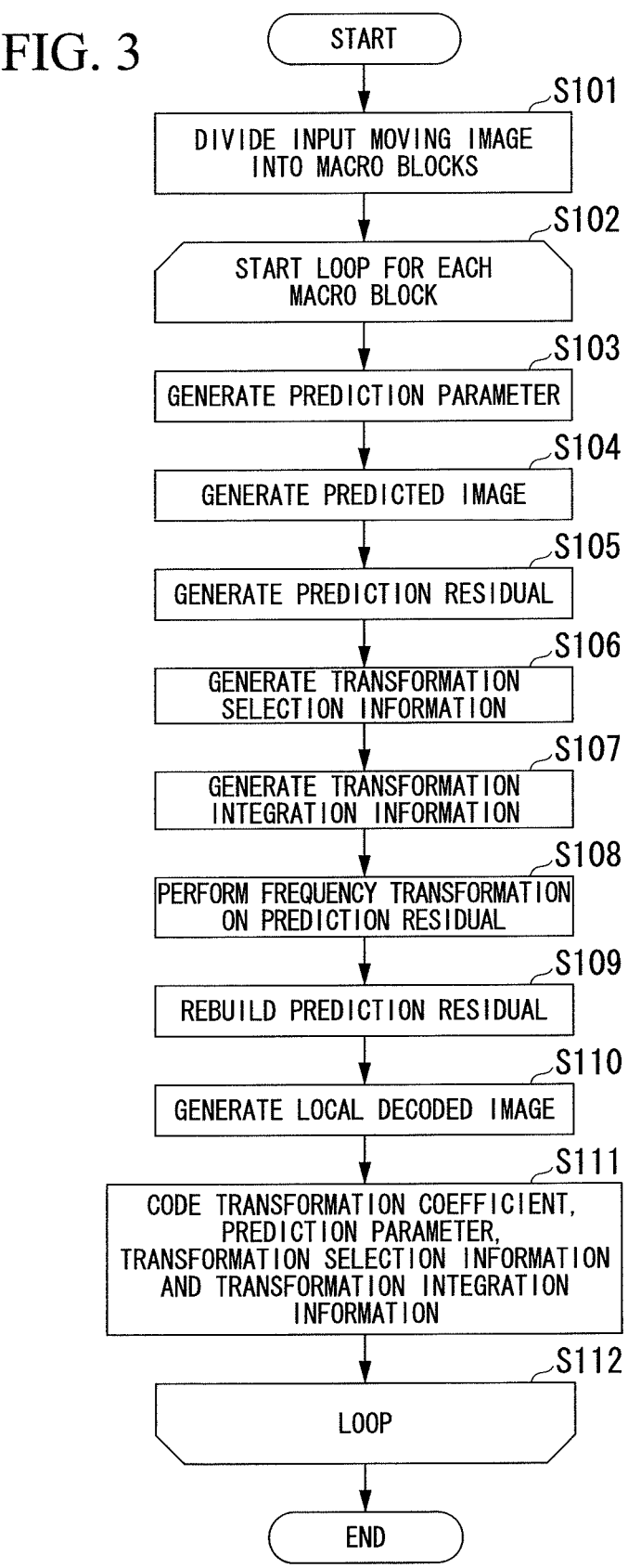
FIG. 3 is a flowchart showing a procedure of a process in which the moving image coding device 10 generates coded data in the first embodiment.

FIG. 3 is a flowchart showing a procedure of a process in which the moving image coding device 10 generates the coded data. When a moving image is input to the image input unit 61, the moving image coding device 10 starts a coded data generation process.

In step S101, the image input unit 61 divides the input moving image in units of macro blocks. The moving image coding device 10 divides a frame of the input moving image in units of macro blocks and creates coded data for each macro block. Accordingly, the image input unit 61 divides the frame of the input moving image into macro blocks of 16 horizontal pixels×16 vertical pixels.

Figure 4:
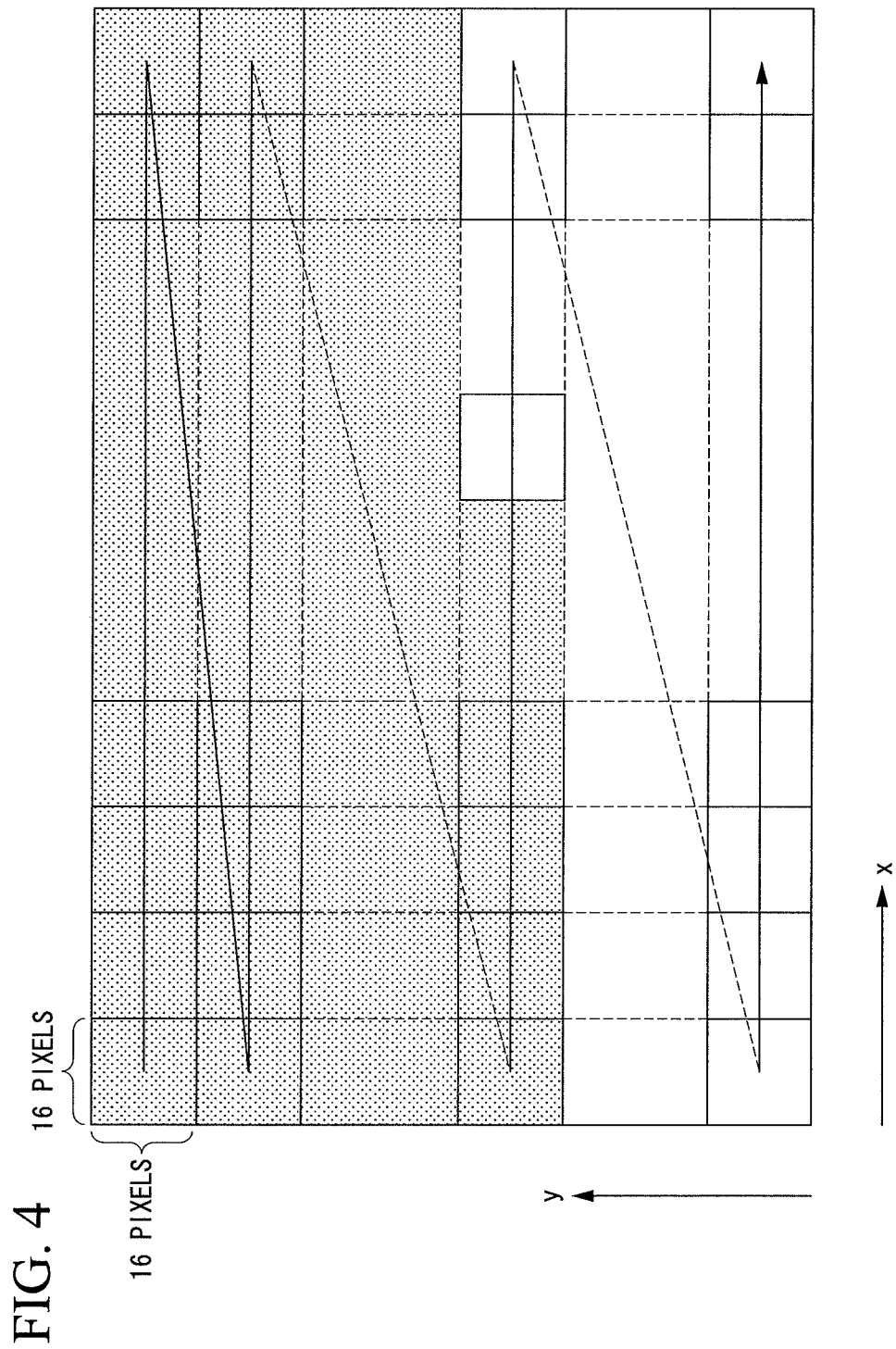
FIG. 4 is a diagram showing order of an image input unit 61 dividing a frame of an input moving image in units of macro blocks and outputting the divided images in the first embodiment.

FIG. 4 is a diagram showing order of the image input unit 61 dividing the frame of the input moving image in units of macro blocks and outputting the divided images. FIG. 4 shows one frame of the moving image. In FIG. 4, an x axis is taken as horizontal and a right direction is a positive direction of the x axis. Further, a y axis is taken as vertical and an upward direction is a positive direction of the y axis. The image input unit 61 divides one frame into a row of every 16 pixels and a column of every 16 pixels, and each region of 16 horizontal pixels×16 vertical pixels divided into rows and columns corresponds to a macro block. As indicated by an arrow, the image input unit 61 outputs image data in units of macro blocks in order from left to right in the same row and performs the same for each row from top to bottom. The image input unit 61 performs this process on each frame of the input moving image in order of the input frames.

The image input unit 61 outputs the divided data to the prediction parameter determination unit 102 and the prediction residual generation unit 106.

Alternatively, the image input unit 61 may divide the image data in units of macro blocks each having a size other than 16 horizontal pixels×16 vertical pixels. For example, the other size may be 12 horizontal pixels×12 vertical pixels, or the number of horizontal pixels may differ from that of vertical pixels, such as 16 horizontal pixels×12 vertical pixels. Alternatively, the image input unit 61 may output the image data of the macro block unit in an order other than the order shown in FIG. 4. For example, the image input unit 61 may output the image data in an order from top to bottom in the same row and perform this for one column from left to right.

Returning to FIG. 3, in step S102, the moving image coding device 10 starts a loop of generating coded data for each macro block of the input image divided by the image input unit 61.

In steps S103 to S105, the prediction parameter determination unit 102, the predicted image generation unit 103 and the prediction residual generation unit 106 perform the same inter-frame prediction as the inter-frame prediction (motion compensation prediction or inter-prediction) defined in H.264/AVC.

In step S103, the prediction parameter determination unit 102 determines a partition structure to further divide the image data based on the pixel value of the image data output from the image input unit 61, selects a reference image for each partition, and generates a prediction parameter for generating a predicted image from the reference image. Here, the partition is a unit region when a predicted image is generated. As will be described later, the predicted image generation unit 103 generates a predicted image for each partition, and combines the generated predicted images to generate a predicted image of the macro block. Further, the reference image is an image from which the predicted image is generated, and the prediction parameter determination unit 102 selects the reference image from the local decoded images stored in the local decoded image storage unit 33. As described above, the local decoded image is a decoded image of the processed macro block.

Figure 5:
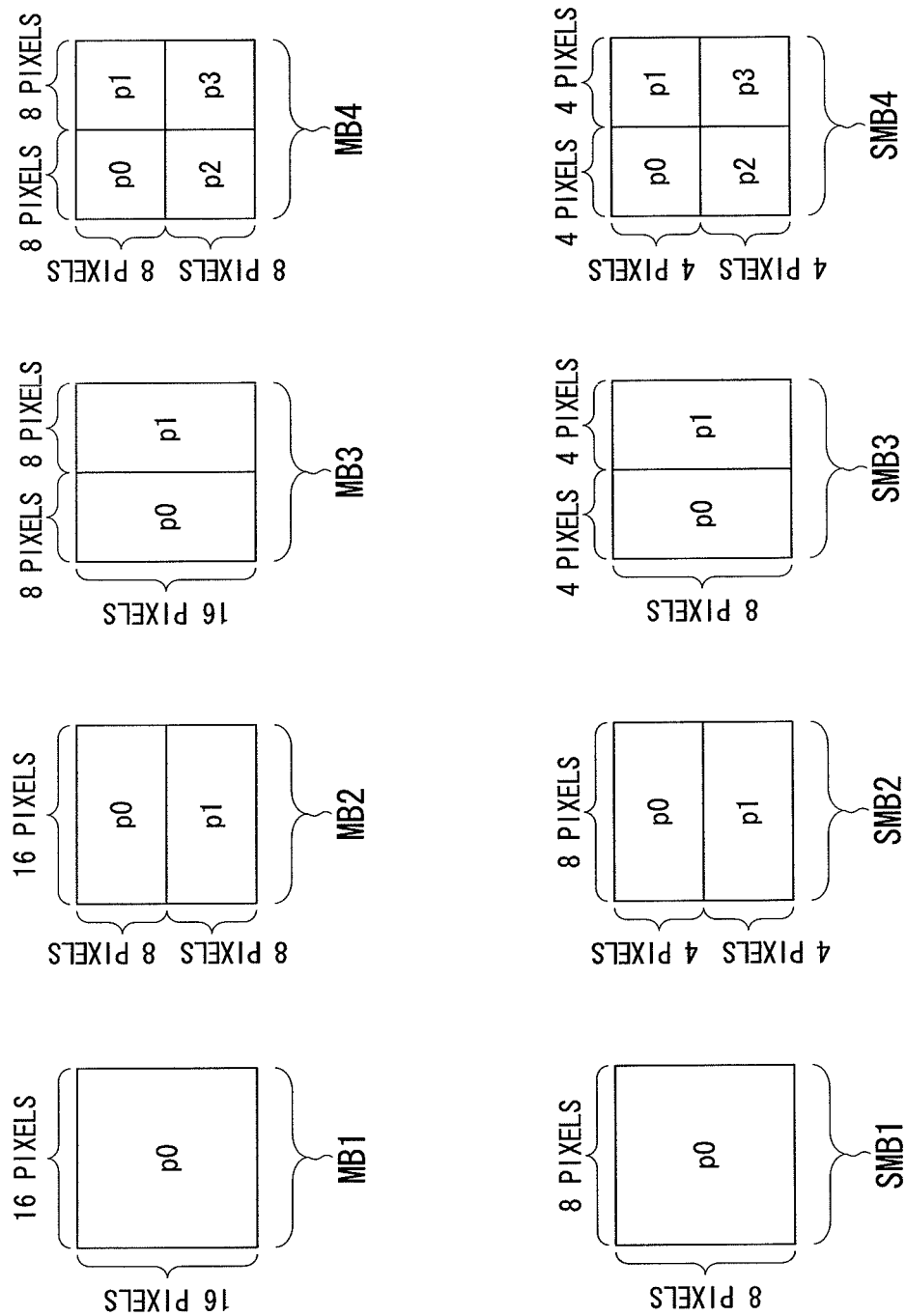
FIG. 5 is a diagram showing configurations of partitions into which a prediction parameter determination unit 102 divides image data of a macro block unit in the first embodiment.

FIG. 5 is a diagram showing configurations of partitions into which the prediction parameter determination unit 102 divides the image data of the macro block unit. In FIG. 5, the partition structures are partition structures defined in H.264/AVC, and the prediction parameter determination unit 102 selects any of the partition structures defined in H.264/AVC.

In FIG. 5, a partition configuration MB1 is a partition configuration of a 1-part division in which the macro block is not divided. In this case, the macro block includes one partition of 16 horizontal pixels×16 vertical pixels, and a partition index "p0" is given to this partition. Here, the partition index is an index for identifying the partition in the macro block.

Further, a partition configuration MB2 is a partition configuration of a horizontal 2-part division in which the macro block is divided in two in a horizontal direction. In this partition structure, the macro block includes two partitions of 16 horizontal pixels×8 vertical pixels. A partition index "p0" is given to the upper partition and a partition index "p1" is given to the lower partition.

A partition configuration MB3 is a partition structure of a vertical 2-part division in which the macro block is divided in two in a vertical direction. In this partition structure, the macro block includes two partitions each having 8 horizontal pixels×16 vertical pixels. A partition index "p0" is given to the left partition and a partition index "p1" is given to the right partition.

A partition structure MB4 is a partition structure of a 4-part division in which the macro block is divided in two in a horizontal direction and two in a vertical direction. In this partition structure, the macro block includes four partitions each having 8 horizontal pixels×8 vertical pixels. A partition index "p0" is given to the upper left partition, a partition index "p1" is given to the upper right partition, a partition index "p2" is given to a lower left partition, and a partition index "p3" is given to a lower right partition.

Further, each of the partitions in the partition structure MB4 is also referred to as a sub-macro block. The prediction parameter determination unit 102 further divides this sub-macro block into partitions. Hereinafter, each of the partitions constituting the sub-macro block is also referred to as a "sub-partition."

A partition structure SBM1 is a partition structure of a 1-part division in which the sub-macro block is not divided. In this partition structure, the sub-macro block includes a single sub-partition of 8 horizontal pixels×8 vertical pixels, and a sub-partition index "p0" is given to this sub-partition, Here, a sub-partition number is an index for identifying the sub-partition in the partition.

Further, a partition structure SMB2 is a partition structure of a horizontal 2-part division in which the sub-the macro block is divided in two in a horizontal direction. In this partition structure, the sub-macro block includes two partitions each having 8 horizontal pixels×4 vertical pixels. A sub-partition index "p0" is given to the upper sub-partition, and a sub-partition index "p1" is given to the lower sub-partition.

A partition structure SMB3 is a partition structure of a vertical 2-part division in which the sub-macro block is divided in two in a vertical direction. In this partition structure, the sub-macro block includes two sub-partitions each having 4 horizontal pixels×8 vertical pixels. A sub-partition index "p0" is given to the left sub-partition, and a sub-partition index "p1" is given to the right sub-partition.

A partition structure SMB4 is a partition structure of a 4-part division in which the sub-macro block is divided in two in horizontal direction and two in a vertical direction. In this partition structure, the sub-macro block includes four sub-partitions each having 4 horizontal pixels×4 vertical pixels. A sub-partition index "p0" is given to the upper left sub-partition, a sub-partition index "p1" is given to the upper right sub-partition, a sub-partition index "p2" is given to the lower left sub-partition, and a sub-partition index "p3" is given to the lower right sub-partition.

When each unit of the moving image coding device 10 and the moving image decoding device 20 performs a process on each partition in the macro block, the unit performs the process in order of the partition indexes of the partition structures MB1 to MB4 of FIG. 5. That is, the unit performs the process from the left partition to the right partition and repeats the same from top to bottom. Further, when the macro block has been divided into quarters, the unit processes sub-partitions in a sub-macro block in order of the sub-partition indexes of the partition structures MB1 to MB4 of FIG. 5 and repeats the same for each sub-macro block in order of the partition indexes of the partition structure MB4 of FIG. 5.

Figures 6, 7:
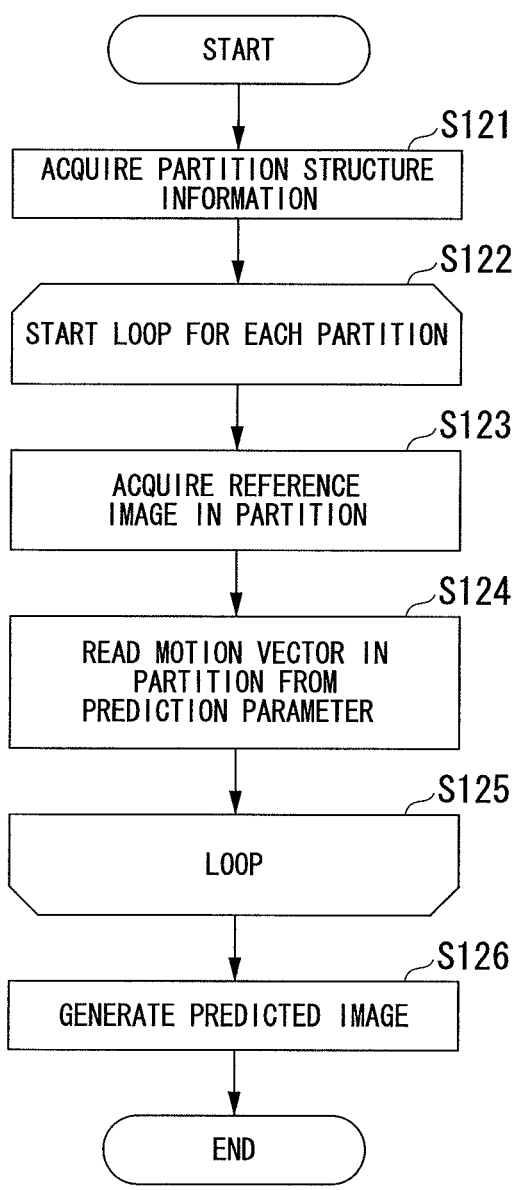
FIG. 6 is a data structure diagram showing a data structure of a prediction parameter generated by the prediction parameter determination unit 102 in the first embodiment.
FIG. 7 is a flowchart showing a procedure of a process in which a predicted image generation unit 103 generates a predicted image used for a macro block that is a processing target in the first embodiment.

FIG. 6 is a data structure diagram showing a data structure of the prediction parameter generated by the prediction parameter determination unit 102. As shown in FIG. 6, the prediction parameter includes partition structure information, a reference image index as motion information of each partition, and information of a motion vector.

The partition structure information is information indicating the partition structure selected by the prediction parameter determination unit. For example, in FIG. 6, "16× 8" in "P_L0_L0_16×8" indicates that the macro block is divided into two partitions each having a size of 16 horizontal pixels×8 vertical pixels. That is, the macro block is divided into the respective partitions indicated by the partition structure MB2 of FIG. 5. "L0_L0" indicates that both of the two partitions use reference image list 0. Further, "P" indicates a block that is coded using only forward prediction.

The reference image index is an index of the local decoded image that is used as a reference image for each partition. For example, in FIG. 6, "2" in "2, 0" indicates that the local decoded image having the index 2 in a reference image list (which is reference image list 0 herein, as described above) is used as the reference image of a first partition (the partition having the partition index "p0" in the partition structure MB2 of FIG. 5). Similarly, "0" indicates that the local decoded image having the index 0 in reference image list 0 is used as the reference image of a second partition (the partition having the partition index "p1" in the partition structure MB2 of FIG. 5).

The motion vector indicates a shift amount of the pixel of the reference image in the motion compensation. For example, in FIG. 6, "(0.25, −1.25)" in "(0.25, −1.25), (0.0, 0.75)" indicates that a first partition part in the predicted image is generated by shifting the reference image 0.25 pixels to the right and 1.25 pixels downward. Further, "(0.0, 0.75)" indicates that a second partition part in the predicted image is generated by shifting the reference image 0.75 pixels upward without shifting the reference image to the left or right.

Further, for a macro block subjected to backward prediction, as well as the forward prediction, the prediction parameter determination unit 102 generates a prediction parameter containing two reference image numbers and two motion vectors for each partition.

If it is determined that the intra-prediction is to be performed, the prediction parameter determination unit 102 generates a prediction parameter indicating a predicted image generating method in the intra-prediction. However, a description thereof will be omitted herein. Here, the intra-prediction refers to a method of generating a predicted image for a macro block for which inter-frame prediction is not used, through interpolation from pixels within the same frame of an input moving image that are adjacent to the macro block and are subjected to coding and decoding.

The prediction parameter determination unit 102 generates the prediction parameter using a rate distortion determination. Specifically, the prediction parameter determination unit 102 generates prediction parameter candidates that may be obtained by all possible combinations of the partition structure, the reference image, and the motion vector. The prediction parameter determination unit 102 calculates a rate distortion cost C for each of the generated prediction parameter candidates based on Equation (1), and selects the prediction parameter candidate in which the rate distortion cost C is minimal as the prediction parameter.

$$C = D + \lambda R \qquad (1)$$

Here, R denotes a code amount when coding is performed based on the prediction parameter candidate. Further, D denotes a mean squared error between the pixel value of the input image of the macro block unit and a pixel value of the local decoded image that may be obtained when coding and decoding have been performed based on the prediction parameter candidate. Further, $\lambda$ has a predetermined value, and indicates a weight coefficient between the code amount R and the error D. The prediction parameter determination unit, for example, calculates the code amount R and the error D by actually performing coding and decoding based on the prediction parameter candidate.

Further, if there are a plurality of frequency transformations that can be applied when the prediction parameter determination unit 102 calculates the rate distortion cost C, the rate distortion cost is calculated for all the frequency transformations that can be applied and a minimum rate distortion cost is selected as the rate distortion cost of the prediction parameter candidate. Alternatively, a rate distortion cost that may be obtained by applying a prescribed specific frequency transformation may be selected as the rate distortion cost of the prediction parameter candidate.

The prediction parameter determination unit 102 outputs the generated prediction parameter to the frequency transformation determination unit 105, the predicted image generation unit 103, and the variable-length coding unit 108.

Returning to FIG. 3, in step S104, the predicted image generation unit 103 generates the predicted image based on the prediction parameter output from the prediction parameter determination unit 102. As described above, the predicted image is an image that approximates the image of the macro block that is the processing target.

FIG. 7 is a flowchart showing a procedure of a process in which the predicted image generation unit 103 generates the predicted image used for the macro block that is the processing target in step S104 of FIG. 3.

In step S121, the predicted image generation unit 103 reads the partition structure information from the prediction parameter.

In step S122, the predicted image generation unit 103 starts a loop for a process for each partition of steps S123 and S124. The predicted image generation unit 103 processes each partition in the order described with reference to FIG. 6 (the same applies to the following flowchart).

In step S123, the predicted image generation unit 103 reads the reference image index of the partition that is the processing target from the prediction parameter, and reads the reference image from the local decoded image storage unit 33 based on the read reference image index.

In step S124, the predicted image generation unit 103 reads the motion vector of the partition that is the processing target from the prediction parameter, and performs motion compensation on the reference image based on the read motion vector. Specifically, the predicted image generation unit 103 shifts the reference image by pixels indicated by the motion vector.

In step S125, if there is an outstanding partition, the loop from step S122 is repeated, and if there is no outstanding partition, the process proceeds to step S126.

In step S126, the predicted image generation unit 103 connects corresponding partition parts of the respective reference images subjected to the motion compensation to generate a predicted image, and outputs the generated predicted image to the prediction residual generation unit 106 and the local decoded image generation unit 110.

Then, the process of generating the predicted image used for the macro block ends.

Returning to FIG. 3, in step S105, the prediction residual generation unit 106 subtracts a pixel value of each pixel of the predicted image output from the predicted image generation unit 103 from the pixel value of each corresponding pixel of the input image of the macro block unit output from the image input unit 61 to generate a prediction residual. The prediction residual is two-dimensional data of the same size as the macro block. As described above, a difference between the pixel value of the macro block that is the processing target in the input image and the pixel value of the predicted image is obtained for each pixel to generate the prediction residual, thereby reducing redundancy of the pixel values of the input image and suppressing a code amount of the coded data generated by the moving image coding device 10.

The prediction residual generation unit 106 outputs the generated prediction residual to the frequency transformation determination unit 105 and the transformation coefficient generation unit 107.

In step S106, the frequency transformation determination unit 105 selects a frequency transformation to apply the prediction residual output from the prediction residual generation unit 106 to each partition divided in the partition structure determined by the prediction parameter determination unit 102, and generates transformation selection information indicating the selected frequency transformation.

Figures 8, 9:
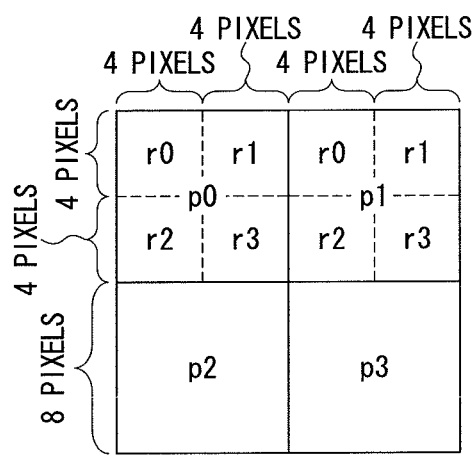
FIG. 8 is a diagram showing a configuration example of a transformation target region determined by a frequency transformation selected by a frequency transformation determination unit 105 in the first embodiment.
FIG. 9 is a data structure diagram showing a data structure of transformation selection information generated by the frequency transformation determination unit 105 in the first embodiment.

FIG. 8 is a diagram showing a configuration example of a transformation target region determined by the frequency transformation selected by the frequency transformation determination unit 105. Here, the transformation target region is a region in the macro block that is transformed into a transformation coefficient by one frequency transformation. FIG. 8 shows an example in which the frequency transformation determination unit 105 determines that, among four partitions p0 to p3 each having 8 horizontal pixels×8 vertical pixels in the macro block, 4×4 DCT is applied to the partitions p0 and p1 and 8×8 DCT is applied to the partitions p2 and p3.

When a size of the frequency transformation is smaller than that of the partition as in the partition p0 or p1 in FIG. 8, the frequency transformation determination unit 105 divides a partition of the prediction residual into respective regions of a size of the frequency transformation. Each divided region is the transformation target region. For example, in FIG. 8, the partition p0 is divided into four transformation target regions r0 to r3. On the other hand, when the size of the partition is the same as the size of the frequency transformation as in the partition p2 or p3 in FIG. 8, the entire region divided by the partition becomes one transformation target region. Each unit of the moving image coding device 10 and the moving image decoding device 20 processes the transformation target regions in the same partition in order from the left transformation target region to the right transformation target region, and repeats this process in order from top to bottom. Further, when transformation target regions are processed over a plurality of partitions, the process is performed in order from the left partition to the right partition and repeated in order from the upper partition to the lower partition.

The same applies to a moving image coding device and a moving image decoding device, which will be described hereinafter.

FIG. 9 is a data structure diagram showing a data structure of the transformation selection information generated by the frequency transformation determination unit 105. The transformation selection information indicates frequency transformation applied to each partition in the macro block.

As shown in FIG. 9, the transformation selection information contains information indicating the frequency transformations applied to respective partitions, which are arranged according to order of the partitions. In FIG. 9, an example of the transformation selection information when the frequency transformation determination unit 105 selects the frequency transformation described with reference to FIG. 8 as the frequency transformation applied to each partition is shown. "4×4" in columns of the partitions p0 and p1 indicates that 4×4 DCT is applied to the partitions p0 and p1 and "8×8" in columns of the partitions p2 and p3 indicates that 8×8 DCT is applied to the partitions p2 and p3.

Figure 10:
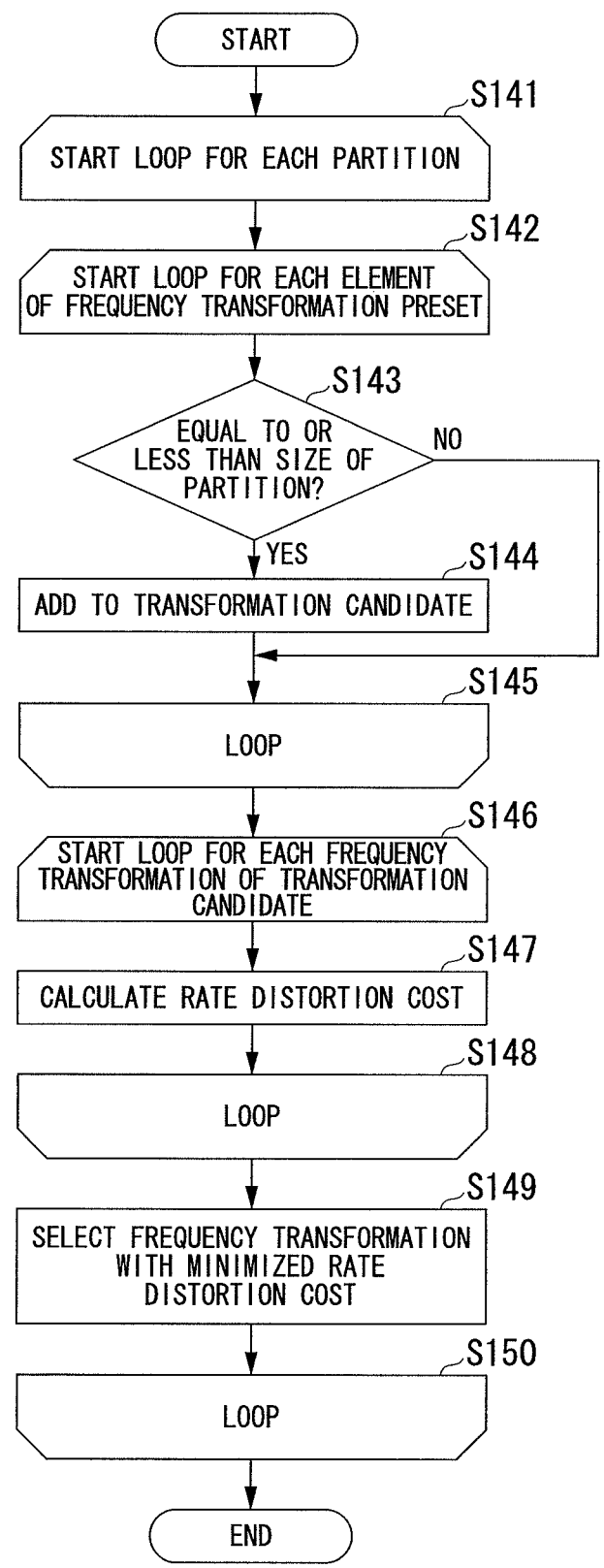
FIG. 10 is a flowchart showing a procedure in which the frequency transformation determination unit 105 selects a frequency transformation for each partition in the macro block in the first embodiment.

FIG. 10 is a flowchart showing a procedure in which the frequency transformation determination unit 105 selects a frequency transformation for each partition in the macro block.

In step S141, the frequency transformation determination unit 105 starts a loop of a process for each partition.

That is, first, in steps S142 to S145, the frequency transformation determination unit 105 selects candidates of a frequency transformation applied to the partition.

In step S142, the frequency transformation determination unit 105 starts a loop of a process for each element of a transformation preset. Here, the transformation preset refers to a set of all frequency transformations that can be applied to the macro block by the moving image coding device 10. The moving image coding device 10 includes, as elements of the transformation preset, seven types of frequency transformations: 4×8 DCT, 8×4 DCT, 16×16 DCT, 16×8 DCT, and 8×16 DCT, as well as 4×4 DCT and 8×8 DCT in H.264/AVC. Here, m×n DCT refers to a discrete cosine transform in which a frequency transformation size (the number of vertical and horizontal pixels of a frequency transformation target region; also referred to hereinafter as "transformation size") is m horizontal pixels×n vertical pixels.

Further, the transformation preset of the moving image coding device 10 is not limited to the above set and may be a subset of the set. Alternatively, frequency transformations including discrete cosine transforms of other transformation sizes, such as 4×16 DCT or 16×4 DCT, may be included in the transformation preset, and frequency transformations other than the discrete cosine transform, such as frequency transformations including Hadamard transforms, sine transformations, wavelet transforms, and similar transformations, may be included in the transformation preset.

In step S143, the frequency transformation determination unit 105 determines whether vertical and horizontal sizes of the frequency transformation that is a processing target in a loop from step S142 are both equal to or less than the size of the partition. If the sizes are equal to or less than the size of the partition (step S143: YES), the process proceeds to step S144, and otherwise (step S143: NO), the process proceeds to step S145.

In step S144, the frequency transformation determination unit 105 adds the frequency transformation that is a processing target in a loop from step S142 as a candidate of the frequency transformation to be applied to the partition (hereinafter referred to as "transformation candidate"). For example, for a partition of 16 horizontal pixels×8 vertical pixels, the frequency transformation determination unit 105 selects 4×4 DCT, 8×8 DCT, 4×8 DCT, 8×4 DCT and 16×8 DCT, which are equal to or less than 16 horizontal pixels×8 vertical pixels, in the transformation preset as the transformation candidates.

Further, the number of transformation candidates selected by the frequency transformation determination unit 105 can be reduced. For example, for a partition of 16 horizontal pixels×8 vertical pixels, only 4×4 DCT and 8×8 DCT may be selected as the transformation candidates. For example, the number of transformation candidates can be reduced by reducing the number of elements of the transformation preset. A subsequent processing amount can be reduced by reducing the number of transformation candidates. Further, a code length of the index indicating the frequency transformation can be decreased by reducing the number of elements of the transformation preset and an increase in code amount can be suppressed.

In step S145, if there is an outstanding frequency transformation among the elements of the transformation preset, the loop from step S142 is repeated, and if there is no outstanding frequency transformation, the process proceeds to step S146.

In steps S146 to S149, the frequency transformation determination unit 105 calculates a rate distortion cost of each of the transformation candidates, and selects the frequency transformation in which the rate distortion cost is minimal as the frequency transformation to be applied to the partition.

That is, first, in step S146, the frequency transformation determination unit 105 starts a loop of a process for each transformation candidate selected in the loop of steps S142 to S145.

In step S147, the frequency transformation determination unit 105 calculates the rate distortion cost of the frequency transformation that is the processing target in the loop from step S146 based on Equation (1) described above.

In step S148, if there is an outstanding frequency transformation among the transformation candidate elements, the loop from step S146 is repeated, and if there is no outstanding frequency transformation, the process proceeds to step S149.

In step S149, the frequency transformation determination unit 105 selects the frequency transformation in which the rate distortion cost is minimal as frequency transformation to be applied to the partition.

In step S150, if there is an outstanding partition, the loop from step S141 is repeated, and if there is no outstanding partition, the process of selecting a frequency transformation for each partition in the macro block ends.

Returning to FIG. 3, in step S107, the frequency transformation determination unit 105 generates transformation integration information indicating a region obtained by integrating the transformation target regions included in the different partitions, that is, the transformation target regions across the partitions. Specifically, the frequency transformation determination unit 105 determines whether transformation target regions determined by selecting the frequency transformation in step S106 are to be integrated for each combination of two adjacent transformation target regions in the macro block, and generates transformation integration information indicating transformation target regions to be integrated.

As the frequency transformation determination unit 105 determines that a plurality of adjacent regions with the partition boundary interposed therebetween are to be integrated and the transformation coefficient generation unit 107 performs the frequency transformation on the prediction residual according to the determination of the frequency transformation determination unit 105, the moving image coding device 10 performs the frequency transformation on the region obtained by integrating the plurality of the adjacent regions with the partition boundary interposed therebetween, thus improving coding efficiency.

Figure 11:
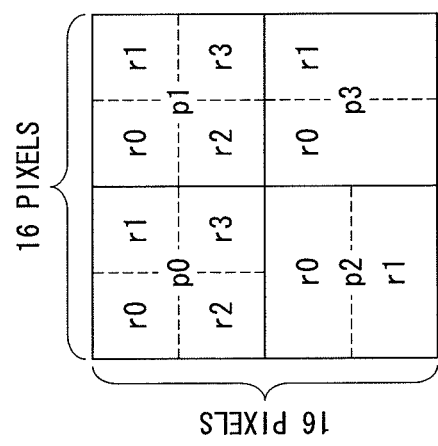
FIG. 11 is a diagram showing an example of an integrated transformation target region in the first embodiment.

FIG. 11 is a diagram showing an example of the integrated transformation target regions. In FIG. 11(a), a macro block is divided into four partitions (sub-macro blocks) p0 to p3. The frequency transformation determination unit 105 determines that 4×4 DCT is applied to partitions p0 and p1 and accordingly, each of the partitions p0 and p1 is divided into four transformation target regions r0 to r3 each having 4 horizontal pixels×4 vertical pixels. Further, the frequency transformation determination unit 105 determines that 8×4 DCT is applied to the partition p2, and the partition p2 is divided into two transformation target regions each having 8 horizontal pixels×4 vertical pixels. Further, the frequency transformation determination unit 105 determines that 4×8 DCT is applied to the partition p3, and the partition p3 is divided into two transformation target regions each having 4 horizontal pixels×8 vertical pixels.

FIG. 11(b) shows an example in which the frequency transformation determination unit 105 determines that the transformation target region r1 of the partition p0 and the transformation target region r0 of the partition p1 among the transformation target regions shown in FIG. 11(a) are to be integrated.

FIGS. 11(c) to (f) show other examples of integrated transformation target regions. In FIG. 11(c), each of a partition p2 and a partition p3 is divided into two transformation target regions r0 and r1 each having 8 horizontal pixels×4 vertical pixels, and the transformation target region r0 of the partition p2 and the transformation target region r1 of the partition p3 are integrated. In FIG. 11(d), each of a partition p0 and a partition p1 is divided into four transformation target regions r0, r1, r2 and r3 each having 8 horizontal pixels×4 vertical pixels, and the transformation target region r2 of the partition p0 and the transformation target region r0 of the partition p1 are integrated. In FIG. 11(e), each of a partition p1 to a partition p3 constitutes a transformation target region, and the partition p1 and the partition p3 are integrated. In FIG. 11(f), each of a partition p0 to a partition p3 is divided into four transformation target regions r0, r1, r2 and r3 each having 4 horizontal pixels×4 vertical pixels, and the transformation target region r3 of the partition p0, the transformation target region r2 of the partition p1, the transformation target region r1 of the partition p2, and the transformation target region r0 of the partition p3 are integrated. Further, the integration of the transformation target regions shown in FIG. 11 is one example, and the integration of the transformation target regions determined by the frequency transformation determination unit 105 is not limited thereto.

Figures 12, 13:
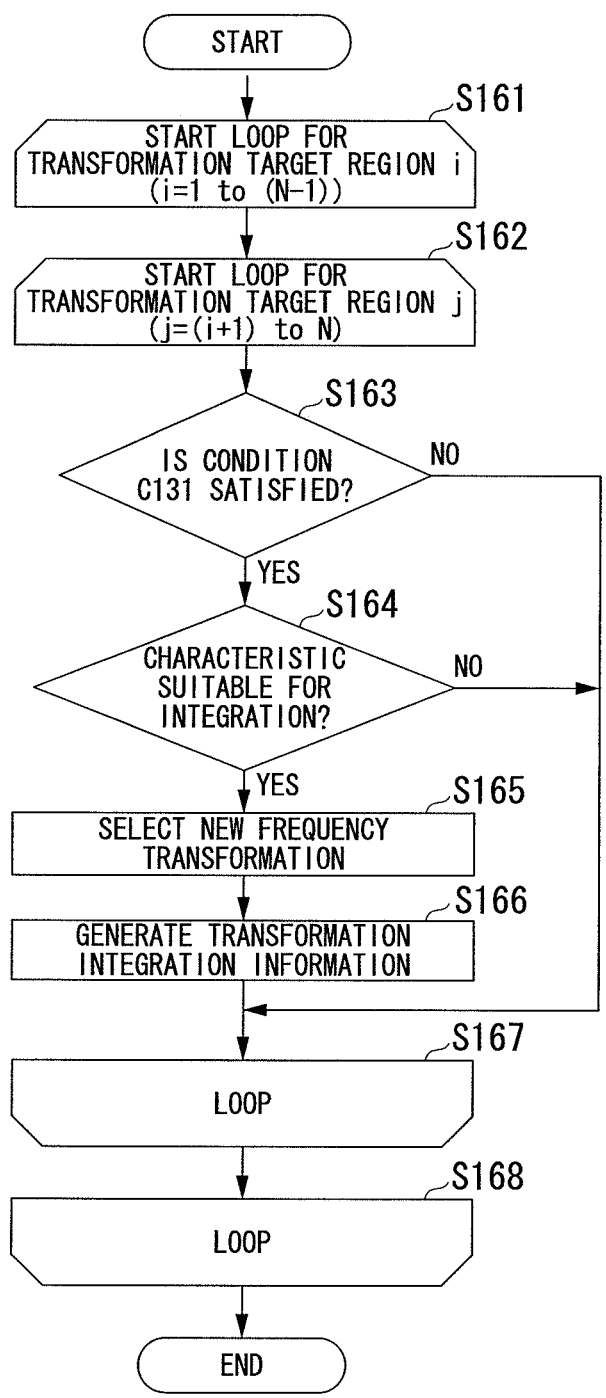
FIG. 12 is a data structure diagram showing a data structure of transformation integration information in the first embodiment.
FIG. 13 is a flowchart showing a procedure of a process in which the frequency transformation determination unit 105 determines whether the transformation target regions in the macro block are to be integrated in the first embodiment.

FIG. 12 is a data structure diagram showing a data structure of the transformation integration information. The transformation integration information is information indicating regions determined to be integrated by the frequency transformation determination unit 105 and frequency transformations applied to the regions.

As shown in FIG. 12, the transformation integration information includes a partition index, an integration target region index, an integration direction index, and frequency transformation information. The frequency transformation determination unit 105 generates the transformation integration information for each integration of the transformation target regions.

The partition index is an index indicating a partition containing the region having earlier processing order among the regions to be integrated. The integration target region index is an index indicating a position in the partition of the region having earlier processing order among the regions to be integrated. A position in the macro block of the region having earlier processing order among the regions to be integrated is indicated by the partition index and the integration target region index. The integration direction index is an index indicating a direction of a region having a later processing order among the regions to be integrated, when viewed from the region having earlier processing order among the regions to be integrated.

For example, the transformation integration information of FIG. 12 indicates that the partition p0 contains the region r1 to be integrated, and the region r1 of the partition p0 and an adjacent right region are integrated in the case of FIG. 11(b).

The frequency transformation information is information indicating the frequency transformation applied to the regions to be integrated. In the example of FIG. 12, 8×4 DCT is applied to the regions to be integrated.

Further, the transformation integration information generated by the frequency transformation determination unit 105 is not limited to the transformation integration information having the structure of FIG. 12 and may be any transformation integration information indicating the regions to be integrated. For example, the transformation integration information may contain a set of a partition index of all regions to be integrated and an integration target region index, and information of frequency transformation applied to the regions to be integrated.

FIG. 13 is a flowchart showing a procedure in which the frequency transformation determination unit 105 determines regions to be integrated among transformation target regions within the macro block. The frequency transformation determination unit 105 determines the regions to be integrated among the transformation target regions of the prediction residual of the macro block unit based on pixel values of the predicted image of the macro block unit output from the predicted image generation unit 103. The pixel values of the predicted image are used rather than the pixel values of the prediction residual so that the moving image decoding device 20 makes the same determination.

In step S161, the frequency transformation determination unit 105 starts a loop of performing a process on a transformation target region i (i is an integer of 0 to (N−2) and N is the number of transformation target regions within the macro block), Here, the number given to the transformation target region is a number according to the order of processing the transformation target region described with reference to FIG. 8.

In step S162, the frequency transformation determination unit 105 starts a loop of performing a process on a transformation target region j (j is an integer of (i+1) to N).

In step S163, the frequency transformation determination unit 105 determines whether the following condition C131 is satisfied.

Condition C131: The transformation target region i and the transformation target region j are adjacent to each other. Further, the transformation target region i and the transformation target region j are included in different partitions. Further, a region obtained by combining the transformation target region i and the transformation target region j is a rectangle.

Based on this determination, the frequency transformation determination unit 105 sets only regions across the partitions as processing targets of the following steps S165 and S167.

If it is determined that the condition C131 is satisfied (step S163: YES), the process proceeds to step S164, and if it is determined that the condition C131 is not satisfied (step S163: NO), the process proceeds to step S167.

In step S164, the frequency transformation determination unit 105 determines whether the transformation target region i and the transformation target region j have a characteristic suitable for integration. The frequency transformation determination unit 105 determines whether a spatial correlation of the prediction residual between the transformation target region i and the transformation target region j is high based on similarity between pixel values of regions of a predicted image corresponding to the transformation target region i and the transformation target region j. Specifically, the predicted image of the macro block unit input from the predicted image generation unit 103 is divided into the same partitions and transformation target regions as the prediction residual. The frequency transformation determination unit 105 determines whether Equation (2) is satisfied, in which a length of a pixel unit of a boundary b between the transformation target region r1 and the transformation target region r2 of the predicted image is M, a pixel value of a pixel in contact with the boundary b that belongs to the transformation target region r1 is brv1[i] (i is a positive integer of 1 to M), a pixel value of a pixel in contact with the boundary b that belongs to the transformation target region r2 is brv2[i], and a threshold for the determination is Th.

$$\sum_{i=1}^{N} |brv1[i] - brv2[i]| < Th \qquad (2)$$

In Equation (2), as an absolute value |brv1[i]−brv2[i]| of a difference between pixel values of adjacent pixels is smaller, the spatial correlation between the transformation target region i and the transformation target region j is expected to be high. The frequency transformation determination unit 105 determines whether the spatial correlation in a region that is a target is high, using Equation (2) as an index indicating the spatial correlation. If it is determined that Equation (2) is satisfied, the frequency transformation determination unit 105 determines that the transformation target region i and the transformation target region j have a high spatial correlation and are regions suitable for integration, and determines that the transformation target region i and the transformation target region j are to be integrated.

Figures 14, 15:
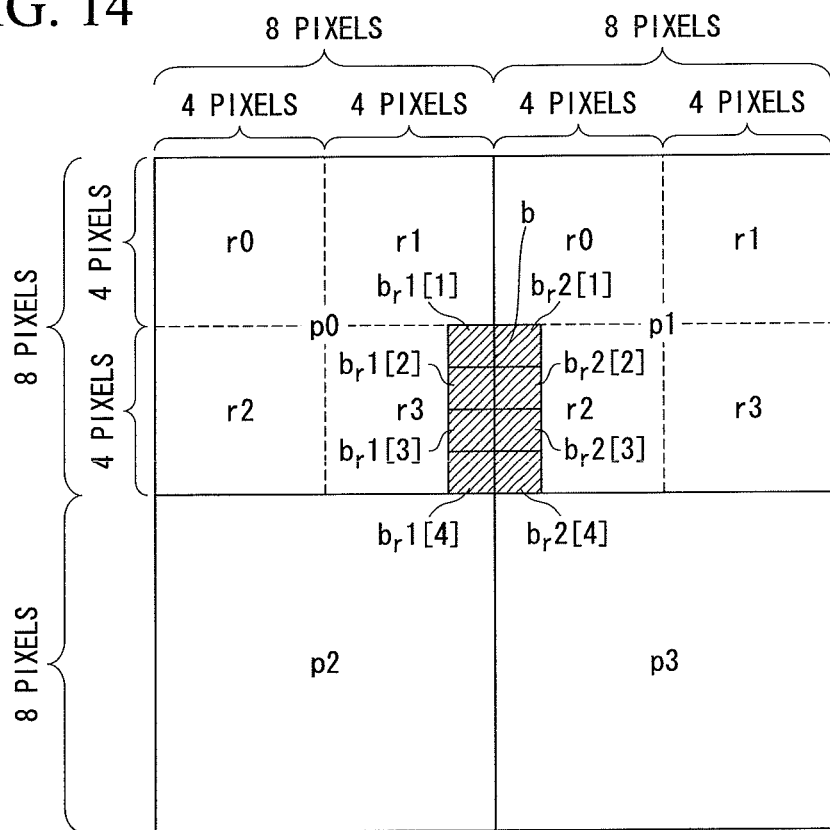
FIG. 14 is a diagram showing an example of pixels of a predicted image used as a target of a determination in the frequency transformation determination unit 105 in the first embodiment.
FIG. 15 is pseudo-code showing a process in which a transformation coefficient generation unit 107 applies a frequency transformation to a transformation target region in a partition in the first embodiment.

FIG. 14 is a diagram showing an example of pixels of a predicted image, which is a target of a determination in the frequency transformation determination unit 105.

FIG. 14 shows an example in which a determination is made as to whether a transformation target region r3 of a partition p0 and a transformation target region r2 of a partition p1 have a characteristic suitable for integration. Further, a boundary between the two transformation target regions is a boundary b and a length of a pixel unit of the boundary b is 4 pixels. The transformation target region r3 of the partition p0 includes pixels br1[1] to br1[4] in contact with the boundary b, and the transformation target region r2 of the partition p1 includes pixels br2[1] to br2[4] in contact with the boundary b. The frequency transformation determination unit 105 calculates a sum of an absolute value |brv1[k]−brv2[k]| of a difference between pixel values of the pixels br1[k] (k is an integer of 0 to 3) and br2[k] that are adjacent to each other using Equation (2), and determines whether the calculated sum is smaller than a threshold Th.

Returning to FIG. 13, if it is determined in step S164 that Equation (2) is satisfied (step S164: YES), the process proceeds to step S165, and if it is determined that Equation (2) is not satisfied (step S164: NO), the process proceeds to step S167.

In step S165, the frequency transformation determination unit 105 selects a new frequency transformation t' to be applied to the transformation target region i and the transformation target region j of the prediction residual. The frequency transformation determination unit 105 selects discrete cosine transform having the same transformation size as a size of the transformation target region after integration as the new frequency transformation t'. For example, when the two original transformation target regions have W horizontal pixels×H vertical pixels and are lined up and down, the frequency transformation determination unit 105 selects a frequency transformation of W horizontal pixels×2H vertical pixels. On the other hand, when the transformation target regions are lined left and right, the frequency transformation determination unit 105 selects a frequency transformation of 2W horizontal pixels×H vertical pixels. Accordingly, in the newly selected frequency transformation t', a region obtained by combining the two original transformation target regions is set as a transformation target region.

The frequency transformation determination unit 105 does not perform the integration if the frequency transformation t' is not included in the transformation preset. For example, in FIG. 11(*c*), the frequency transformations applied to the partition p0 and the partition p1 are 8×4 DCT and the frequency transformation of 2W horizontal pixels×H vertical pixels is 16×4 DCT, which is, however, not included in the transformation preset. Accordingly, the frequency transformation determination unit 105 does not perform the integration. This can suppress an increase in a code length of the index indicating the frequency transformation due to an increase in the number of types of frequency transformations.

Alternatively, even when the frequency transformation t' is not included in the transformation preset, the frequency transformation determination unit 105 may perform the integration. In this case, for example, the frequency transformation determination unit 105 adds a new frequency transformation to the transformation preset and the moving image coding device 10 outputs the frequency preset including the new frequency transformation added thereto to the moving image decoding device 20. Thus, even when the frequency transformation t' is not included in the transformation preset, the integration is performed. This makes it possible to shorten the code length of the transformation coefficient using the spatial correlation between adjacent transformation target regions.

In step S166, the frequency transformation determination unit 105 generates the transformation integration information.

In step S167, if there is an outstanding transformation target region among the transformation target regions (i+1) to N, the loop from step S162 is repeated, and if there is no outstanding transformation target region, the process proceeds to step S168.

In step S168, if there is an outstanding transformation target region among the transformation target regions 0 to (N−2), the loop from step S161 is repeated, and if there is no outstanding transformation target region, the process of determining whether the transformation target regions within the partition are to be integrated ends.

The frequency transformation determination unit 105 outputs the generated transformation selection information and transformation integration information to the transformation coefficient generation unit 107, the variable-length coding unit 108 and the prediction residual rebuilding unit 109.

As described above, the frequency transformation determination unit 105 divides the macro block, which is the processing target, into the transformation target regions and integrates the transformation target regions, to thereby divide the macro block that is the processing target into transformation target regions including a region across the partitions (the transformation target region integrated in step S165).

Further, in step S164, pixels away from the boundary as well as the pixels in contact with the boundary may be added to the determination targets. For example, the frequency transformation determination unit 105 causes a pixel one pixel away from the boundary to be included in Equation (2) and then makes the determination. Accordingly, accuracy of the determination can be improved.

Further, in the flowchart of FIG. 13, the determination of step S163 is made for all combinations of the transformation target regions, but in step S163, a determination is first made as to whether the combination is a combination that does not clearly satisfy the condition C131 and then a determination is made as to whether the condition C131 is satisfied. For example, when a transformation target region not in contact with other partitions within the macro block, like the transformation target region r0 of the partition p0 in FIG. 11(b), is the determination target, the condition C131 is not clearly satisfied. The frequency domain 105 stores the transformation target region not in contact with other partitions within the macro block in advance, and when this transformation target region becomes the determination target, the process proceeds to step S167 without making the determination as to whether the condition C131 is satisfied in step S163. Accordingly, a processing amount can be suppressed.

Alternatively, the condition C131 may be made more difficult to satisfy, thus suppressing the processing amount. For example, a condition that the frequency transformation of the transformation target region r1 and the frequency transformation of the transformation target region r2 be the same frequency transformation t is added. Thus, when the condition C131 is made more difficult to satisfy, the number of times the process in steps S164 and S165 is performed can be reduced and the processing amount can be suppressed.

Further, the frequency transformation determination unit 105 may re-select transformation target regions determined to be integrated and further integrate the transformation target regions. This integration enables a larger region to be the transformation target region, thus improving a coding rate of the coded data output by the moving image coding device 10. For example, in the region (f) of FIG. 11, if it is determined that the region r3 of the partition p0 and the region r2 of the partition p1 are to be integrated and the region r1 of the partition p2 and the region r0 of the partition p3 are to be integrated, the frequency transformation determination unit 105 integrates a region obtained by integrating the region r3 of the partition p0 and the region r2 of the partition p1 and a region obtained by integrating the region r1 of the partition p2 and the region r0 of the partition p3 to generate a transformation target region having 8 horizontal pixels×8 vertical pixels.

Meanwhile, if the frequency transformation determination unit 105 performs only the integration of one step, an increase in a code amount necessary to indicate the integration or a processing amount for integration determination can be suppressed.

Further, the integration propriety determination performed in step S164 is not limited to the determination using Equation (2) described above. For example, the frequency transformation determination unit 105 may compare a motion vector mv1 of the partition to which the transformation target region r1 belongs with a motion vector mv2 of the partition to which the transformation target region r2 belongs, and determine that the spatial correlation is high and the regions are suitable for integration if a predetermined condition is satisfied. For example, the condition is that the reference images of r1 and r2 be the same and a difference or a ratio between the sizes of the vectors mv1 and mv2 be equal to or less than a threshold. If the condition is satisfied, the transformation target region r1 and the transformation target region r2 refer to sufficiently close regions in the same reference image and accordingly the spatial correlation in the region is highly likely to be high. Therefore, a coding rate is expected to be improved due to the integration. The frequency transformation determination unit 105 determines whether the spatial correlation in the region, which is the target, is high using the above condition as an index indicating the spatial correlation.

Further, a method by which the frequency transformation determination unit 105 determines integration propriety of the transformation target regions r1 and r2 is not limited to the method of evaluating the similarity between the pixel values of the predicted image in the vicinity of the partition boundary or the method of evaluating the similarity between motion vectors, which has been described above. For example, the frequency transformation determination unit 105 may determine the integration propriety based on a method using a feature amount other than the above feature amount obtained from the transformation target regions r1 and r2, such as a method of evaluating similarity between coefficient distributions obtained by frequency-transforming the prediction residuals of the respective transformation target regions r1 and r2 or a method of evaluating whether a code amount or a rate distortion cost is low through actual transformation without a similarity determination.

Alternatively, the frequency transformation determination unit 105 may apply the frequency transformation to each of the transformation target regions r1 and r2 and determine the integration propriety of r1 and r2 based on the transformation coefficients obtained as a result of the frequency transformation. For example, when both the transformation coefficient obtained from r1 and the transformation coefficient obtained from r2 are equal to or less than a previously set threshold, it is determined that the spatial correlation between r1 and r2 is high and r1 and r2 are suitable for the integration. Alternatively, the determination as to whether r1 and r2 are suitable for integration may be made by comparing the code amount or the rate distortion cost when the transformation target regions r1 and r2 are integrated with the code amount or the rate distortion cost when the transformation target regions r1 and r2 are not integrated.

Further, when a partition p within the macro block that is the processing target has sub-partitions, transformation target regions in the sub-partition may not be integrated. Alternatively, the macro block may be replaced with a sub-macro block, the partition may be replaced with a sub-partition, and the frequency transformation determination unit 105 may recursively apply the process of the FIG. 13, Further, the embodiment of the present invention is not limited to the case in which the partition p has sub-partitions, and the frequency transformation determination unit 105 can determine integration propriety by performing the process of FIG. 13 even when a processing unit is a block other than 16 pixels×16 pixels, such as a block of 32 pixels×32 pixels.

In step S108 of FIG. 3, the transformation coefficient generation unit 107 performs the frequency transformation on the prediction residual to generate a transformation coefficient based on the prediction residual output from the prediction residual generation unit 106 and the transformation selection information and the transformation integration information input from the frequency transformation determination unit 105.

Specifically, the transformation coefficient generation unit 107 selects the frequency transformation to be applied to each transformation target region based on the transformation selection information and the transformation integration information and applies the selected frequency transformation to each transformation target region of the prediction residual. The frequency transformation indicated by the transformation selection information is any of the frequency transformations included in the transformation preset.

FIG. 15 is pseudo-code showing a process in which the transformation coefficient generation unit 107 applies the frequency transformation to the transformation target regions within the partition. Here, a region R(x, y, W, H) indicates a transformation target region of W horizontal pixels×H vertical pixels in which a position moved x pixels in a right direction and y pixels in a downward direction from an upper left corner within the partition is an upper left corner.

For transformation target regions of M horizontal pixels×N vertical pixels included in the partition, the transformation coefficient generation unit 107 applies, to each transformation target region, a frequency transformation having a transformation size of W horizontal pixels×H vertical pixels in order from the left transformation target region to the right transformation target region, as shown in the pseudo-code of FIG. 15. This is sequentially repeated from top to bottom.

Further, a quantization process may be included in the process in which the transformation coefficient generation unit 107 generates the transformation coefficient from the prediction residual. For example, the transformation coefficient generated by the transformation coefficient generation unit 107 may be quantized.

In step S109 of FIG. 3, the prediction residual rebuilding unit 109 performs an inverse frequency transformation on the transformation coefficient based on the transformation coefficient output from the transformation coefficient generation unit 107 and the transformation selection information and the transformation integration information output from the frequency transformation determination unit 105 to rebuild the prediction residual. Further, in step S109, when the transformation coefficient generation unit 107 performs the quantization, the prediction residual rebuilding unit 109 performs inverse quantization corresponding to the quantization. For example, when the transformation coefficient generation unit 107 quantizes the generated transformation coefficient, the prediction residual rebuilding unit 109 performs the inverse frequency transformation on the transformation coefficient after performing inverse quantization on the transformation coefficient.

The prediction residual rebuilding unit 109 outputs the rebuilt prediction residual to the local decoded image generation unit 110.

In step S110, the local decoded image generation unit 110 generates a local decoded image based on the predicted image output from the predicted image generation unit 103 and the prediction residual output from the prediction residual rebuilding unit 109. The local decoded image generation unit 110 sums, for each pixel, the pixel value of the predicted image and the pixel value of the prediction residual as each pixel value of the local decoded image to generate a local decoded image.

Further, the local decoded image generation unit 110 may apply a filter to the generated local decoded image to reduce a block distortion or a quantization error occurring at a block boundary. In this case, the moving image decoding device 20 also applies the same filter to the generated local decoded image such that the moving image coding device 10 and the moving image decoding device 20 generate the same local decoded image.

The local decoded image generation unit 110 writes the generated local decoded image to the local decoded image storage unit 33.

In step S111, the variable-length coding unit 108 codes the transformation coefficient output from the transformation coefficient generation unit 107, the prediction parameter output from the prediction parameter determination unit 102, and the transformation selection information and the transformation integration information output from the frequency transformation determination unit 105 to generate coded data, and outputs the generated coded data to the coded data output unit 64, The coded data output unit 64 outputs the coded data output from the variable-length coding unit 108 to the outside of the moving image coding device 10.

The variable-length coding unit 108 first performs variable-length coding on the transformation coefficient and the prediction parameter using a method defined in H.264/AVC. In this case, the variable-length coding unit 108 divides the transformation coefficient generated by the frequency transformation of the regions across the partitions based on the partition boundary to perform variable-length coding on each partition, similar to the method defined in H.264/AVC.

Next, the variable-length coding unit 108 performs variable-length coding on the transformation selection information and the transformation integration information.

First, the variable-length coding unit 108 performs variable-length coding on the index indicating the frequency transformation applied to each partition, which is contained in the transformation selection information, for example, using Huffman code. Further, coding performed by the variable-length coding unit 108 is not limited to the variable-length coding and may be any coding as long as the coding enables the moving image decoding device 20 to perform decoding without loss of information, that is, the coding is lossless coding. For example, the variable-length coding unit 108 obtains a bit sequence obtained by binarizing the index into t bits as coded data using a minimum positive integer t, in which the t-th power of 2 is equal to or more than s when the number of elements of the transformation preset is s. Similarly, for data other than transformation selection information, such as the transformation coefficient or the prediction parameter, coding performed by the variable-length coding unit 108 may be any coding as long as the coding is lossless coding.

Next, the variable-length coding unit 108 codes, for each of the transformation integration information, a partition index indicating a position of the integrated region, an integration target region index, an integration direction index, and an index indicating the frequency transformation applied to the integrated region. For example, the partition index has any value of p0 to p3, and the variable-length coding unit 108 obtains this partition index as variable-length coded data, for example, using Huffman code. Further, the integration target region index has any value of r0 to r7, and the variable-length coding unit 108 obtains this integration target region index as variable-length coded data, for example using Huffman code. Further, the integration direction index has any value of right and down, and the variable-length coding unit 108 obtains this integration direction index as, for example, 1-bit coded data.

Further, the moving image coding device 10 may not output the transformation integration information. As described above, the frequency transformation determination unit 105 determines whether the transformation target regions are to be integrated based on the pixel values of the predicted image. Accordingly, as will be described later, the moving image decoding device 20 may make the same determination as the determination as to whether the transformation target regions are to be integrated, which is performed by the frequency transformation determination unit 105 of the moving image coding device 10 to thereby estimate the integrated region. Further, the moving image decoding device 20 may estimate the frequency transformation applied to the integrated region by applying a frequency transformation having the same transformation size as the size of the integrated region as described above. Thus, even when the moving image coding device 10 does not output the transformation integration information, the moving image decoding device 20 can decode the moving image.

On the other hand, if the moving image coding device 10 outputs the transformation integration information, the moving image decoding device 20 does not have to perform the estimation of the integrated region, thus reducing a computation amount.

Further, when the moving image coding device 10 outputs the transformation integration information, coding and outputting of a part of the transformation integration information may be omitted.

First, when there is only one transformation target region that may be the integration target within the partition, the integration target region index may be omitted. For example, since there is only one transformation target region in the partition p1 of FIG. 11(e), the integration target region index may be omitted.

Further, when a direction in which the regions can be integrated is only one, the integration direction index may be omitted. For example, since the region r1 of the partition p0 of FIG. 11(b) is in contact with another partition in the macro block only in a right direction, the integration direction index may be omitted.

Further, since the frequency transformation can be determined from the size of the integrated region as described above, the frequency transformation information may be omitted. Reversely, when the transformation target region can be determined from the frequency transformation information, information on the transformation target regions, such as any one or all of the partition index, the integration target region index, and the integration direction index, may be omitted.

Figure 16:
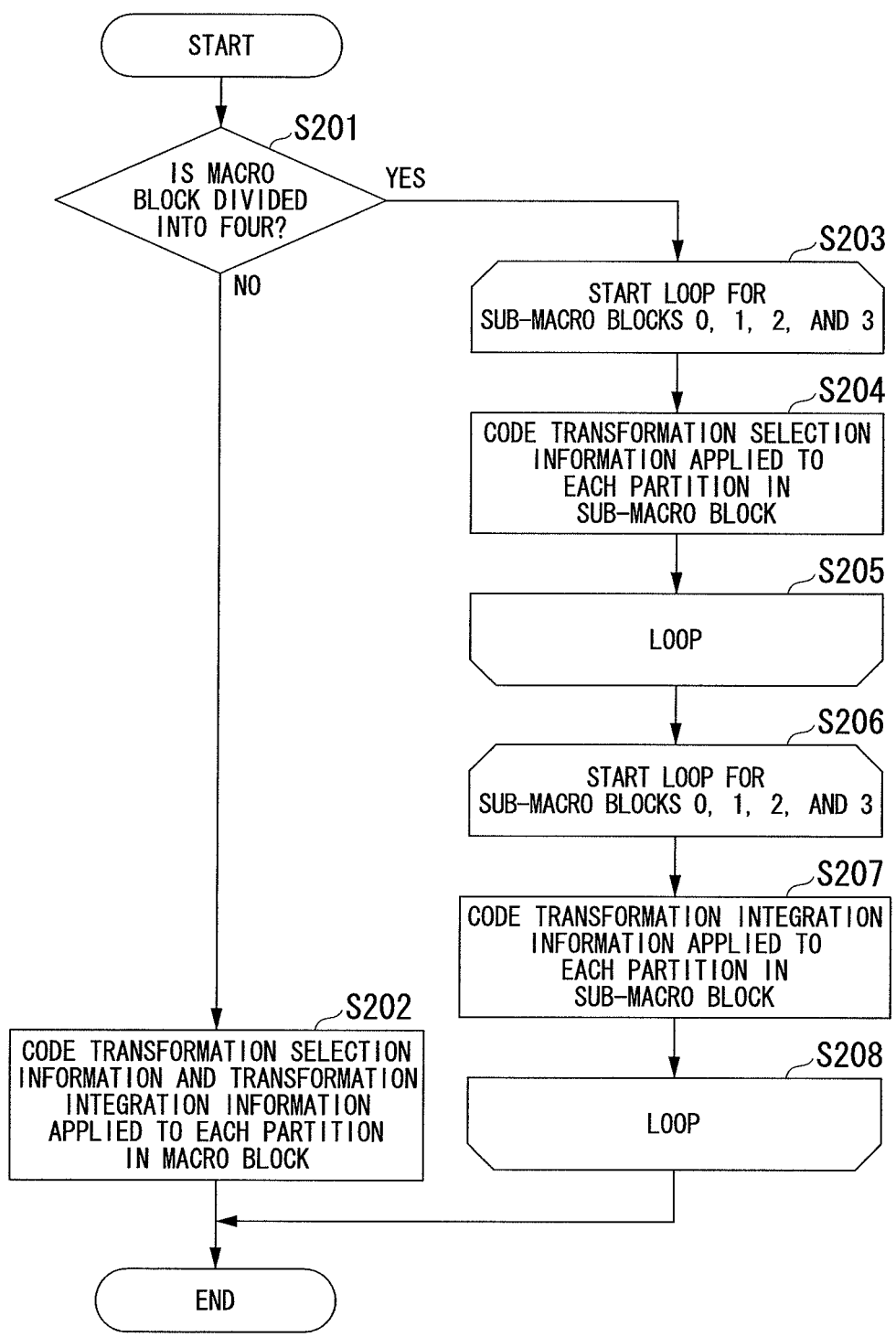
FIG. 16 is a flowchart showing a procedure of a process in which a variable-length coding unit 108 codes transformation selection information and transformation integration information of each partition included in a macro block that is a processing target in the first embodiment.

FIG. 16 is a flowchart showing a procedure of a process in which the variable-length coding unit 108 codes the transformation selection information and the transformation integration information of each partition included in the macro block that is the processing target.

In step S201, the variable-length coding unit 108 determines whether the partition structure determined for the macro block that is the processing target by the frequency transformation determination unit 105 is 4-part division. If it is determined that the partition structure is 4-part division (step S201: YES), the process proceeds to step S203 and if it is determined that the partition structure is not 4-part division (step S201: NO), the process proceeds to step S202.

In step S202, the variable-length coding unit 108 codes the transformation selection information and the transformation integration information applied to each partition within the macro block, which is the processing target. Then, the process of coding the transformation selection information and the transformation integration information ends.

In step S203, the variable-length coding unit 108 starts a loop of a process for each of sub-macro blocks 0 to 3 each having 8 horizontal pixels×8 vertical pixels, which have been obtained by dividing the macro block into quarters.

In step S204, the variable-length coding unit 108 codes the transformation selection information applied to each sub-partition in a sub-macro block that is the processing target.

In step S205, if an outstanding sub-macro block remains, the loop from step S203 is repeated, and if the outstanding sub-macro block does not remain, the process proceeds to step S206.

In step S206, the variable-length coding unit 108 starts a loop of a process for each of sub-macro blocks 0 to 3 each having 8 horizontal pixels×8 vertical pixels, which have been obtained by dividing the macro block into quarters.

In step S207, the variable-length coding unit 108 codes transformation integration information applied to each sub-partition within the sub-macro block, which is the processing target.

In step S208, if an outstanding sub-macro block remains, the loop from step S206 is repeated, and if an outstanding sub-macro block does not remain, the process of coding the transformation selection information and the transformation integration information ends.

In step S112 of FIG. 3, if there is an outstanding part in the moving image input to the moving image coding device 10, the loop from step S101 is repeated, and if processing of the moving image input to the moving image coding device 10 is completed, the process in which the moving image coding device 10 generates the coded data ends.

Thus, the moving image coding device 10 integrates the adjacent transformation target regions with the partition boundary interposed therebetween and applies one frequency transformation.

Next, the moving image decoding device 20 that decodes the coded data from the moving image coding device 10 to generate the decoded moving image will be described.

Figure 17:
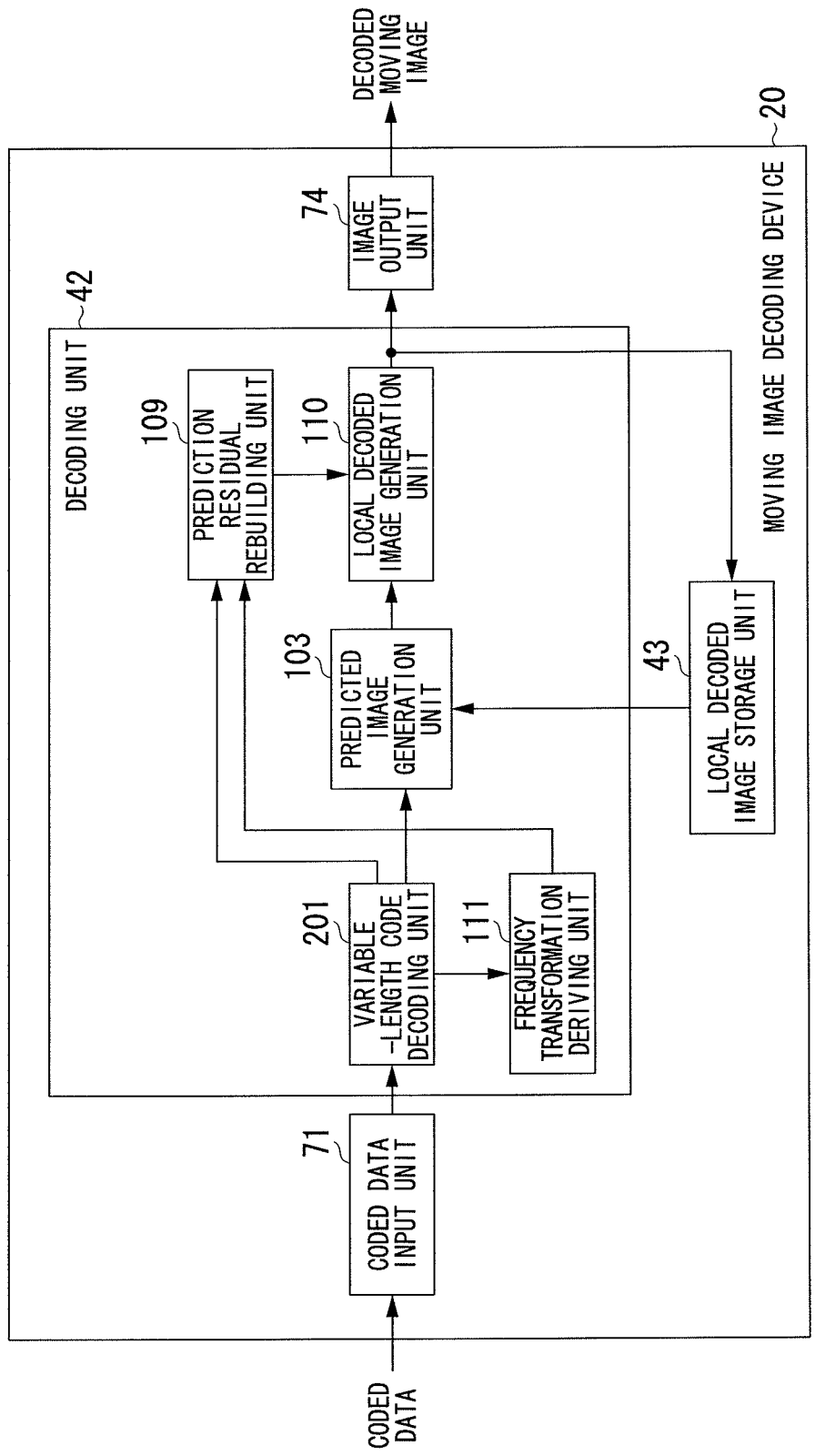
FIG. 17 is a schematic functional block configuration diagram showing a functional block configuration of a moving image decoding device 20 in the first embodiment.

FIG. 17 is a schematic functional block configuration diagram showing a functional block configuration of the moving image decoding device 20.

In FIG. 17, the moving image decoding device 20 includes a coded data input unit 71, a decoding unit 42, a local decoded image storage unit 43, and an image output unit 74. The decoding unit 42 includes a variable-length code decoding unit (lossless code decoding unit) 201, a predicted image generation unit 103, a frequency transformation deriving unit (transformation target region determination unit) 111, a prediction residual rebuilding unit 109, and a local decoded image generation unit 110.

In FIG. 17, parts corresponding to the respective units of FIG. 1 and parts corresponding to the respective units of FIG. 2 are indicated by the same reference numerals (71, 74, 103, 109, and 110) and a description thereof will be omitted.

When the coded data for each macro block output by the coded data output unit 64 of the moving image coding device 10 (FIG. 2) is input, the coded data input unit 71 outputs the input coded data to the variable-length code decoding unit 201 of the decoding unit 42.

The decoding unit 42 is realized by the central processing unit 72 of FIG. 1 executing a program. The decoding unit 42 generates a local decoded image, which is a decoded image divided for each macro block, from the coded data for each macro block input from the coded data input unit 71.

In the decoding unit 42, the variable-length code decoding unit 201 decodes the prediction parameter, the transformation selection information and the transformation integration information from the coded data output from the coded data input unit 71. The variable-length code decoding unit 201 outputs the decoded prediction parameter to the predicted image generation unit 103 and the frequency transformation deriving unit 111 and outputs the transformation selection information and the transformation integration information that have been decoded, to the frequency transformation deriving unit 111. Further, the variable-length code decoding unit 201 decodes the transformation coefficient from the coded data output from the coded data input unit 71, The variable-length code decoding unit 201 outputs the decoded transformation coefficient to the prediction residual rebuilding unit 109.

The frequency transformation deriving unit 111 generates integrated transformation selection information indicating a configuration of transformation target regions within the macro block that is the processing target after integration and the frequency transformation applied to each transformation target region, based on the transformation selection information and the transformation integration information input from the variable-length code decoding unit 201. That is, the frequency transformation deriving unit 111 determines the transformation target region based on the transformation selection information and the transformation integration information. The frequency transformation deriving unit 111 inputs the generated integrated transformation selection information to the prediction residual rebuilding unit 109.

The local decoded image storage unit 43 is realized using the memory 73 of FIG. 1. The local decoded image storage unit 43 stores a local decoded image generated by the local decoded image generation unit 110, that is, a local decoded image that is an image obtained by composition of the divided macro blocks into which the moving image coding device 10 divides the moving image, from the coded data.

The image output unit 74 combines the local decoded images output from the local decoded image generation unit 110 to generate a decoded image of a frame unit, and outputs the decoded image to the outside of the moving image decoding device 20.

Figure 18:
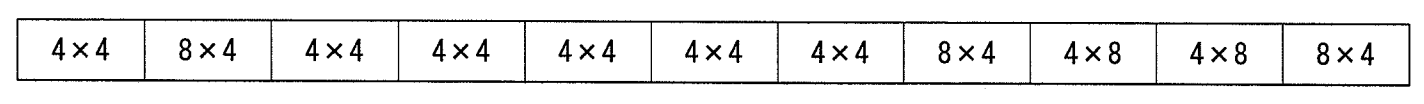

FIG. 18 is a data structure diagram showing a data structure of the integrated transformation selection information generated by the frequency transformation deriving unit 111. FIG. 18 shows an example of the integrated transformation selection information when the integration in FIG. 11(*b*) has been performed.

As shown in FIG. 18, sizes of the respective transformation target regions within the macro block are indicated in the integrated transformation selection information. In the integrated transformation selection information, when a position of a pixel at an upper-left corner of each transformation target region is used as a criterion, sizes of the transformation target regions are indicated in order from an upper transformation target region. If upper and lower parts are in the same relationship, the sizes of the transformation target regions are indicated in order from the left transformation target region.

The frequency transformation deriving unit 111 reads the partition structure from the prediction parameter and reads the frequency transformation applied to each partition from the transformation selection information to acquire a configuration of the transformation target regions before integration. The frequency transformation deriving unit 111 also acquires a configuration of the transformation target region after integration based on the transformation integration information and generates the integrated transformation selection information.

Next, operation of the moving image decoding device 20 will be described.

Figure 19:
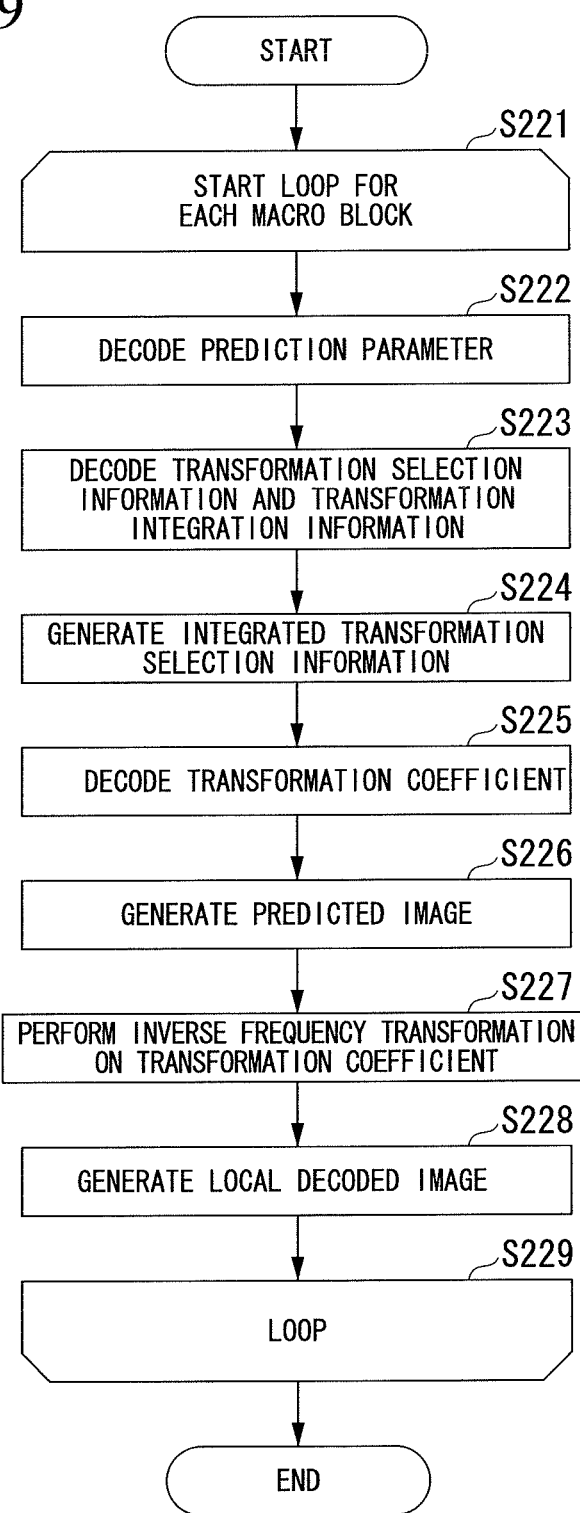
FIG. 19 is a flowchart showing a procedure of a process in which a moving image decoding device 20 generates a decoded moving image in the first embodiment.

FIG. 19 is a flowchart showing a procedure of a process in which the moving image decoding device 20 generates the decoded moving image. When coded data of a macro block unit is sequentially input from the outside, the moving image decoding device 20 starts a process of FIG. 19 of processing the input coded data for each macro block.

In step S221, the moving image decoding device 20 starts a loop of processing the coded data for each macro block.

In step S222, the coded data input unit 71 receives coded data for one macro block from the outside and outputs the coded data to the variable-length code decoding unit 201. The variable-length code decoding unit 201 decodes the prediction parameter for the macro block that is the processing target from the coded data output from the coded data input unit 71. The variable-length code decoding unit 201 outputs the decoded prediction parameter to the predicted image generation unit 103 and the frequency transformation deriving unit 111.

In step S223, the variable-length code decoding unit 201 decodes the transformation selection information and the transformation integration information of the macro block, which is the processing target, from the coded data output from the coded data input unit 71. The variable-length code decoding unit 201 outputs the transformation selection information and the transformation integration information that have been decoded, to the frequency transformation deriving unit 111.

In step S224, the frequency transformation deriving unit 111 generates the integrated transformation selection information based on the prediction parameter, the transformation selection information and the transformation integration information output from the variable-length code decoding unit 201. The frequency transformation deriving unit 111 outputs the generated integrated transformation selection information to the prediction residual rebuilding unit 109.

In step S225, the variable-length code decoding unit 201 decodes the transformation coefficient from the coded data output from the coded data input unit 71. The variable-length code decoding unit 201 outputs the decoded transformation coefficient to the prediction residual rebuilding unit 109.

In step S226, the predicted image generation unit 103 generates a predicted image corresponding to the macro block, which is the processing target, based on the prediction parameter output from the variable-length code decoding unit 201 and the local decoded image recorded in the frame memory 101. The predicted image generation unit 103 outputs the generated predicted image to the local decoded image generation unit 110.

In step S227, the prediction residual rebuilding unit 109 applies an inverse frequency transformation corresponding to the frequency transformation defined by the integrated transformation selection information output from the frequency transformation deriving unit 111 to the transformation coefficient output from the variable-length code decoding unit 201, and generates a prediction residual corresponding to the macro block that is the processing target. Accordingly, when the transformation coefficient that the moving image coding device 10 has generated by performing the frequency transformation on the prediction residual, in which the region obtained by integrating the regions included in different partitions is a target, is contained in the transformation coefficient output from the variable-length code decoding unit 201, the prediction residual rebuilding unit 109 applies the inverse frequency transformation to each transformation target region indicated by the integrated transformation selection information, in which the frequency transformation deriving unit 111 has determined the integrated transformation target region, to generate the prediction residual based on the transformation integration information, which is information indicating the region obtained by integrating the regions included in the different partitions.

The prediction residual rebuilding unit 109 outputs the generated prediction residual to the local decoded image generation unit 110.

In step S228, the local decoded image generation unit 110 generates a local decoded image based on the prediction residual output from the prediction residual rebuilding unit 109 and the predicted image output from the predicted image generation unit 103. The local decoded image generation unit 110 writes the generated local decoded image to the local decoded image storage unit 43. Further, the local decoded image generation unit 110 outputs the generated local decoded image to the image output unit 74. The image output unit 74 combines the local decoded images output from the local decoded image generation unit 110 to generate a decoded image of a frame unit, and outputs the decoded image to the outside of the moving image decoding device 20.

In step S229, when all of the input coded data has been processed, the process of generating a decoded moving image ends, and when there is remaining coded data, the loop from step S221 is repeated. A determination as to whether all the input coded data has been processed may be made, for example, by the moving image coding device 10 outputting a signal indicating end of the coded data and the coded data input unit 71 detecting this data.

As described above, according to the moving image decoding device 20, it is possible to generate the decoded moving image from the coded data generated by the moving image coding device 10.

Further, even when the moving image coding device 10 does not output the transformation integration information, the moving image decoding device 20 can generate the decoded moving image, as stated in the description of the frequency transformation determination unit 105. In this case, the frequency transformation deriving unit 111 generates the transformation integration information using the prediction parameter decoded by the variable-length code decoding unit 201 or the local decoded image stored in the local decoded image storage unit 43, and generates the integrated transformation selection information based on the generated transformation integration information and the transformation selection information decoded by the variable-length code decoding unit 201.

Figure 20:
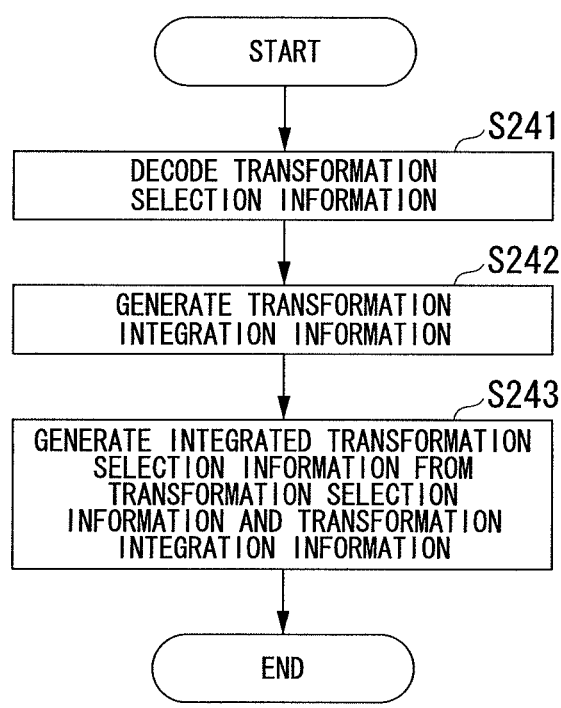
FIG. 20 is a flowchart showing a procedure of a process in which the moving image decoding device 20 generates the integrated transformation selection information when the moving image coding device 10 determines the propriety of the integration based on a change in pixel values in the vicinity of a boundary of the transformation target region and does not output transformation integration information in the first embodiment.

FIG. 20 is a flowchart showing a procedure of a process in which the moving image decoding device 20 generates the integrated transformation selection information when the moving image coding device 10 determines the propriety of the integration based on a change in a pixel value in the vicinity of a boundary of the transformation target regions and does not output the transformation integration information. The process in FIG. 20 corresponds to the process of step S223 in FIG. 19.

In step S241, the variable-length code decoding unit 201 decodes the transformation selection information. The variable-length code decoding unit 201 outputs the decoded transformation selection information to the frequency transformation deriving unit 111. In step S242, the frequency transformation deriving unit 111 generates the transformation integration information by performing the same process as the process in which the frequency transformation determination unit 105 generates the transformation integration information, which has been described with reference to FIG. 13. In step S243, the frequency transformation deriving unit 111 generates the integrated transformation selection information based on the generated transformation integration information and the transformation selection information output from the variable-length code decoding unit 201. Then, the process of generating the integrated transformation selection information ends.

Further, even when the frequency transformation determination unit 105 determines the propriety of the integration through a process other than the process described with reference to FIG. 13, in step S242, the frequency transformation deriving unit 111 performs the same process as the frequency transformation determination unit 105. For example, when the frequency transformation determination unit 105 uses a condition that the reference image of the transformation target region r1 and the reference image of the transformation target region r2 be the same and a difference in size between the motion vector mv1 of the transformation target region r1 and the motion vector mv2 of the transformation target region r2 be equal to or less than a threshold, the frequency transformation deriving unit 111 also generates the transformation integration information using the same condition.

As described above, even when the moving image coding device 10 does not output the transformation integration information, the moving image decoding device 20 can generate the transformation integration information and decode the moving image. This enables coded data of the transformation integration information to be omitted, thus reducing an amount of code output from the moving image coding device 10 to the moving image decoding device 20.

Further, the moving image coding device 10 may generate, code, and output the integrated transformation selection information. The moving image decoding device 20 can decode the coded data using the integrated transformation selection information generated by the moving image coding device 10.

In this case, the frequency transformation determination unit 105 of the moving image coding device 10 generates the integrated transformation selection information using the same procedure as the procedure in which the frequency transformation deriving unit 111 generates the integrated transformation selection information, and outputs the integrated transformation selection information to the variable-length coding unit 108, instead of outputting the transformation selection information and the transformation integration information to the variable-length coding unit. The variable-length coding unit 108 codes the integrated transformation selection information output from the frequency transformation determination unit 105 and outputs it as coded data. By doing so, since the moving image decoding device 20 need not generate the integrated transformation selection information, it is unnecessary to include the frequency transformation deriving unit 111, thus simplifying a configuration of the device.

As described above, since the moving image coding device 10 determines whether to integrate adjacent transformation target regions with the partition boundary interposed therebetween and transforms the conversion target region after integration through one frequency transformation, it is possible to improve coding efficiency when a plurality of adjacent regions with a partition boundary interposed therebetween have a high spatial correlation.

Further, since the moving image decoding device 20 performs an inverse frequency transformation based on the transformation target region integrated by the moving image coding device 10, the moving image decoding device 20 can decode the coded data generated by the moving image coding device 10 and generate a decoded moving image.

Furthermore, the moving image coding device 10 may determine whether a spatial correlation between adjacent transformation target regions included in the same partition is high and integrate the transformation target regions between which the spatial correlation is determined to be high. The process of determining whether the spatial correlation between adjacent transformation target regions included in the same partition is high and the process of integrating the transformation target regions between which the spatial correlation is determined to be high can be performed through the same process as that for the adjacent transformation target regions with the partition boundary interposed therebetween.

Specifically, in step S163 of FIG. 13, a condition: "the transformation target region i and the transformation target region j are adjacent to each other. Further, a region obtained by combining the transformation target region i and the transformation target region j is a rectangle," obtained by excluding the condition of transformation target regions being included in the different partition regions from the condition C131 is applied, such that the adjacent transformation target regions can be targets irrespective of whether the regions are included in the same partition or different partitions. Coding efficiency can be further improved by performing the determination and the integration on the transformation target regions included in the same partition.

The moving image coding device 10 determines whether the spatial correlation between the adjacent transformation target regions included in the same partition is high irrespective of whether the adjacent transformation target regions with the partition boundary interposed therebetween are to be integrated, and integrates the transformation target regions between which the spatial correlation is determined to be high. Alternatively, when the moving image coding device 10 has integrated the adjacent transformation target regions with a partition boundary interposed therebetween, the moving image coding device 10 further determines whether the spatial correlation between adjacent transformation target regions included in the same partition is high and integrates the transformation target regions between which the spatial correlation is determined to be high, Coding efficiency can be further improved by performing the determination and the integration on the transformation target regions included in the same partition irrespective of whether the adjacent transformation target regions with the partition boundary interposed therebetween are to be integrated. Meanwhile, when the adjacent transformation target regions with the partition boundary interposed therebetween are integrated, an increase in an amount of processing performed by the moving image coding device 10 can be suppressed by performing the determination and the integration on the transformation target regions included in the same partition.

Second Embodiment

Figure 21:
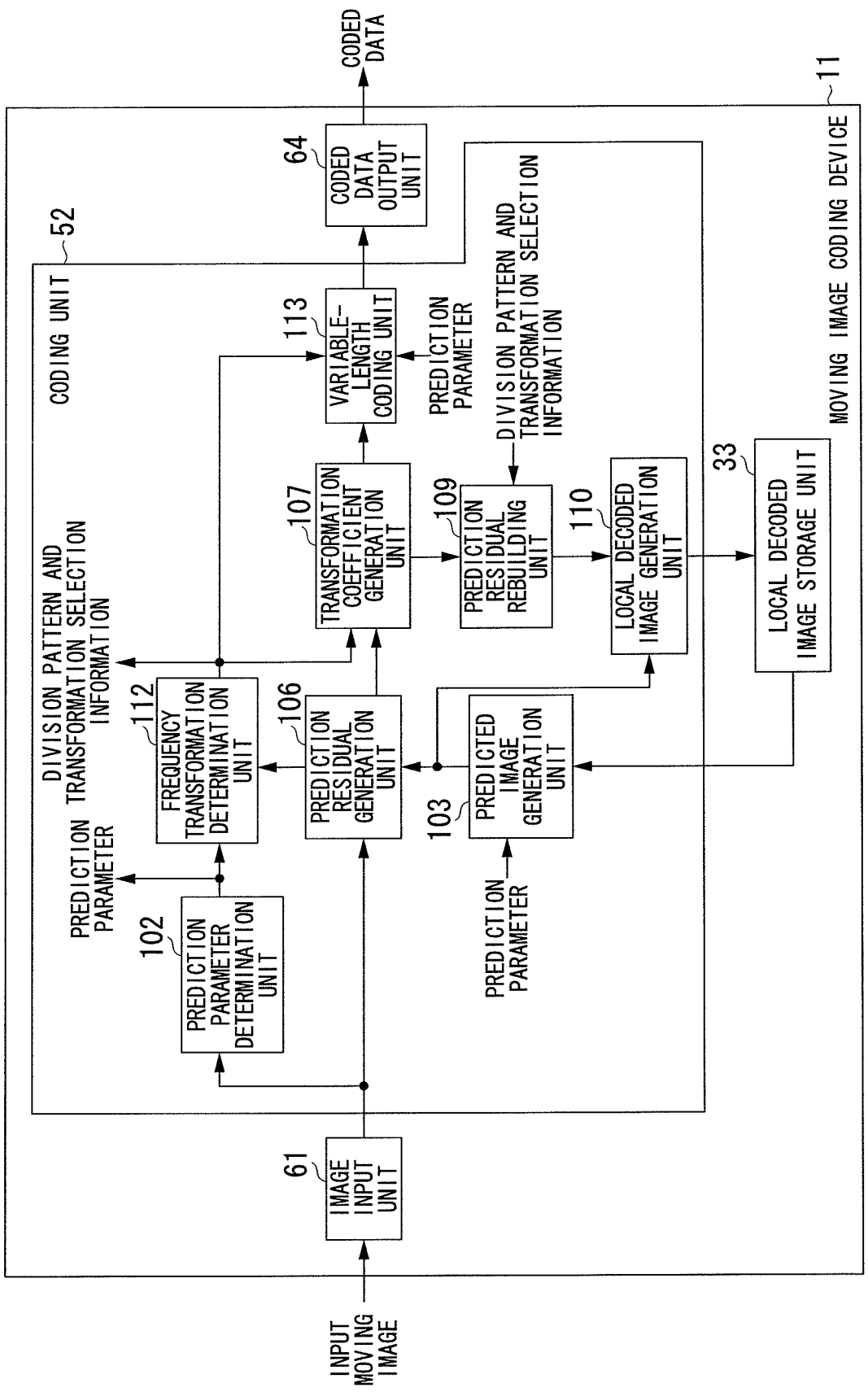
FIG. 21 is a schematic functional block configuration diagram showing a functional block configuration of a moving image coding device 11 in a second embodiment of the present invention.

FIG. 21 is a schematic functional block configuration diagram showing a functional block configuration of a moving image coding device 11 in a second embodiment of the present invention.

In FIG. 21, the moving image coding device 11 includes an image input unit 61, a coding unit 52, a local decoded image storage unit 33, and a coded data output unit 64. The coding unit 52 includes a prediction parameter determination unit (parameter structure determination unit) 102, a predicted image generation unit 103, a prediction residual generation unit 106, a frequency transformation determination unit (frequency transformation region division unit) 112, a transformation coefficient generation unit 107, a variable-length coding unit 113, a prediction residual rebuilding unit 109, and a local decoded image generation unit 110.

In FIG. 21, parts corresponding to the respective units of the moving image coding device 10 in FIG. 2 are indicated by the same reference numerals (33, 61, 64, 102, 103, 106, 107, 109, and 110) and a description thereof will be omitted.

The moving image coding device 11 differs from the moving image coding device 10 of FIG. 2 in that the frequency transformation determination unit 112 makes a determination of the frequency transformation using a division pattern across a partition boundary of the predicted image instead of performing an integration process after frequency transformation selection for each partition of the predicted image.

Figure 22:
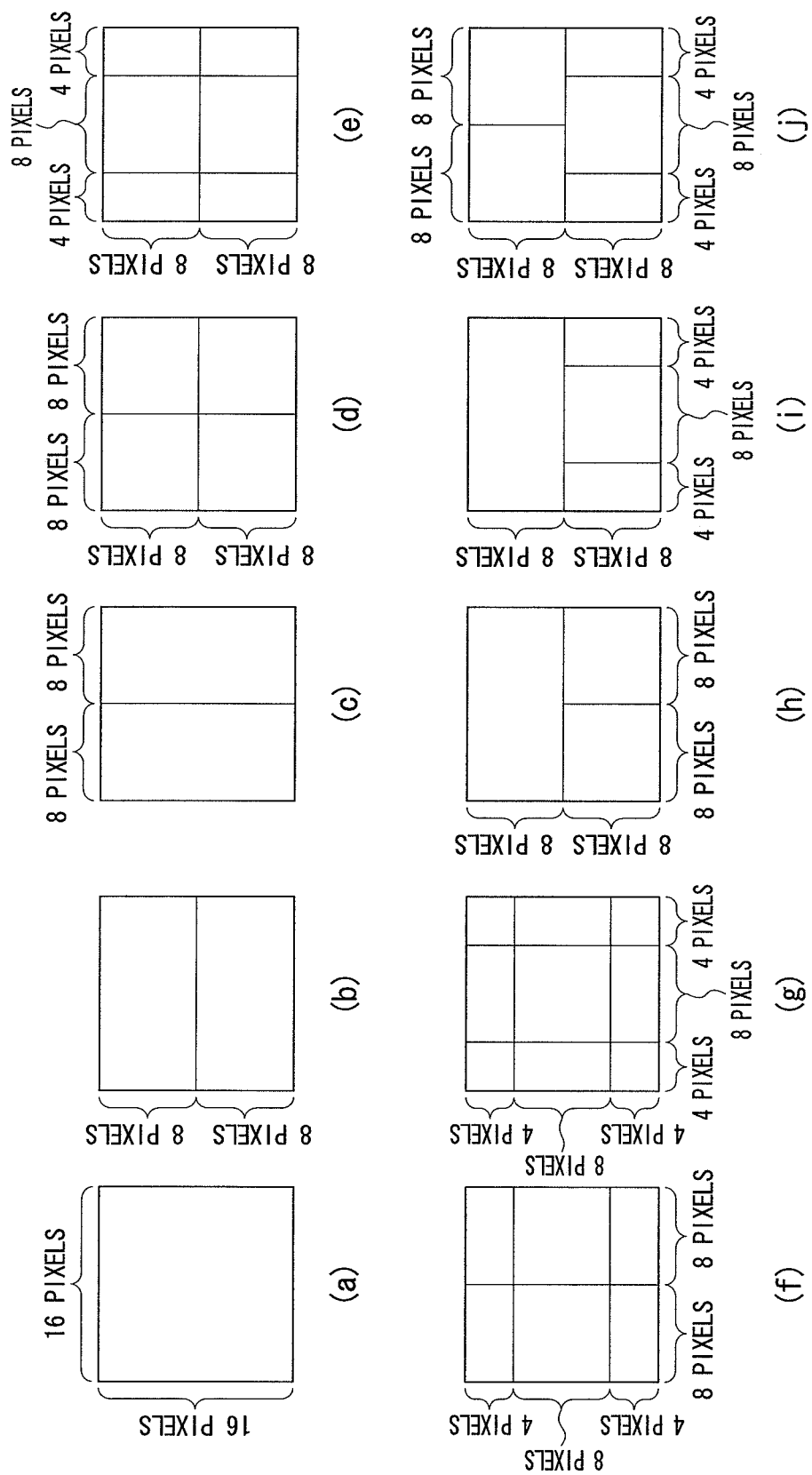
FIG. 22 is a diagram showing an example of a division pattern used by a frequency transformation determination unit 112 in the second embodiment.

FIG. 22 is a diagram showing an example of division patterns used by the frequency transformation determination unit 112.

As shown in FIG. 22, the division patterns are patterns of regions into which a macro block can be divided horizontally or vertically. The division pattern indicates regions within the macro block to which the same frequency transformation is applied. The frequency transformation determination unit 112 selects the division pattern independently from the patterns into which the macro block is divided for motion compensation.

The frequency transformation determination unit 112 uses the division patterns shown in FIGS. 22(a) to (g).

FIG. 22(a) shows a division pattern of 1-part division in which a macro block is not divided. FIG. 22(b) shows a division pattern of 2-part division in which a macro block is divided into two regions each having 16 horizontal pixels×8 vertical pixels. FIG. 22(c) shows a division pattern of 2-part division in which a macro block is divided into two regions each having 8 horizontal pixels×16 vertical pixels. FIG. 22(d) shows a division pattern of 4-part division in which a macro block is divided into four regions each having 8 horizontal pixels×8 vertical pixels. FIG. 22(e) shows a division pattern in which a macro block is divided into six regions by dividing the macro block in two by 8 pixels up and down and in three in order of 4 pixels, 8 pixels, and 4 pixels, from left to right. FIG. 22(f) shows a division pattern in which a macro block is divided into six regions by dividing the macro block in three in order of 4 pixels, 8 pixels, and 4 pixels up and down and in two by 8 pixels, left and right. FIG. 22(g) shows a division pattern in which a macro block is divided into nine regions by dividing a macro block in three in order of 4 pixels, 8 pixels, and 4 pixels both up and down, and left and right.

Further, the frequency transformation determination unit 112 may use the division patterns shown in FIGS. 22(h) to (j), division patterns obtained by rotating such division patterns by 90° to the left and right, or division patterns obtained by rotating the division patterns by 180°.

FIG. 22(h) shows a division pattern when a macro block is divided into three regions by dividing the macro block by 8 pixels up and down and further dividing a lower region by 8 pixels left and right. FIG. 22(i) shows a division pattern when a macro block is divided into four regions by dividing the macro block by 8 pixels up and down and dividing a lower region into three in order of 4 pixels, 8 pixels, and 4 pixels left and right. FIG. 22(j) shows a division pattern when a macro block is divided into five regions by dividing the macro block by 8 pixels up and down and further dividing an upper region by 8 pixels left and right and further dividing a lower region into three in order of 4 pixels, 8 pixels, and 4 pixels left and right.

In H.264/AVC, either 4×4 DCT or 8×8 DCT is selected when a macro block is divided into four partitions. In the division patterns shown in FIG. 22, the division pattern of FIG. 22(*d*) can be used for the selection of partitions and the application of a frequency transformation.

Further, the division pattern is not limited to those illustrated in FIG. 22, but it is desirable that the numbers of vertical and horizontal pixels of each divided region be a multiple of any of frequency transformation sizes included in the transformation preset (hereinafter also referred to as "can be filled"). Further, the frequency transformation determination unit 112 may dynamically generate or change a set of division patterns based on the partition structure, the prediction parameter or the pixel value. In this case, the moving image coding device 10 outputs information of the set of division patterns to the moving image decoding device 20.

Figure 23:
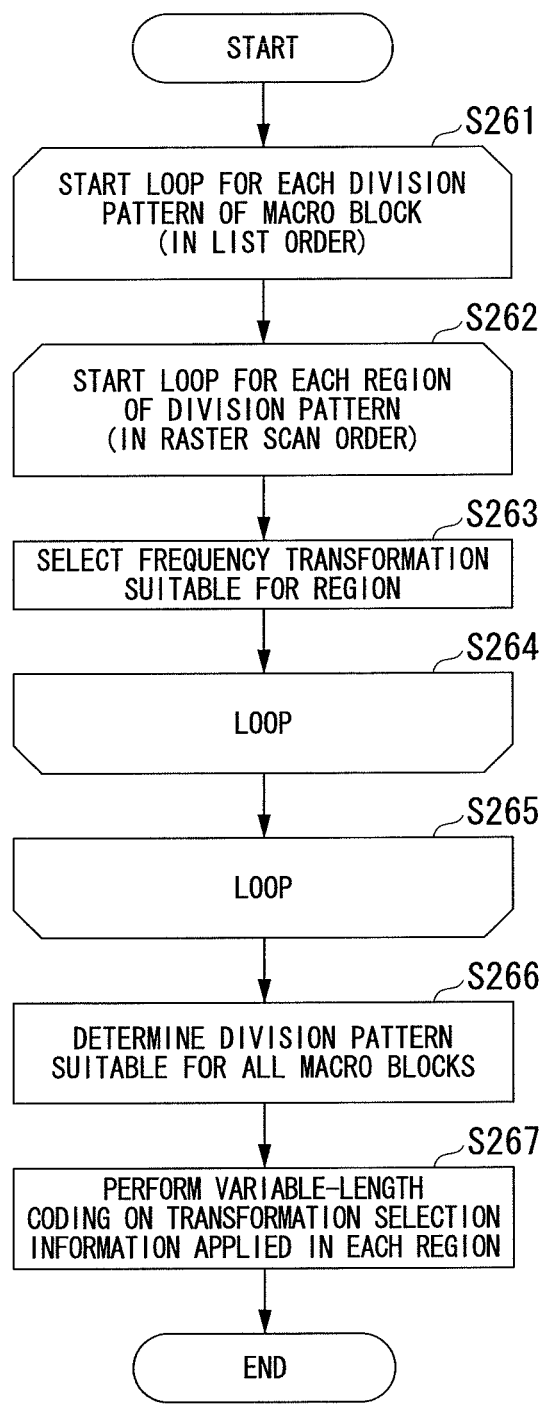
FIG. 23 is a flowchart showing a procedure of a process in which the frequency transformation unit 112 determines a division pattern and a frequency transformation applied to a macro block, which is a processing target, in the second embodiment.

FIG. 23 is a flowchart showing a procedure of a process in which the frequency transformation determination unit 112 determines a division pattern and a frequency transformation applied to a macro block of a prediction residual that is a processing target.

In step S261, the frequency transformation determination unit 112 starts a loop of performing a process on each division pattern in a set of prescribed division patterns.

In step S262, the frequency transformation determination unit 112 starts a loop of performing a process on each region in a division pattern P that is a processing target in a loop from step S261.

In step S263, the frequency transformation determination unit 112 selects a frequency transformation applied to a region u that is the processing target in the loop from the transformation preset. Specifically, the frequency transformation determination unit 112 calculates a rate distortion cost when each frequency transformation that can be filled has been applied, based on Equation (1) described above, and selects a frequency transformation in which the rate distortion cost is minimal as the frequency transformation applied to the region u.

In step S264, if there is an outstanding region in the division pattern P, the loop of the process from step S262 is repeated. If all the regions in the division pattern P have been processed, the process proceeds to step S265.

In step S265, if there is an outstanding division pattern, the loop of the process from step S261 is repeated. If there is no outstanding division pattern, the process proceeds to step S266.

In step S266, the frequency transformation determination unit 112 selects the division pattern most suitable for the macro block being processed. Specifically, the frequency transformation determination unit 112 sums the rate distortion costs obtained in steps S261 to S265 for respective division patterns and selects a division pattern in which the sum of the rate distortion costs in the macro block is minimal.

In step S267, the frequency transformation determination unit 112 outputs the division pattern selected in step S266 and information of the frequency transformation selected in the region within the division pattern as transformation selection information, to the transformation coefficient generation unit 107, the prediction residual rebuilding unit 109 and the variable-length coding unit 113. Then, the process of determining the frequency transformation applied to the macro block, which is the processing target, ends.

As described above, the frequency transformation determination unit 112 determines the division pattern and the frequency transformation for each region applied in each macro block. When many division patterns can be selected, a computation amount increases. However, for example, the result of the frequency transformation performed in step S263 is stored and then referenced when the same frequency transformation is performed on the same region later, thereby reducing the computation amount.

The variable-length coding unit 113 performs variable-length coding on the transformation coefficient and the prediction parameter in each partition within the macro block, similar to the variable-length coding unit 108 of the moving image coding device 10. Further, the variable-length coding unit 113 codes an index indicating the division pattern and an index indicating the frequency transformation applied to each region of the prediction residual divided by the division pattern.

The variable-length coding unit 113 outputs the generated coded data to the coded data output unit 64.

Next, operation of the moving image coding device 11 will be described.

Figure 24:
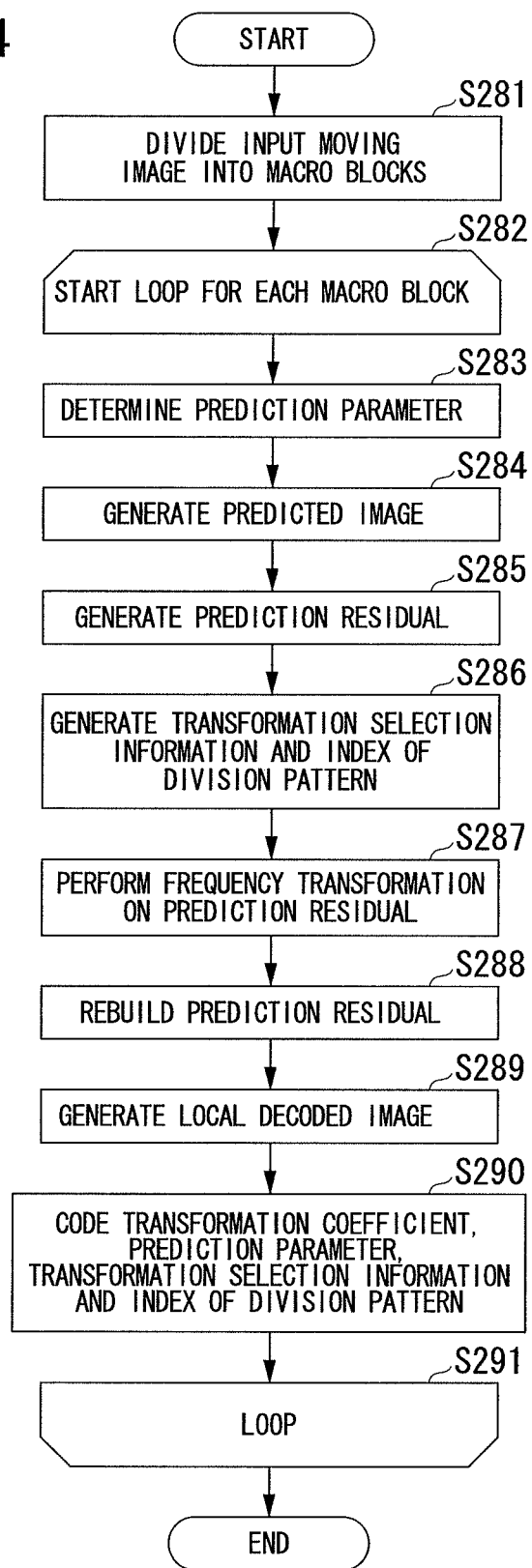
FIG. 24 is a flowchart showing a procedure of a process in which a moving image coding device generates coded data in the second embodiment.

FIG. 24 is a flowchart showing a procedure of a process in which the moving image coding device generates the coded data.

Steps S281 to S285 are the same as steps S101 to S105 in FIG. 3.

In step S286, the frequency transformation determination unit 112 determines the division pattern applied to the macro block, which is the processing target, and a frequency transformation applied to each region within the division pattern, based on the prediction parameter output from the prediction parameter determination unit 102 and the prediction residual output from the prediction residual generation unit 106, generates transformation selection information indicating the division pattern and the frequency transformation applied to each region, and outputs the transformation selection information to the transformation coefficient generation unit 107, the variable-length coding unit 113 and the prediction residual rebuilding unit 109.

In step S287, the transformation coefficient generation unit 107 performs a frequency transformation on the prediction residual output from the prediction residual generation unit 106 to generate a transformation coefficient based on the division pattern and the frequency transformation determined by the frequency transformation determination unit 112, and outputs the transformation coefficient to the variable-length coding unit 108 and the prediction residual rebuilding unit 109.

In step S288, the prediction residual rebuilding unit 109 applies an inverse frequency transformation of the frequency transformation performed by the transformation coefficient generation unit 107 to the transformation coefficient output from the transformation coefficient generation unit 107 to rebuild the prediction residual of the macro block, which is the processing target, based on the division pattern and the frequency transformation determined by the frequency transformation determination unit 112. The prediction residual rebuilding unit 109 outputs the rebuilt prediction residual to the local decoded image generation unit 110. Step S289 is the same as step S110 in FIG. 3.

In step S290, the variable-length coding unit 113 codes the transformation coefficient, the prediction parameter, the division pattern and the transformation selection information to generate coded data. The variable-length coding unit 113 codes the transformation coefficient for each partition, similar to the variable-length coding unit 108 of FIG. 2. The variable-length coding unit 113 outputs the generated coded data to the coded data output unit 64. The coded data output unit 64 outputs the coded data output from the variable-length coding unit 113 to the outside of the moving image coding device 11. Step S291 is the same as step S112 in FIG. 3.

Using the above procedure, the moving image coding device 11 codes the input moving image to generate the coded data, and outputs the coded data to the outside.

Further, the frequency transformation determination unit 112 may determine or narrow the division pattern using a method other than the method using rate distortion cost. For example, the frequency transformation determination unit 112 determines, with respect to a vertical boundary line as shown in FIG. 22(c), a similarity between left and right regions from the boundary line or similarity between motion vectors, an index of a reference image, and the like. If it is determined that the similarity between the left and right regions from the boundary line is high, the frequency transformation determination unit 112 excludes the division patterns of FIGS. 22(c), (d) and (f) in which the macro block is divided into two, left and right, from the candidates. Here, the frequency transformation determination unit 112 makes the above determination by applying Equation (2) to left and right pixels of the division pattern, similar to the frequency transformation determination unit 105 of the moving image coding device 10.

Next, the moving image decoding device in the present embodiment will be described.

Figure 25:
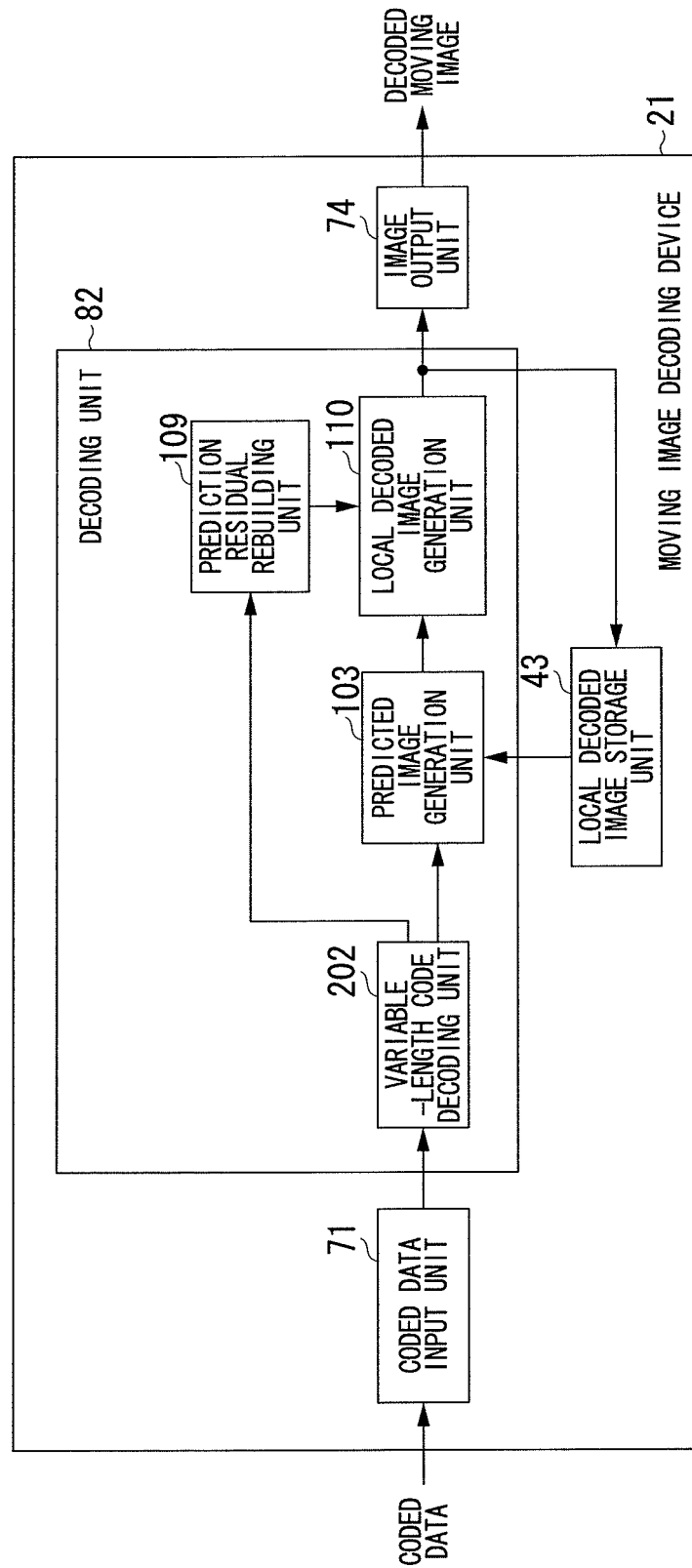
FIG. 25 is a schematic functional block configuration diagram showing a functional block configuration of a moving image decoding device 21 in the second embodiment.

FIG. 25 is a schematic functional block configuration diagram showing a functional block configuration of the moving image decoding device 21.

In FIG. 25, the moving image decoding device 21 includes a coded data input unit 71, a decoding unit 82, a local decoded image storage unit 43, and an image output unit 74. The decoding unit 82 includes a variable-length code decoding unit 202, a predicted image generation unit 103, a prediction residual rebuilding unit 109, and a local decoded image generation unit 110.

In FIG. 25, parts corresponding to the respective units of FIG. 17 are indicated by the same reference numerals (43, 71, 74, 103, 109 and 110) and a description thereof will be omitted.

The variable-length code decoding unit 202 decodes the coded data output from the coded data input unit 71 to generate the prediction parameter, the division pattern, the transformation selection information, and the transformation coefficient, Specifically, the variable-length code decoding unit 202 first decodes the prediction parameter and the division pattern from the coded data. Next, the variable-length code decoding unit 202 decodes the transformation selection information from the coded data using the decoded division pattern. The variable-length code decoding unit 202 reads the partition structure from the decoded prediction parameter and decodes the transformation coefficient from the coded data.

The variable-length code decoding unit 202 outputs the prediction parameter, the division pattern, the transformation selection information and the transformation coefficient that have been generated, to the prediction residual rebuilding unit 109 and the predicted image generation unit 103.

Figure 26:
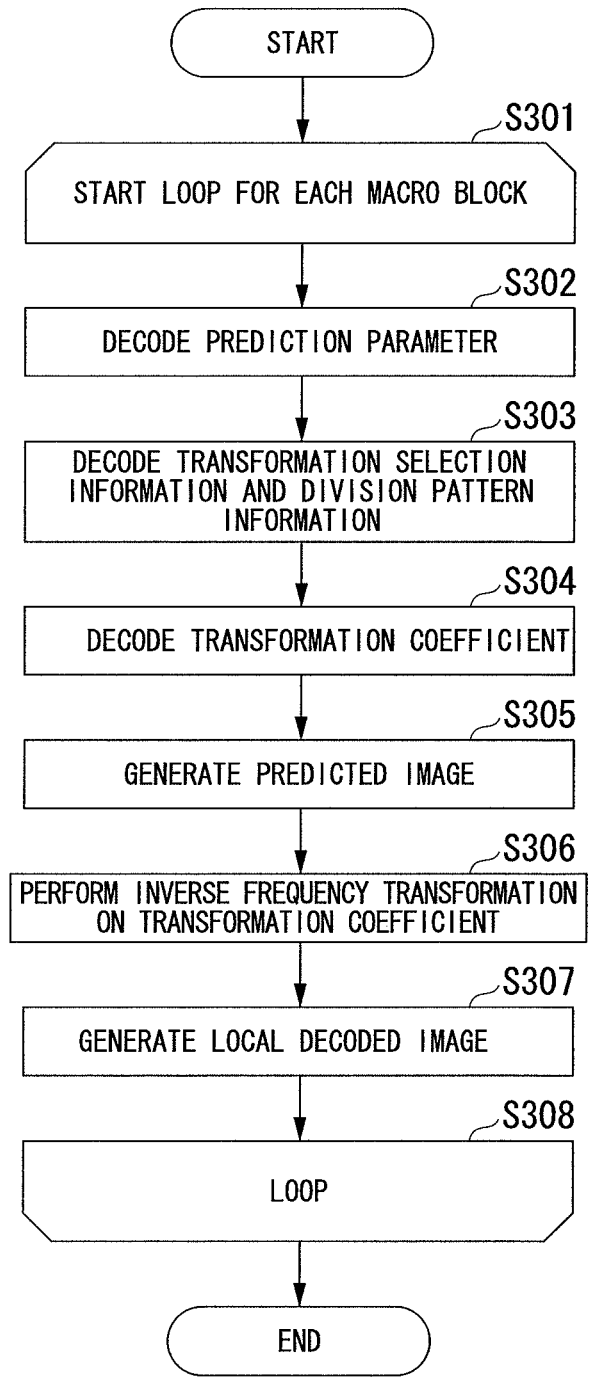
FIG. 26 is a flowchart showing a procedure of a process in which a moving image decoding device 21 generates a decoded moving image in the second embodiment.

FIG. 26 is a flowchart showing a procedure of a process in which the moving image decoding device 21 generates the decoded moving image.

Steps S301 to S302 are the same as steps S221 to S222 of FIG. 19.

In step S303, the variable-length code decoding unit 202 decodes the division pattern and the transformation selection information corresponding to the macro block, which is a processing target, from the input coded data. The variable-length code decoding unit 202 outputs the division pattern and the transformation selection information that have been decoded, to the prediction residual rebuilding unit 109.

Steps S304 to S305 are the same as steps S225 to S226 in FIG. 19.

In step S306, the prediction residual rebuilding unit 109 applies an inverse frequency transformation corresponding to the frequency transformation defined by the division pattern and the transformation selection information output from the variable-length code decoding unit 202 to the transformation coefficient output from the variable-length code decoding unit 202 to rebuild the prediction residual of the macro block, which is the processing target. The prediction residual rebuilding unit 109 outputs the rebuilt prediction residual to the local decoded image generation unit 110.

Steps S307 to S308 are the same as steps S228 to S229 in FIG. 19.

Thus, according to the moving image decoding device 21, it is possible to generate the decoded moving image from the coded data generated by the moving image coding device 11.

Further, even in the present embodiment, the moving image coding device 11 does not output the information indicating the division pattern, but the moving image decoding device may select the division pattern, similar to the first embodiment in which the moving image coding device 10 does not output the transformation integration information, but the moving image decoding device 20 may generate the transformation integration information.

Figure 27:
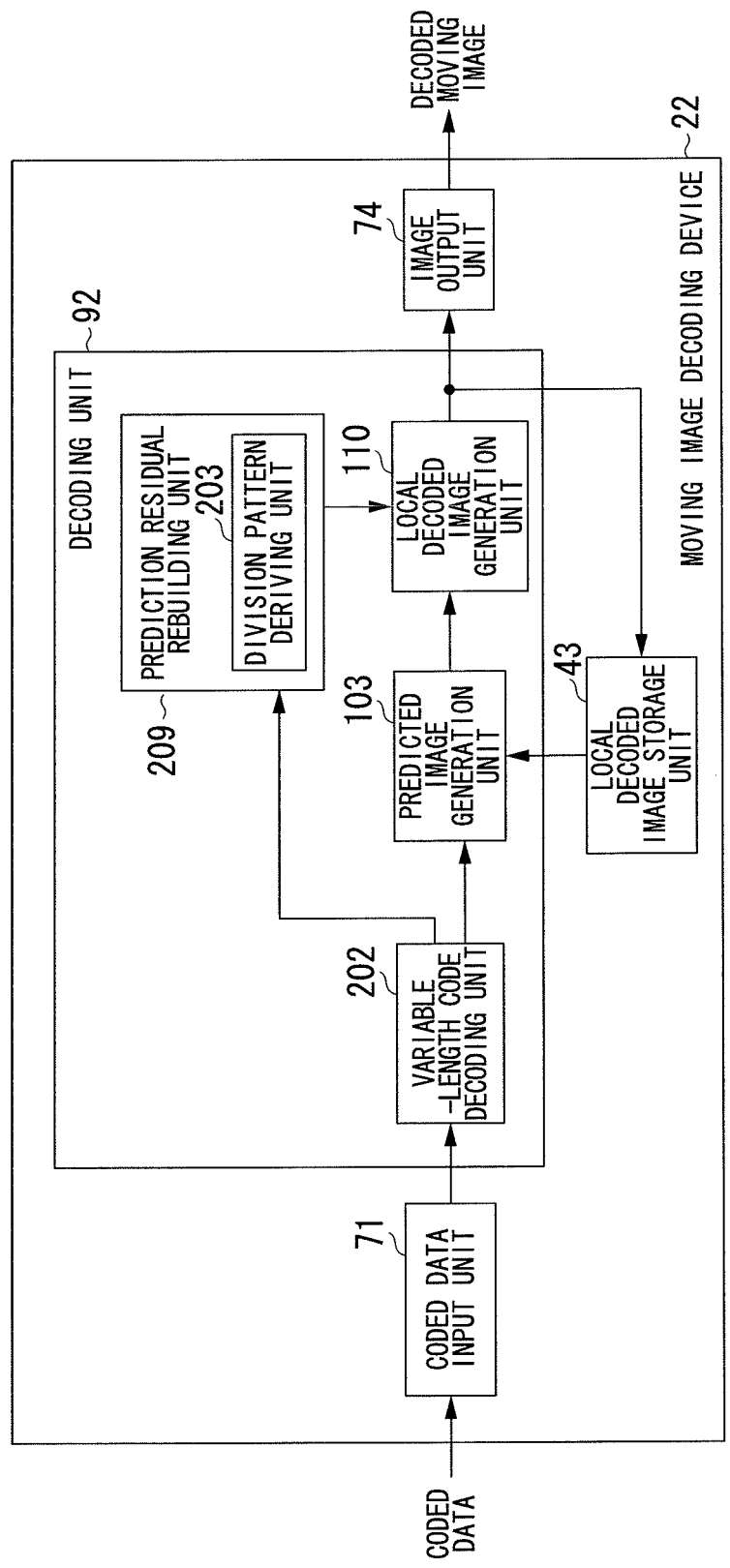
FIG. 27 is a configuration diagram showing a configuration of a moving image decoding device 22 that selects a division pattern in the second embodiment.

FIG. 27 is a configuration diagram showing a configuration of a moving image decoding device 22 that selects the division pattern.

In FIG. 27, the moving image decoding device 22 includes a coded data input unit 71, a decoding unit 92, a local decoded image storage unit 43, and an image output unit 74. The decoding unit 92 includes a variable-length code decoding unit 202, a predicted image generation unit 103, a prediction residual rebuilding unit 209, and a local decoded image generation unit 110. The prediction residual rebuilding unit 209 includes a division pattern deriving unit 203.

In FIG. 27, parts corresponding to the respective units of FIG. 17 are indicated by the same reference numerals (43, 71, 74, 103, 110, and 202) and a description thereof will be omitted.

The division pattern deriving unit 203 performs the same process as the frequency transformation determination unit 112 of the moving image coding device 11 to select the division pattern based on a local decoded image or a prediction parameter.

The prediction residual rebuilding unit 209 rebuilds a prediction residual of a macro block, which is a processing target, using the division pattern selected by the division pattern deriving unit 203, similar to the prediction residual rebuilding unit 109 of the moving image decoding device 21. The prediction residual rebuilding unit 209 outputs the rebuilt prediction residual to the local decoded image generation unit 110.

Accordingly, even when the moving image coding device 11 does not output the information indicating the division pattern, the moving image decoding device 22 can generate the decoded moving image.

As described above, the moving image coding device 11 of the present embodiment performs coding using the division pattern. Accordingly, when the adjacent regions with the partition boundary interposed therebetween are included in the same region of the division pattern, one frequency transformation can be applied to the regions. Accordingly, when a spatial correlation of the region within the division pattern is high, coding efficiency can be improved in comparison with the frequency transformation being performed for each partition.

Furthermore, the moving image decoding device 21 or the moving image decoding device 22 can generate the decoded moving image from the coded data generated by the moving image coding device 11.

Third Embodiment

Figure 28:
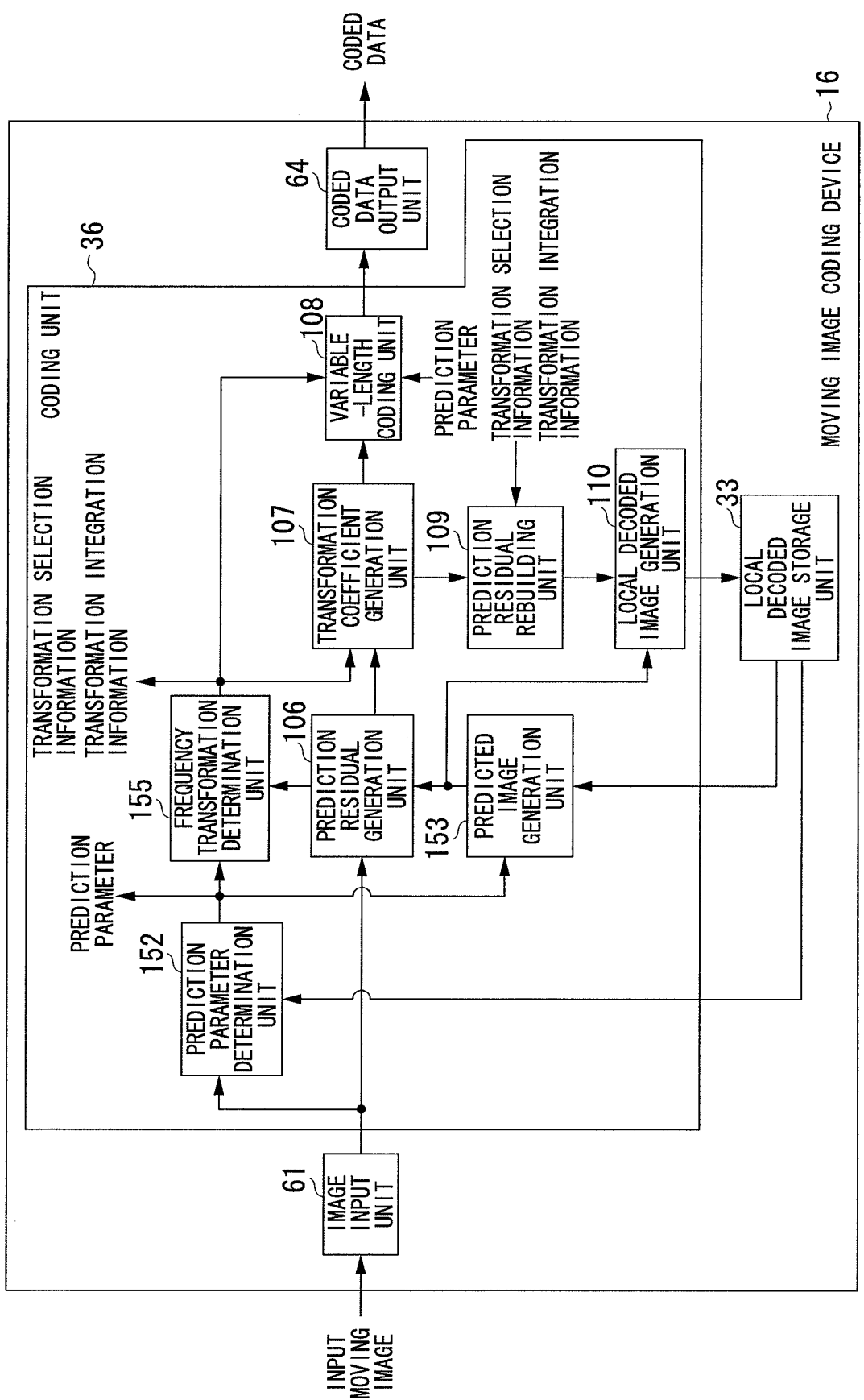
FIG. 28 is a configuration diagram showing a configuration of a moving image coding device 16 in a third embodiment of the present invention.

FIG. 28 is a configuration diagram showing a configuration of a moving image coding device 16 in a third embodiment of the present invention.

In FIG. 28, a moving image coding device 16 includes an image input unit 61, a coding unit 36, a local decoded image storage unit 33, and a coded data output unit 64, The coding unit 36 includes a prediction parameter determination unit (a partition structure determination unit or a prediction mode determination unit) 152, a predicted image generation unit 153, a prediction residual generation unit 106, a frequency transformation determination unit (a frequency transformation region division unit) 155, a transformation coefficient generation unit 107, a variable-length coding unit 108, a prediction residual rebuilding unit 109, and a local decoded image generation unit 110.

In FIG. 28, parts corresponding to the respective units of FIG. 2 are indicated by the same reference numerals (61, 106 to 110, 33 and 64) and a description thereof will be omitted.

The moving image coding device 16 determines whether inter-prediction or intra-prediction is performed on each macro block and performs a process according to the determination. The inter-prediction (motion compensation prediction) is a method of improving coding efficiency by generating a predicted image similar to a macro block that is a processing target using a local decoded image of a macro block included in a frame different from the macro block that is the processing target, as described above. Meanwhile, the intra-prediction is a method of improving coding efficiency by generating a predicted image similar to a macro block that is a processing target using a pixel included in the same frame as the macro block that is the processing target (a pixel of a generated predicted image within the macro block that is the processing target or pixel within a local decoded image of a macro block adjacent to the macro block that is the processing target). If it is determined that the inter-prediction is to be performed, the moving image coding device 16 performs the same process as the moving image coding device 10, and the prediction parameter determination unit 152, the predicted image generation unit 153 and the frequency transformation determination unit 155 operate similarly to the prediction parameter determination unit 102, the predicted image generation unit 153, and the frequency transformation determination unit 155 of FIG. 2, A process when the moving image coding device 16 determines that the intra-prediction is to be performed will be described hereinafter.

When an image of a macro block unit is input from the image input unit 61, the prediction parameter determination unit 152 determines whether the inter-prediction or the intra-prediction is to be performed on each macro block. The determination as to whether the inter-prediction or the intra-prediction is to be performed may be made using a known method. For example, the prediction parameter determination unit 152 calculates a rate distortion cost when the inter-prediction has been performed and a rate distortion cost when the intra-prediction has been performed based on Equation (1) and selects the prediction in which the rate distortion cost is smaller. Alternatively, the intra-prediction may be selected only for a predetermined frame or position without a dynamic determination as to whether the inter-prediction or the intra-prediction is to be performed. Alternatively, a determination as to whether the intra-prediction is to be used may be made in units of frames.

If it is determined that the intra-prediction is to be performed, the prediction parameter determination unit 152 determines a size of a partition or a sub-partition (hereinafter simply referred to as a partition, particularly, when it is unnecessary to distinguish the partition from the sub-partition) to be any of 16 horizontal pixels×16 vertical pixels (the partition structure MB1 in FIG. 5), 8 horizontal pixels×8 vertical pixels (the partition structure MB4), and 4 horizontal pixels×4 vertical pixels (the partition structure MB4 and the sub-partition structure SMB4) among the partitions described with reference to FIG. 5, and determines a prediction mode for each partition determined according to the determined size of the partition. The prediction mode will be described later. The prediction parameter determination unit 152 generates a prediction parameter indicating the intra-prediction having been selected, the determined size of the partition, and the prediction mode applied to each partition, and outputs the prediction parameter to the predicted image generation unit 153, the frequency transformation determination unit 155 and the variable-length coding unit 108.

The predicted image generation unit 153 generates a predicted image using the local decoded image read from the local decoded image storage unit 33 according to the prediction mode determined by the prediction parameter determination unit 152. The predicted image generation unit 153 outputs the generated predicted image to the prediction residual generation unit 106 and the local decoded image generation unit 110.

The frequency transformation determination unit 155 determines a transformation target region for frequency transformation applied to a prediction residual output from the prediction residual generation unit 106 based on the prediction parameter output from the prediction parameter determination unit 152, and also determines whether the transformation target regions are to be integrated. The frequency transformation determination unit 155 generates transformation selection information indicating the determined transformation target region (frequency transformation size) and transformation integration information indicating transformation target regions to be integrated, and outputs the transformation selection information and the transformation integration information to the transformation coefficient generation unit 107, the prediction residual rebuilding unit 109, and the variable-length coding unit 108.

Figure 29:
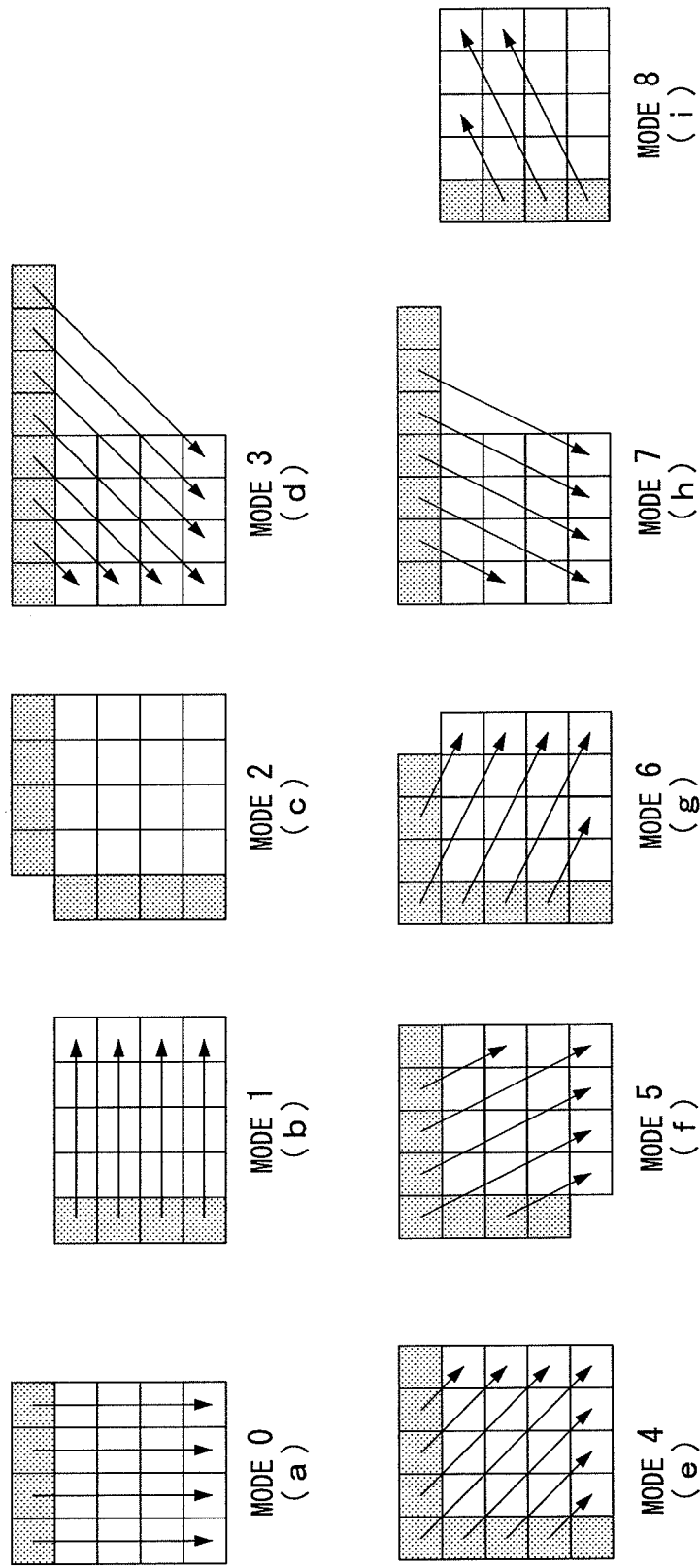
FIG. 29 is a diagram showing a prediction mode determined by a prediction parameter determination unit 152 in the third embodiment.

FIG. 29 is a diagram showing prediction modes determined by the prediction parameter determination unit 152. The prediction parameter determination unit 152 selects a prediction mode to be applied to the partition from among the same prediction modes as those defined in H.264/AVC. The prediction mode is information indicating a method of generating a predicted image for a partition from pixels adjacent to the partition.

FIG. 29 shows prediction modes when a size of the partition is 4 horizontal pixels×4 vertical pixels. In mode 0 shown in FIG. 29(*a*), interpolation is performed in a vertical direction based on pixels adjacent to a top of the partition to generate the predicted image of the partition. In mode 1 shown in FIG. 29(*b*), interpolation is performed in a horizontal direction based on pixels adjacent to the left of the partition to generate the predicted image of the partition. In mode 2 shown in FIG. 29(c), interpolation is performed using an average of values of pixels adjacent to the left and the top of the partition to generate the predicted image of the partition. In mode 3 shown in FIG. 29(d), interpolation is performed in a direction from upper right to lower left based on pixels adjacent to the top of the partition to generate the predicted image of the partition. Hereinafter, similarly, in mode 4 shown in FIG. 29(e), mode 5 shown in FIG. 29(f), mode 6 shown in FIG. 29(g), mode 7 shown in FIG. 29(h) and mode 8 shown in FIG. 29(i), interpolation is performed in an oblique direction as indicated by an arrow shown in FIG. 29 to generate the predicted image of the partition.

Even when the size of the partition is 8 horizontal pixels×8 vertical pixels, the prediction parameter determination unit 152 selects the prediction mode to be applied to a partition from among the nine prediction modes as described above. When the size of the partition is 16 horizontal pixels×16 vertical pixels, the prediction parameter determination unit 152 selects the prediction mode to be applied to a partition from among four prediction modes: a mode in which interpolation is performed in a vertical direction based on pixels adjacent to the top of the partition, similar to FIG. 29 (a); a mode in which interpolation is performed in a horizontal direction based on pixels adjacent to the left of the partition, similar to FIG. 29 (b); a mode in which interpolation is performed using an average of values of pixels adjacent to the left and the top of the partition, similar to FIG. 29(c); and a mode in which interpolation is performed in the oblique direction from upper right to lower left based on pixels adjacent to the left and the top of the partition.

The prediction parameter determination unit 152 calculates a rate distortion cost for each of the prediction modes when applied to a partition based on Equation (1), and selects the prediction mode in which the rate distortion cost is minimal.

Figure 30:
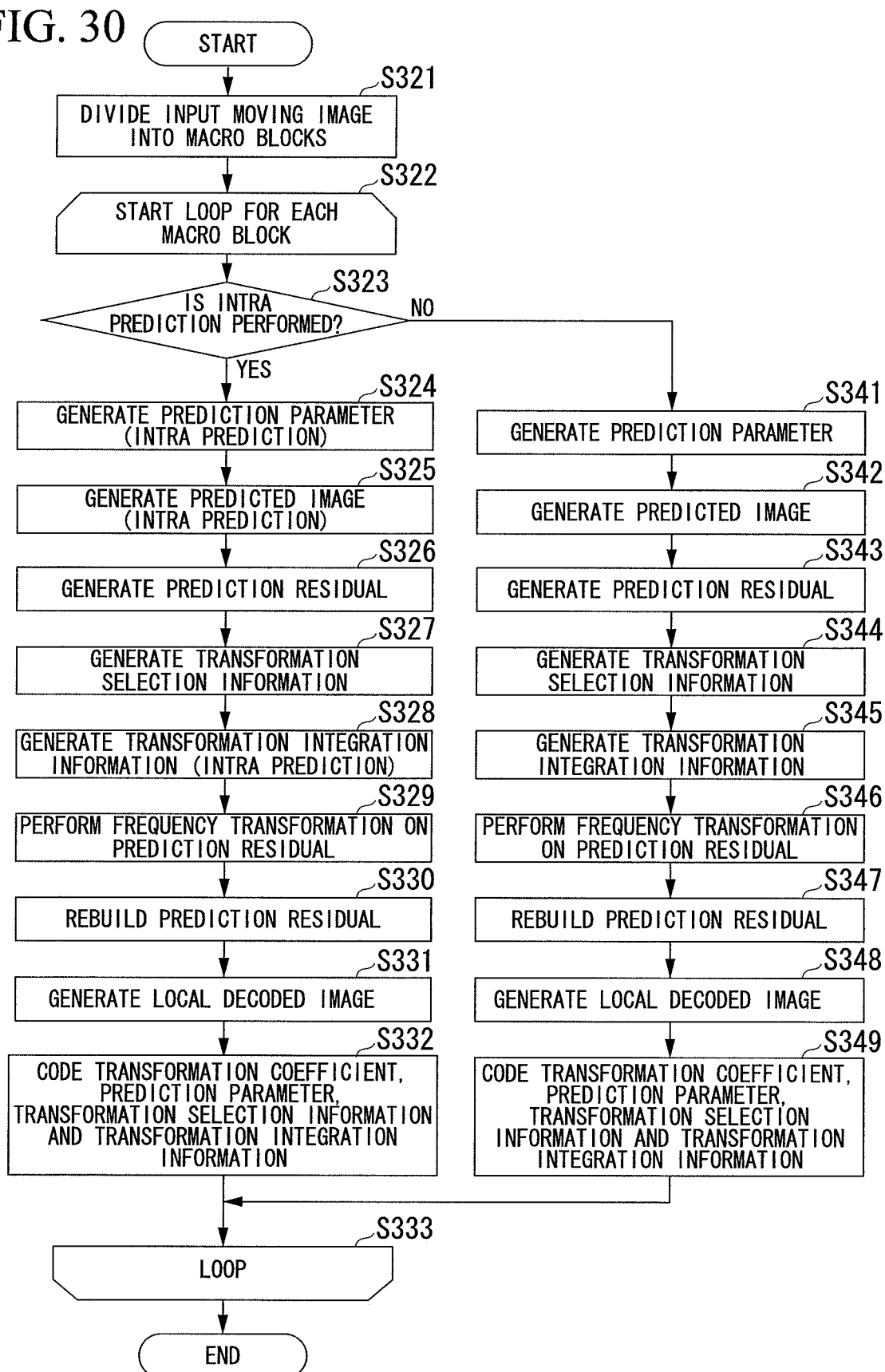
FIG. 30 is a flowchart showing a procedure of a process in which the moving image coding device 16 generates coded data in the third embodiment.

FIG. 30 is a flowchart showing a procedure of a process in which the moving image coding device 16 generates coded data. When a moving image is input to the image input unit 61, the moving image coding device 16 starts the process of generating the coded data.

Steps S321 to S322 are the same as steps S101 to S102 in FIG. 3.

In step S323, the prediction parameter determination unit 152 determines whether intra-prediction or inter-prediction is to be performed. If it is determined that the intra-prediction is to be performed (step S323: YES), the process proceeds to step S324, and when it is determined that the inter-prediction is to be performed (step S323: NO), the process proceeds to step S341.

In step S324, the prediction parameter determination unit 152 calculates a rate distortion cost for each size of partitions and selects the size of the partition in which the rate distortion cost is minimal, similar to the prediction parameter determination unit 102 of the first embodiment (FIG. 2).

Further, the prediction parameter determination unit 152 determines a prediction mode for each partition and generates a prediction parameter indicating the intra-prediction having been selected, the determined size of the partition, and the prediction mode. The prediction parameter determination unit 152 outputs the generated prediction parameter to the frequency transformation determination unit 155, the predicted image generation unit 153, and the variable-length coding unit 108.

In step S325, the predicted image generation unit 153 generates a predicted image for each partition according to the size of the partition and the prediction mode determined by the prediction parameter determination unit 152. Specifically, the predicted image generation unit 153 reads, for each partition within the macro block, pixel values of pixels adjacent to the partition that is a processing target from the local decoded images stored in the local decoded image storage unit 33 (when a referenced pixel is included in another macro block) or from a predicted image of the partition for which the predicted image has been generated, which is stored in the predicted image generation unit 153 (when the referenced pixel is included in the same macro block), and performs the interpolation according to the prediction mode to thereby generate the predicted image of the partition. The predicted image generation unit 153 combines the predicted images of the respective partitions within the macro block to generate a predicted image of the macro block. The predicted image generation unit 153 outputs the generated predicted image (the predicted image of the macro block) to the prediction residual generation unit 106 and the local decoded image generation unit 110.

Step S326 is the same as step S105 in FIG. 3.

In step S327, the frequency transformation determination unit 155 selects a frequency transformation for each partition, as in step S106 in FIG. 3. Specifically, the frequency transformation determination unit 155 selects a frequency transformation in which a region equal to or less than the size of the partition is a transformation target region, from the same transformation preset as that in the case of the first embodiment.

Further, the frequency transformation is uniquely determined according to the size of the partition, as in H.264/AVC in which 4×4 DCT, 8×8 DCT and 4×4 DCT are applied to partitions, respectively, when the partitions have 4 horizontal pixels×4 vertical pixels, 8 horizontal pixels×8 vertical pixels, and 16 horizontal pixels×16 vertical pixels. The frequency transformation determination unit 155 may determine the frequency transformation, similar to H.264/AVC. In this case, when the prediction parameter determination unit 152 selects the partition of 16 horizontal pixels×16 vertical pixels in step S324, the frequency transformation determination unit 155 selects 4×4 DCT as the frequency transformation in step S327, and performs integration of the target regions in step transformation S328, which will be described next.

Further, the frequency transformation used by the moving image coding device 16 is not limited to the frequency transformations used in H.264/AVC, similar to the case of the first embodiment. Further, the size of the macro block is not limited to 16 horizontal pixels×16 vertical pixels.

Alternatively, the size of the partition may be a size other than 4 horizontal pixels×4 vertical pixels, 8 horizontal pixels×8 vertical pixels, and 16 horizontal pixels×16 vertical pixels described above.

In step S328, the frequency transformation determination unit 155 generates transformation integration information indicating a region obtained by integrating adjacent transformation target regions, similar to step S107 of FIG. 3. The frequency transformation determination unit 155 determines whether a spatial correlation between the transformation target regions is high based on similarity between pixel values of adjacent pixels within the predicted images to thereby determine whether the transformation target regions are to be integrated, similar to the frequency transformation determination unit 105 of the first embodiment.

Here, the frequency transformation determination unit 155 determines whether the adjacent transformation target regions are to be integrated irrespective of whether the adjacent transformation target regions are included in the same partition or different partitions. Specifically, the frequency transformation determination unit 155 applies the condition "the transformation target region i and the transformation target region j are adjacent to each other. Further, a region obtained by combining the transformation target region i and the transformation target region j is a rectangle," that is obtained by excluding the condition that the transformation target regions be included in different partition regions from the above-described condition C131, similar to the description in the first embodiment.

Alternatively, the frequency transformation determination unit 155 may determine whether only the transformation target regions included in the different partitions as targets are to be integrated using the condition C131, similar to the case of the first embodiment.

Alternatively, the frequency transformation determination unit 155 may determine whether the transformation target regions are to be integrated using a method other than the above method. For example, the frequency transformation determination unit 155 may determine regions to be integrated based on an index indicating a spatial correlation, which is whether prediction modes of adjacent transformation target regions are the same, whether a prediction mode is the same as a specific prediction mode, that is, whether any of the prediction modes as shown in FIG. 29 is the same as the specific prediction mode, whether interpolation directions indicated by the prediction modes are the same or similar, whether one transformation target region references a pixel of the other transformation target region, or a combination of such criteria.

Steps S329 to S333 are the same as steps S108 to S112 in FIG. 3.

Steps S341 to S349 are a process in which the moving image coding device 16 performs the inter-prediction. In step S341, the prediction parameter determination unit 152 generates a prediction parameter containing information indicating that the inter-prediction has been selected. Otherwise, steps S341 to S349 are the same as steps S103 to S111 in FIG. 3. Following step S349, the process proceeds to step S333.

Further, when the frequency transformation determination unit 155 determines whether the transformation target regions are to be integrated based on pixel values of adjacent pixels within the predicted image, the moving image coding device 16 cannot omit the output of the transformation integration information, unlike the case of the first embodiment. This is because, in the intra-prediction, a different predicted image generation method from that in the inter-prediction is used and it is necessary for the transformation coefficient to have been already subjected to an inverse frequency transformation in order for the moving image decoding device to generate the predicted image, as will be described later and, accordingly, the predicted image has not yet been generated at a time when the frequency transformation determination unit 155 determines the frequency transformation to be applied to the macro block that is the processing target, and the integration of the transformation target regions performed by the moving image coding device 16 cannot be estimated based on the predicted image.

Meanwhile, when the frequency transformation determination unit 155 determines whether the transformation target regions are to be integrated based on the prediction mode, the moving image decoding device can also perform the same determination as the moving image coding device 16 using the information indicating the prediction mode output from the moving image coding device 16 to thereby estimate the integrated transformation target regions. Accordingly, the moving image coding device 16 is allowed not to output the transformation integration information.

Further, in H.264/AVC, the frequency transformation and the inverse frequency transformation are performed on the prediction residual for each partition rather than each macro block to generate the local decoded image for each partition, thereby compensating for a prediction error. Accordingly, when a predicted image of another partition within the same macro block is generated, a local decoded image for which the prediction error has been compensated is used to improve coding efficiency. On the other hand, in the moving image coding device 16, the frequency transformation determination unit 155 integrates the transformation target region and then the transformation coefficient generation unit 107 performs the frequency transformation on each macro block. Accordingly, the predicted image generation unit 153 generates the predicted image using an image for which the prediction error has not been compensated, as described in step S325 described above. However, in the following case, the prediction error is less likely to be a great problem.

For example, when a pixel referenced in the intra-prediction belongs to an adjacent macro block, such as when a predicted image of a partition at an upper-left corner of the macro block is generated, the local decoded image subjected to the frequency transformation and the inverse frequency transformation, which is stored in the local decoded image storage unit 33, is referenced, and accordingly, a problem of the prediction error is not generated. Further, even when a lossless transformation is used for the frequency transformation performed by the transformation coefficient generation unit 107, the prediction error is not a problem. Further, even when a direct current component prediction mode (DC prediction mode) in which a predicted image is generated based on an average value of reference pixels at the top and the left of a partition as in mode 2 shown in FIG. 29(c) is used, the use of the average value reduces an influence of the prediction error and the prediction error is less likely to be a problem. Further, when the transformation coefficient generation unit 107 quantizes the transformation coefficient, a small quantization width suppresses an increase in prediction error caused by the quantization and the prediction error is less likely to be a problem.

Further, in order to reduce the prediction error, a filter may be applied when the predicted image generation unit 153 uses the internally stored predicted image not subjected to the prediction error compensation. In this case, the moving image decoding device applies the same filter when generating the predicted image. For example, a smoothing filter is applied to thereby reduce a projecting prediction error. Further, in the case of the DC component prediction mode, the error is less likely to be a problem as described above. Accordingly, the prediction residual generation unit 106 may apply a weaker filter compared to other modes or may not apply the filter. Even when the quantization width is small, the prediction residual generation unit 106 may apply a weak filter or may not apply the filter.

Further, the moving image coding device 16 may integrate only a plurality of transformation target regions included in the same partition. In this case, it is possible to generate a local decoded image for each partition by performing the frequency transformation and the inverse frequency transformation on the prediction residual for each partition, similar to the intra-prediction defined in H.264/AVC. Accordingly, coding efficiency can be improved, similar to the case of H.264/AVC.

Further, in the intra-prediction defined in H.264/AVC, a Hadamard transform may be performed in order to remove redundancy of a direct current (DC) component of the transformation coefficient after the frequency transformation is performed on the prediction residual. On the other hand, in the moving image coding device 16, the transformation coefficient generation unit 107 performs the frequency transformation on the integrated transformation target region such that the spatial correlation between adjacent regions is reflected on the transformation coefficient. Accordingly, it is unnecessary to perform the Hadamard transform on the transformation coefficient and there is no increase in a processing amount due to the Hadamard transform.

Next, a moving image decoding device 26 that decodes the coded data from the moving image coding device 16 to generate a decoded moving image will be described.

Figure 31:
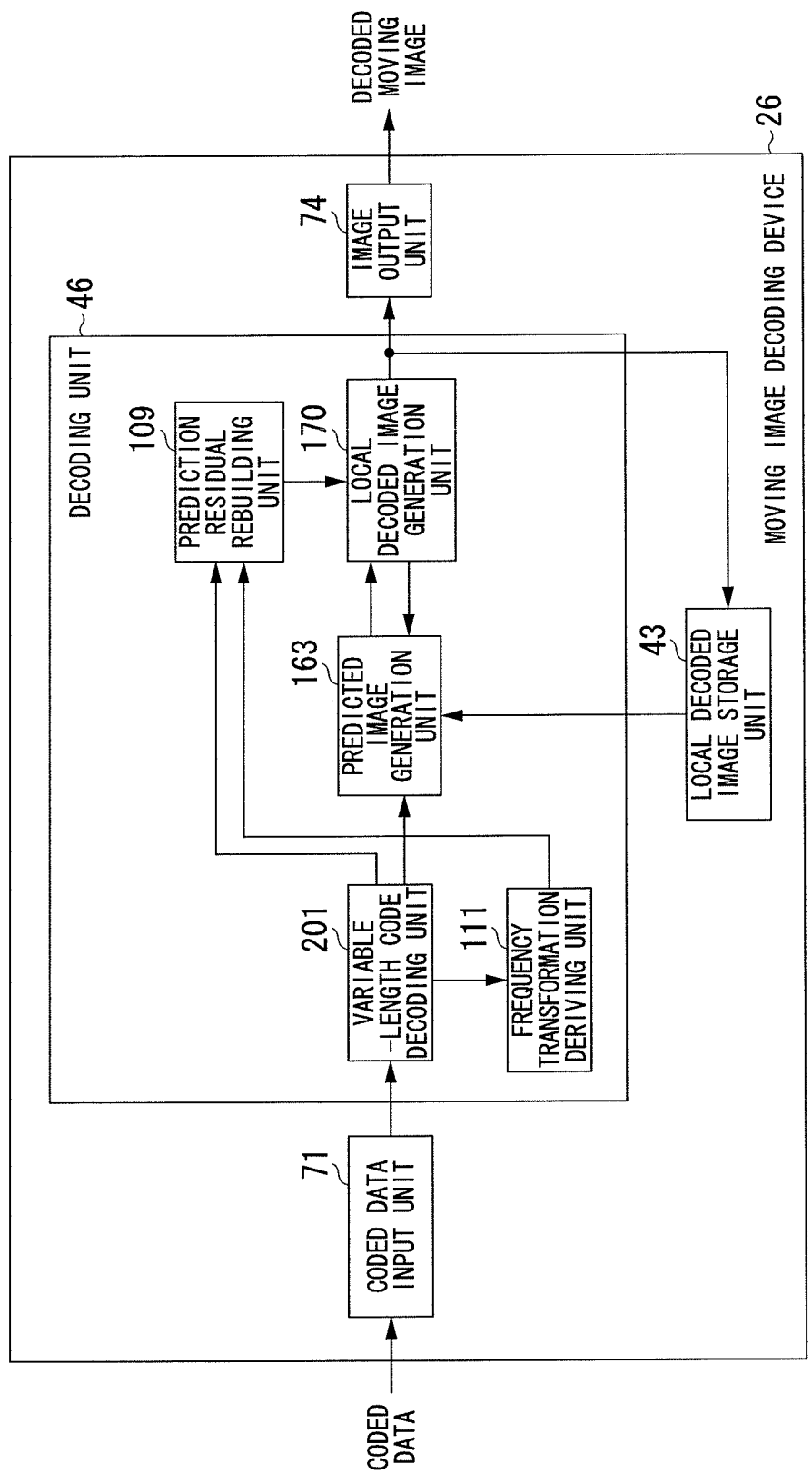
FIG. 31 is a schematic functional block configuration diagram showing a functional block configuration of a moving image decoding device 26 in the third embodiment.

FIG. 31 is a schematic functional block configuration diagram showing a functional block configuration of the moving image decoding device 26.

In FIG. 31, the moving image decoding device 26 includes a coded data input unit 71, a decoding unit 46, a local decoded image storage unit 43, and an image output unit 74. The decoding unit 46 includes a variable-length code decoding unit (a lossless code decoding unit) 201, a predicted image generation unit 163, a frequency transformation deriving unit (a transformation target region determination unit) 111, a prediction residual rebuilding unit 109, and a local decoded image generation unit 170.

In FIG. 31, parts corresponding to the respective units of FIG. 17 are indicated by the same reference numerals (43, 71, 74, 201, 111 and 109) and a description thereof will be omitted.

The predicted image generation unit 163 generates a predicted image for each partition based on a pixel value of an adjacent macro block read from the local decoded image storage unit 43 using information of the size of the partition and information of the prediction mode output from the variable-length code decoding unit 201, and a local decoded image of the partition processed in the same macro block that is output from the local decoded image generation unit 170, and outputs the predicted image to the local decoded image generation unit 170.

The local decoded image generation unit 170 generates a local decoded image of the partition based on the predicted image of the partition output from the predicted image generation unit 163 and the prediction residual output from the prediction residual rebuilding unit 109. Specifically, the local decoded image generation unit 170 sums each pixel of the predicted image of the partition and a corresponding pixel of the prediction residual to thereby generate the local decoded image of the partition. The local decoded image generation unit 170 outputs the generated local decoded image of the partition to the predicted image generation unit 163. Accordingly, when the predicted image generation unit 163 generates a predicted image of another partition in the same macro block, the predicted image generation unit 163 can reference the image output from the local decoded image generation unit 170.

Further, the local decoded image generation unit 170 combines the local decoded images of the partitions to generate a local decoded image (of the macro block unit), and outputs the generated local decoded image to the local decoded image storage unit 43 and the image output unit 74.

Figure 32:
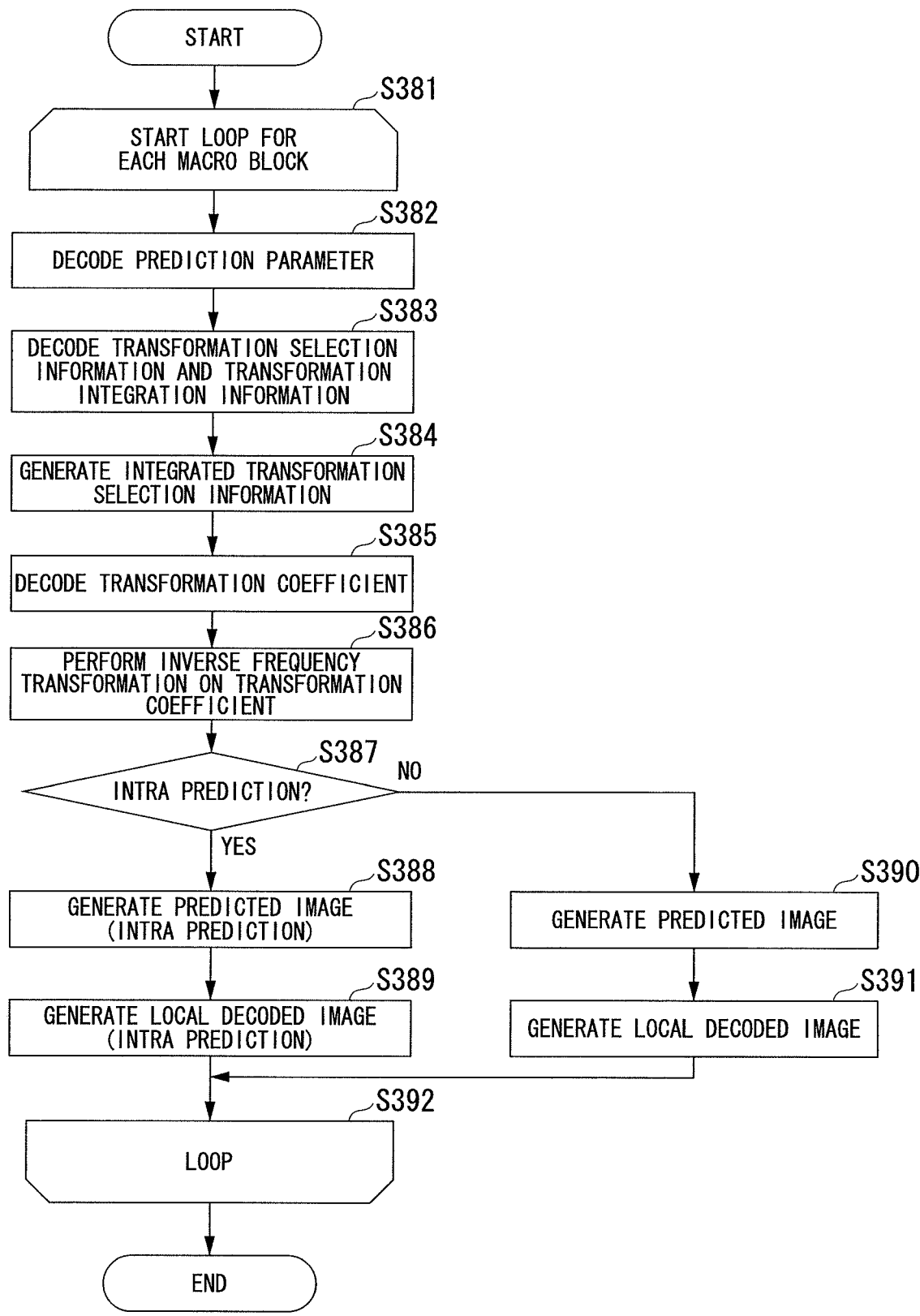
FIG. 32 is a flowchart showing a procedure of a process in which the moving image decoding device 26 generates a decoded moving image in the third embodiment.

FIG. 32 is a flowchart showing a procedure of a process in which the moving image decoding device 26 generates the decoded moving image. If coded data of a macro block unit is sequentially input from the outside, the moving image decoding device 26 starts the process of FIG. 32 to process the input coded data for each macro block.

Steps S381 to S385 are the same as steps S221 to S225 in FIG. 19. Step S386 is the same as step S227 in FIG. 19. In the intra-prediction, the local decoded image generation unit 170 generates a local decoded image for each partition using the prediction residual generated by the prediction residual rebuilding unit 109, and the predicted image generation unit 163 generates the predicted image for each partition using the generated local decoded image for each partition. Accordingly, in step S386, the moving image decoding device 26 performs an inverse frequency transformation on the transformation coefficient before generating the predicted image, unlike the case of FIG. 19.

In step S387, the predicted image generation unit 163 reads the information indicating whether the moving image coding device 16 has performed the intra-prediction or the inter-prediction, from the prediction parameter output from the variable-length code decoding unit 201. If the read information indicates that the intra-prediction has been performed (step S387: YES), the process proceeds to step S388, and if the read information indicates that the inter-prediction has been performed (step S387: NO), the process proceeds to step S390.

In step S388, the predicted image generation unit 163 generates the predicted image. Specifically, the predicted image generation unit 163 generates the predicted image for each partition and outputs the predicted image to the local decoded image generation unit 170, as described above. The local decoded image generation unit 170 generates the local decoded image of the partition based on the predicted image for each partition output from the predicted image generation unit 163 and the prediction residual output from the prediction residual generation unit 109, and outputs the local decoded image to the predicted image generation unit 163.

In step S389, the local decoded image generation unit 170 combines the local decoded images of the partitions to generate a local decoded image (of the macro block unit), as described above, and outputs the local decoded image to the local decoded image storage unit 43 and the image output unit 74. Then, the process proceeds to step S392.

Step S390 is the same as step S226 in FIG. 19. Steps S391 to S392 are the same as steps S228 to S229 in FIG. 19.

Further, as described above, when the moving image coding device 16 determines whether the transformation target regions are to be integrated based on the prediction mode and does not output the transformation integration information, the frequency transformation deriving unit 111 of the moving image decoding device 26 generates transformation integration information by performing the same process as the process in which the frequency transformation determination unit 165 of the moving image coding device 16 generates the transformation integration information as described with reference to FIG. 20 in the first embodiment. Accordingly, even when the transformation integration information is not output from the moving image coding device 16, the moving image decoding device 26 can generate the decoded moving image.

As described above, even when the moving image coding device 16 performs the intra-prediction, the moving image coding device 16 determines whether the adjacent transformation target regions are to be integrated and transforms the integrated transformation target region through one frequency transformation. Thus, it is possible to improve coding efficiency when a plurality of adjacent regions with a partition boundary interposed therebetween have a high spatial correlation.

Further, since the moving image decoding device 26 performs the inverse frequency transformation based on the transformation target regions integrated by the moving image coding device 16, the moving image coding device 16 can decode the generated coded data and generate the decoded moving image.

Furthermore, the frequency transformation determination unit 155 of the moving image coding device 16 may make a determination of the frequency transformation using the division pattern across a partition boundary of the predicted image without performing the integration process after frequency transformation selection for each partition of the predicted image, similar to the moving image coding device 11 of the second embodiment. Specifically, the frequency transformation determination unit 155 selects the division pattern according to the procedure shown in the flowchart of FIG. 23. The moving image coding device 16 codes and outputs the index indicating the division pattern, the prediction parameter (information indicating the size of the partition and the prediction mode), the transformation selection information, and the transformation coefficient, and the moving image decoding device 26 decodes such data. The prediction residual rebuilding unit 109 of the moving image decoding device 26 performs an inverse frequency transformation on the transformation coefficient according to the decoded division pattern and transformation selection information to thereby rebuild the prediction residual. Further, since the moving image decoding device 26 receives the division pattern from the moving image coding device 16, the moving image decoding device 26 does not generate the integrated transformation selection information. Accordingly, the moving image decoding device 26 need not include the frequency transformation deriving unit 111.

Even in this case, when the spatial correlation between respective transformation target regions determined according to the division pattern is high, the moving image coding device 16 can improve coding efficiency in comparison with the frequency transformation being performed on each partition, similar to the second embodiment. Further, the moving image decoding device 21 or the moving image decoding device 22 can generate the decoded moving image from the coded data generated by the moving image coding device 11.

Further, a program for realizing all or some of functions of the moving image coding devices 10, 11 and 16 and the moving image decoding devices 20, 21, 22 and 26 may be recorded in a computer-readable recording medium, and a computer system may read and execute the program recorded in this recording medium to perform the process of each unit. Further, here, the "computer system" includes an OS and hardware such as peripheral devices.

The "computer system" also includes a homepage providing environment (or a display environment) if a WWW system is used.

Further, the "computer-readable recording medium" refers to a storage unit, such as a flexible disk, a magnetic optical disc, a ROM, a portable medium such as a CD-ROM, or a hard disk embedded in the computer system. The "computer-readable recording medium" also includes a recording medium that dynamically holds a program for a short time, like a communication line in a case in which the program is transmitted via a network such as the Internet or a communication line such as a telephone line, or a recording medium that holds a program for a certain time, like a volatile memory in the computer system including a server and a client in the above case. Further, the program may be a program for realizing some of the above-described functions or a program capable of realizing the above-described functions through a combination with a program already recorded in the computer system.

While the embodiments of the present invention have been described above with reference to the drawings, a concrete configuration is not limited to the embodiments and various variations without departing from the scope and spirit of the embodiment of the present invention fall within the embodiment of the present invention.

INDUSTRIAL APPLICABILITY

The embodiment of the present invention is suitable for use in a moving image coding device, a moving image decoding device, a moving image coding/decoding system, a moving image coding method, and a moving image decoding method. For example, the embodiment of the present invention may be applied to a case in which transmission and reception of moving images are performed or a case in which storage and reproduction of moving images are performed.

REFERENCE SYMBOLS

1: Moving image coding/decoding system
10, 11, 16: Moving image coding device
20, 21, 22, 26: Moving image decoding device
61: Image input unit
32, 36, 52: Coding unit
33, 43: Local decoded image storage unit
64: Coded data output unit
71: Coded data input unit
42, 46, 82, 92: Decoding unit
74: Image output unit
102, 152: Prediction parameter determination unit
103, 153, 163: Predicted image generation unit
105, 112, 155: Frequency transformation determination unit
106: Prediction residual generation unit
107: Transformation coefficient generation unit
108, 113: Variable-length coding unit
109: Prediction residual rebuilding unit
110, 170: Local decoded image generation unit
111: Frequency transformation deriving unit
201, 202: Variable-length code decoding unit
203: Division pattern deriving unit

The invention claimed is:

1. A moving image coding method for a moving image coding device, the moving image coding method comprising:
  receiving a frame of an input moving image;
  dividing, via a central processing unit of the moving image coding device, the frame into a plurality of macro blocks;
  further dividing, via the central processing unit, each macro block of the plurality of macro blocks into a plurality of partitions, the partitions including at least one partition of which size is different from another of the partitions;
  dividing, via the central processing unit, each macro block of the plurality of macro blocks into a plurality of transformation target regions, at least one transformation target region of the plurality of transformation target regions crossing over a boundary between first and second adjacent partitions of the plurality of partitions (i) so as to include only a part of the first partition and only a part of the second partition and (ii)

so as not to include a whole part of the first partition and a whole part of the second partition; wherein vertical and horizontal sizes of each of the plurality of transformation target regions are integer multiples of vertical and horizontal sizes of minimum frequency transformation target region, applying, via the central processing unit, a frequency transformation to each of the plurality of transformation target regions to generate a transformation coefficient; and outputting coded data obtained by variable-length coding the transformation coefficient.

2. A moving image decoding method for a moving image decoding device, the moving image decoding method comprising:

receiving coded data obtained by coding a moving image;

performing, via a central processing unit of a moving image decoding device, variable-length decoding on the coded data, wherein at least a portion of the coded data is configured by a plurality of macro blocks, each macro block of the plurality of macro blocks being configured by a plurality of partitions, the partitions including at least one partition of which size is different from another of the partitions, each macro block of the plurality of macro blocks also being configured by a plurality of transformation target regions, at least one transformation target region of the plurality of transformation target regions crossing over a boundary between first and second adjacent partitions of the plurality of partitions (i) so as to include only a part of the first partition and only a part of the second partition and (ii) so as not to include a whole part of the first partition and a whole part of the second partition; wherein vertical and horizontal sizes of each of the plurality of transformation target regions are integer multiples of vertical and horizontal sizes of minimum frequency transformation target region, performing, via the central processing unit, on each of the plurality of transformation target regions, an inverse frequency transformation according to each of the plurality of transformation target regions, to generate prediction residuals associated with respective ones of the plurality of transformation target regions; and combining, via the central processing unit, the prediction residuals and predicted pictures to generate a plurality of local decoded images.

* * * * *